Oct. 31, 1950 S. B. WILLIAMS 2,528,101

TELEPHONE SYSTEM

Filed July 29, 1947 38 Sheets-Sheet 1

INVENTOR
S. B. WILLIAMS
BY R. O. Covell
ATTORNEY

INVENTOR
S. B. WILLIAMS
BY R. O. Covill
ATTORNEY

INVENTOR
S. B. WILLIAMS
BY
R. O. Covell
ATTORNEY

Oct. 31, 1950 S. B. WILLIAMS 2,528,101

TELEPHONE SYSTEM

Filed July 29, 1947 38 Sheets-Sheet 4

INVENTOR
S. B. WILLIAMS
BY R. O. Covell
ATTORNEY

Oct. 31, 1950 S. B. WILLIAMS 2,528,101

TELEPHONE SYSTEM

Filed July 29, 1947 38 Sheets-Sheet 5

INVENTOR
S. B. WILLIAMS
BY
R. O. Covell
ATTORNEY

Oct. 31, 1950 S. B. WILLIAMS 2,528,101

TELEPHONE SYSTEM

Filed July 29, 1947 38 Sheets-Sheet 6

INVENTOR
S. B. WILLIAMS
BY R. O. Covell
ATTORNEY

Oct. 31, 1950 S. B. WILLIAMS 2,528,101

TELEPHONE SYSTEM

Filed July 29, 1947 38 Sheets-Sheet 7

INVENTOR
S. B. WILLIAMS
BY
R. O. Covell
ATTORNEY

INVENTOR
S. B. WILLIAMS
BY R. O. Covell
ATTORNEY

Oct. 31, 1950 S. B. WILLIAMS 2,528,101

TELEPHONE SYSTEM

Filed July 29, 1947 38 Sheets-Sheet 9

INVENTOR
S. B. WILLIAMS
BY
R. O. Covell
ATTORNEY

INVENTOR
S. B. WILLIAMS
BY
R. O. Covell
ATTORNEY

INVENTOR
S. B. WILLIAMS
BY R. O. Covell
ATTORNEY

Oct. 31, 1950 S. B. WILLIAMS 2,528,101

TELEPHONE SYSTEM

Filed July 29, 1947 38 Sheets-Sheet 12

INVENTOR
S. B. WILLIAMS
BY
R. O. Covell
ATTORNEY

INVENTOR
S. B. WILLIAMS
BY
R. O. Covell
ATTORNEY

Oct. 31, 1950 S. B. WILLIAMS 2,528,101

TELEPHONE SYSTEM

Filed July 29, 1947 38 Sheets-Sheet 14

INVENTOR
S. B. WILLIAMS
BY R. O. Covell
ATTORNEY

Oct. 31, 1950 S. B. WILLIAMS 2,528,101

TELEPHONE SYSTEM

Filed July 29, 1947 38 Sheets-Sheet 15

INVENTOR
S. B. WILLIAMS
BY
R. O. Covell
ATTORNEY

INVENTOR
S. B. WILLIAMS
BY R. O. Covell
ATTORNEY

Oct. 31, 1950 S. B. WILLIAMS 2,528,101

TELEPHONE SYSTEM

Filed July 29, 1947 38 Sheets-Sheet 17

INVENTOR
S. B. WILLIAMS
BY R. O. Covell
ATTORNEY

INVENTOR
S. B. WILLIAMS
BY
R. O. Covell
ATTORNEY

Oct. 31, 1950 S. B. WILLIAMS 2,528,101

TELEPHONE SYSTEM

Filed July 29, 1947 38 Sheets-Sheet 19

INVENTOR
S. B. WILLIAMS
BY
R. D. Covell
ATTORNEY

INVENTOR
S. B. WILLIAMS
BY R. O. Covell
ATTORNEY

Oct. 31, 1950 S. B. WILLIAMS 2,528,101

TELEPHONE SYSTEM

Filed July 29, 1947 38 Sheets-Sheet 21

INVENTOR
S. B. WILLIAMS
BY R. O. Covell
ATTORNEY

INVENTOR
S. B. WILLIAMS
BY
R. O. Covell
ATTORNEY

Oct. 31, 1950 S. B. WILLIAMS 2,528,101

TELEPHONE SYSTEM

Filed July 29, 1947 38 Sheets-Sheet 23

INVENTOR
S. B. WILLIAMS
BY R. O. Covell
ATTORNEY

Oct. 31, 1950 S. B. WILLIAMS 2,528,101

TELEPHONE SYSTEM

Filed July 29, 1947 38 Sheets-Sheet 24

INVENTOR
S. B. WILLIAMS
BY
R. O. Covell
ATTORNEY

Oct. 31, 1950 S. B. WILLIAMS 2,528,101

TELEPHONE SYSTEM

Filed July 29, 1947 38 Sheets-Sheet 25

INVENTOR
S. B. WILLIAMS
BY
R. D. Covell
ATTORNEY

Oct. 31, 1950 S. B. WILLIAMS 2,528,101

TELEPHONE SYSTEM

Filed July 29, 1947 38 Sheets-Sheet 26

INVENTOR
S. B. WILLIAMS
BY R. O. Corell
ATTORNEY

INVENTOR
S. B. WILLIAMS
BY R. O. Covell
ATTORNEY

Oct. 31, 1950 S. B. WILLIAMS 2,528,101

TELEPHONE SYSTEM

Filed July 29, 1947 38 Sheets-Sheet 28

INVENTOR
S. B. WILLIAMS
BY R. D. Covell
ATTORNEY

INVENTOR
S. B. WILLIAMS
BY R. O. Covell
ATTORNEY

INVENTOR
S. B. WILLIAMS
BY
R. O. Covill
ATTORNEY

INVENTOR
S. B. WILLIAMS
BY
R. O. Covell
ATTORNEY

Oct. 31, 1950 S. B. WILLIAMS 2,528,101

TELEPHONE SYSTEM

Filed July 29, 1947 38 Sheets-Sheet 32

INVENTOR
S. B. WILLIAMS
BY R. D. Covell
ATTORNEY

Oct. 31, 1950

S. B. WILLIAMS

TELEPHONE SYSTEM 2,528,101

Filed July 29, 1947

38 Sheets-Sheet 33

INVENTOR
S. B. WILLIAMS
BY R. O. Covell
ATTORNEY

INVENTOR
S. B. WILLIAMS
BY R. O. Covell
ATTORNEY

Oct. 31, 1950 S. B. WILLIAMS 2,528,101

TELEPHONE SYSTEM

Filed July 29, 1947 38 Sheets-Sheet 35

INVENTOR
S. B. WILLIAMS
BY
R. O. Covell
ATTORNEY

INVENTOR
S. B. WILLIAMS
BY
R. D. Covell
ATTORNEY

Oct. 31, 1950 S. B. WILLIAMS 2,528,101

TELEPHONE SYSTEM

Filed July 29, 1947 38 Sheets-Sheet 37

INVENTOR
S. B. WILLIAMS
BY R. O. Covell
ATTORNEY

Oct. 31, 1950 S. B. WILLIAMS 2,528,101

TELEPHONE SYSTEM

Filed July 29, 1947 38 Sheets-Sheet 38

INVENTOR
S. B. WILLIAMS
BY
R. D. Covill
ATTORNEY

Patented Oct. 31, 1950 2,528,101

UNITED STATES PATENT OFFICE 2,528,101

TELEPHONE SYSTEM

Samuel B. Williams, Brooklyn, N. Y., assignor to Bell Telephone Laboratories, Incorporated, New York, N. Y., a corporation of New York Application July 29, 1947, Serial No. 764,467

10 Claims. (Cl. 235—61)

This invention relates to counting and computing systems and particularly to systems arranged to test for, count and record a particular condition and to compute the average of the record.

Objects of the invention are the recording of more complete and accurate data indicating the usage of each of a plurality of groups of apparatus units and the automatic computation therefrom of the average usage of each of the groups.

This invention is a testing, recording and computing system arranged to successively test a plurality of groups of apparatus units, one group at a time, repeat the test as long as desired, record the number of units which are in use in each group when tested, and automatically compute the average number of units in use in each of the plurality of groups.

A feature of the invention is a testing, recording and computing system adapted to successively and repeatedly test a plurality of groups of apparatus units, one group at a time, to record the number of units which are in use in each group when tested, and to compute and indicate responsive to each record of a group tested, the average number of units in use in that group for all of the tests of that group.

According to one feature of the invention, a plurality of groups of apparatus units are connected, one group at a time, to an idle one of a plurality of counting circuits which count the number of busy units in a connected group; and a punch circuit is operatively associated with the counting units in succession to record on a tape the group identifying number and the busy count for each group of trunks each time it is connected to a counting circuit.

According to another feature, means are provided for testing and counting the number of busy units in a plurality of groups of apparatus units and for recording on a tape the group identifying number and busy count for the group each time a busy count is made; a plurality of computers are provided for use in succession to total the busy count for each group; and a common punch circuit is provided for punching in numerical succession on a summary tape the group number and the total busy count for each group.

According to a further feature, each of a plurality of computers arranged to total a plurality of busy counts for each of a plurality of groups of apparatus units, is further arranged to count the number of busy counts thus totaled and to compute the average busy count for a group; and common means is provided for recording the group number and average busy count for each group under control of the computers in succession.

The invention and its features will be more readily understood by considering the application of the invention to traffic recording and computing in automatic telephone systems comprising a plurality of traffic carrying trunk groups, one such system being illustrated schematically in the drawing. The invention is, however, not limited to telephone systems nor to traffic recording and computing systems but is generally applicable to any system adapted to test each of a plurality of groups of apparatus units for the presence or absence of a particular condition.

Referring to the drawing:

Fig. 39 shows the relative position in which Figs. 2 to 38 are to be placed to formed a busy counting and computing system embodying the invention and its various features.

In one of the methods used in automatic telephone systems for determining the efficiency with which a group of trunks handle the calls therethrough, the busy trunks are counted at definite intervals during the period of observation. From this, the average number of busy trunks may be obtained which will indicate the effectiveness of the group in handling the calls. Trunk groups are usually provided to handle the calls arising during the average maximum busy hour; and the period of observation, when such counts are made, is this so-called busy hour. The number of counts made during the period of observation should be large since the accuracy depends on the number of counts made during the hour of observation.

In dial systems the selectors form a part of the trunk and it is important from the standpoint of service that a sufficient number of selectors be provided to give the grade of service desired. It is equally important that this number is not exceeded because the excess trunks and selectors represent an unwarranted investment which must necessarily increase the cost of the service. Since such increases are not justified it represents a loss to the operating company and it is essential that the proper number of trunks and selectors be provided to give the desired grade of service and no more.

For instance, in a step-by-step dial telephone office the traffic through the selectors of a given selecting stage divides into a maximum of ten different directions and for each direction there may be more than one trunk group. The terminating traffic divides at the incoming multiples into the ten groups of thousand selectors and is further divided at each thousand selector multiple into ten connector groups. Hence the terminating traffic through the ten groups of thousand selectors is directed to one hundred groups of connectors to reach the ten thousand lines connected to the connector multiples. The originating or outgoing traffic is similarly divided and is routed through the first, second and third selector multiples to the outgoing trunks which connect the originating part of the system to the terminating part. The division of the originating or outgoing traffic depends upon the size of the system, while the division of the incoming or terminating traffic is fixed by the number of lines served by the terminating unit. Since this is usually limited to ten thousand lines requiring one hundred trunk groups it seems advisable to consider the application of automatic measuring means to terminating traffic, bearing in mind, of course, that modifications of the plan may be made and the plan generally applied to the outgoing traffic.

Figure 1:
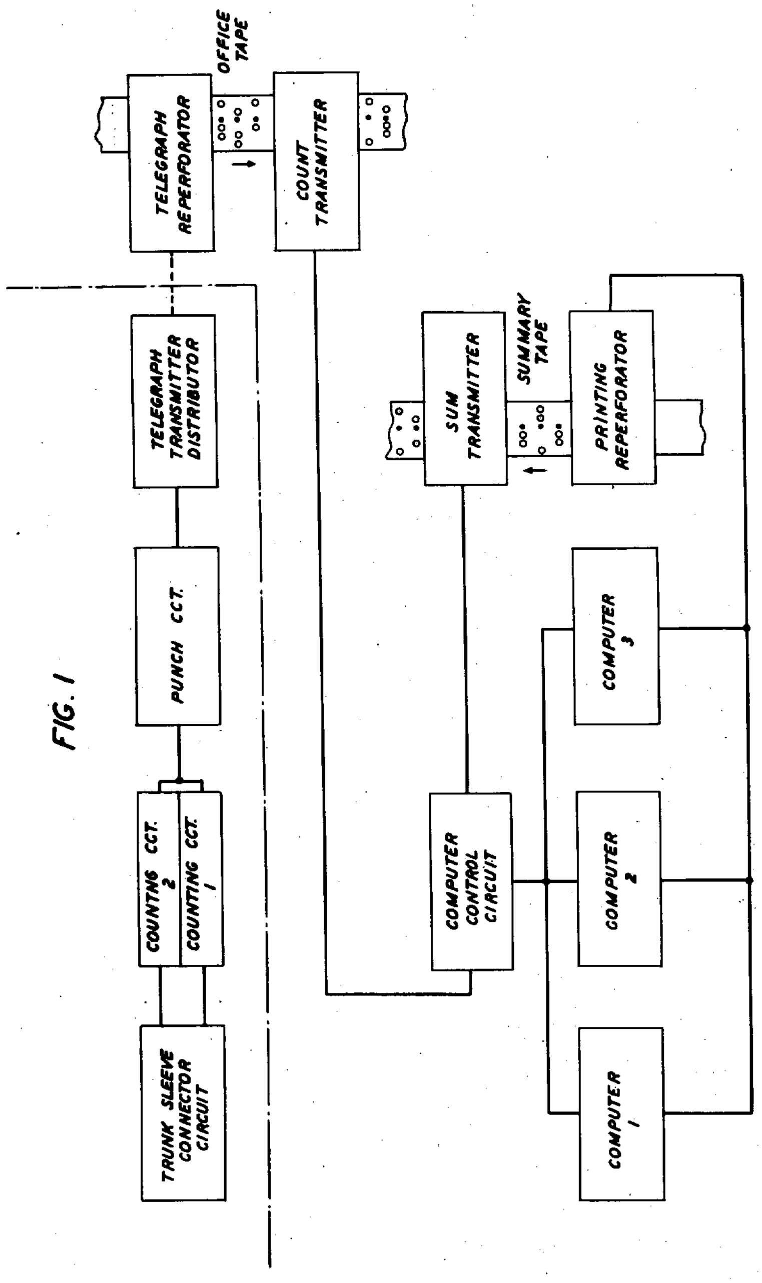
Fig. 1 represents in diagrammatic form a counting and computing system for use in an automatic telephone system.
Figure 2:
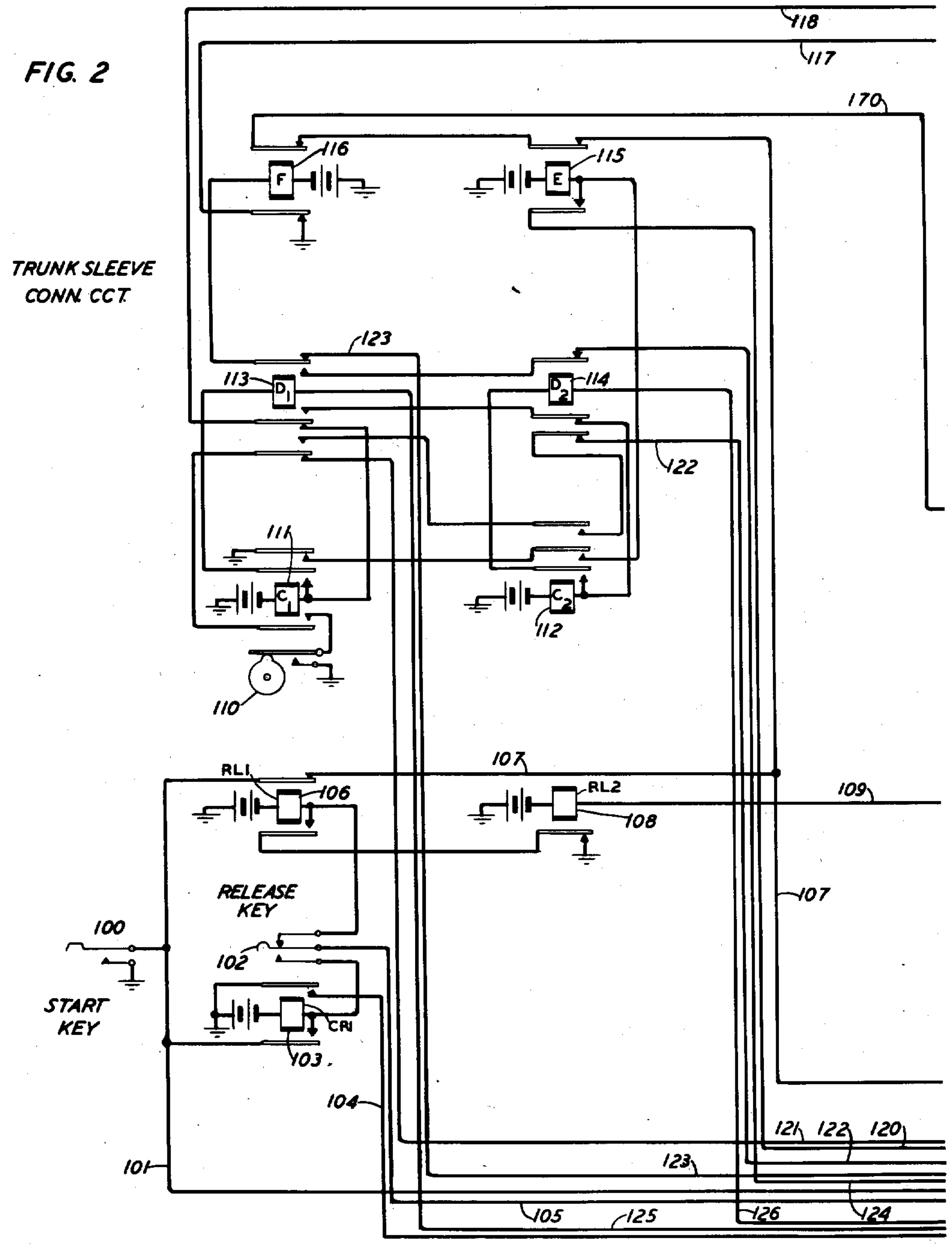
Figs. 2 to 8 show a trunk sleeve connector comprising cross bar switches for connecting the sleeve conductors of the trunks of one hundred groups of trunks to testing and busy counting means, one group of trunks at a time.
Figure 3:
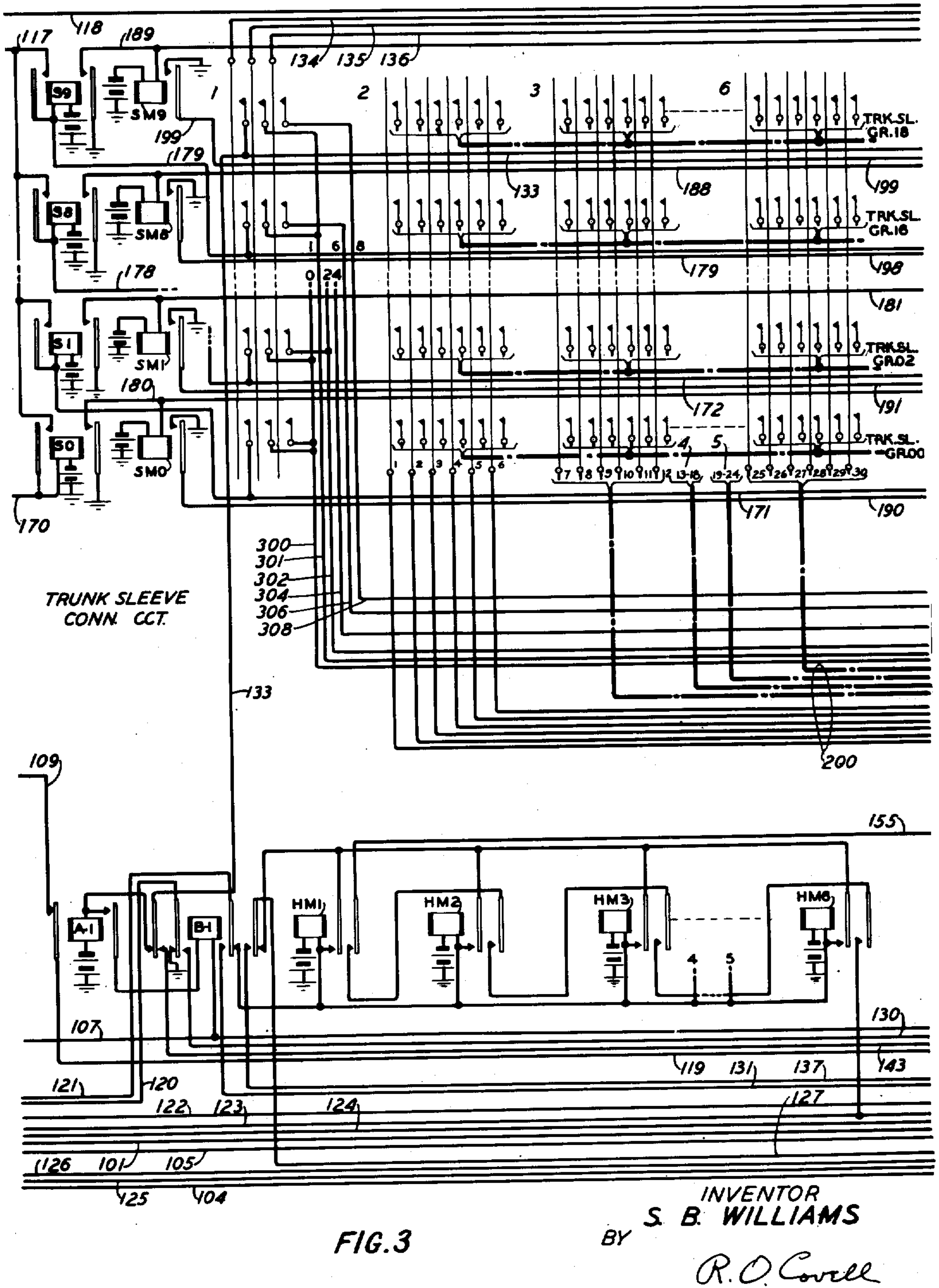
Figure 4:
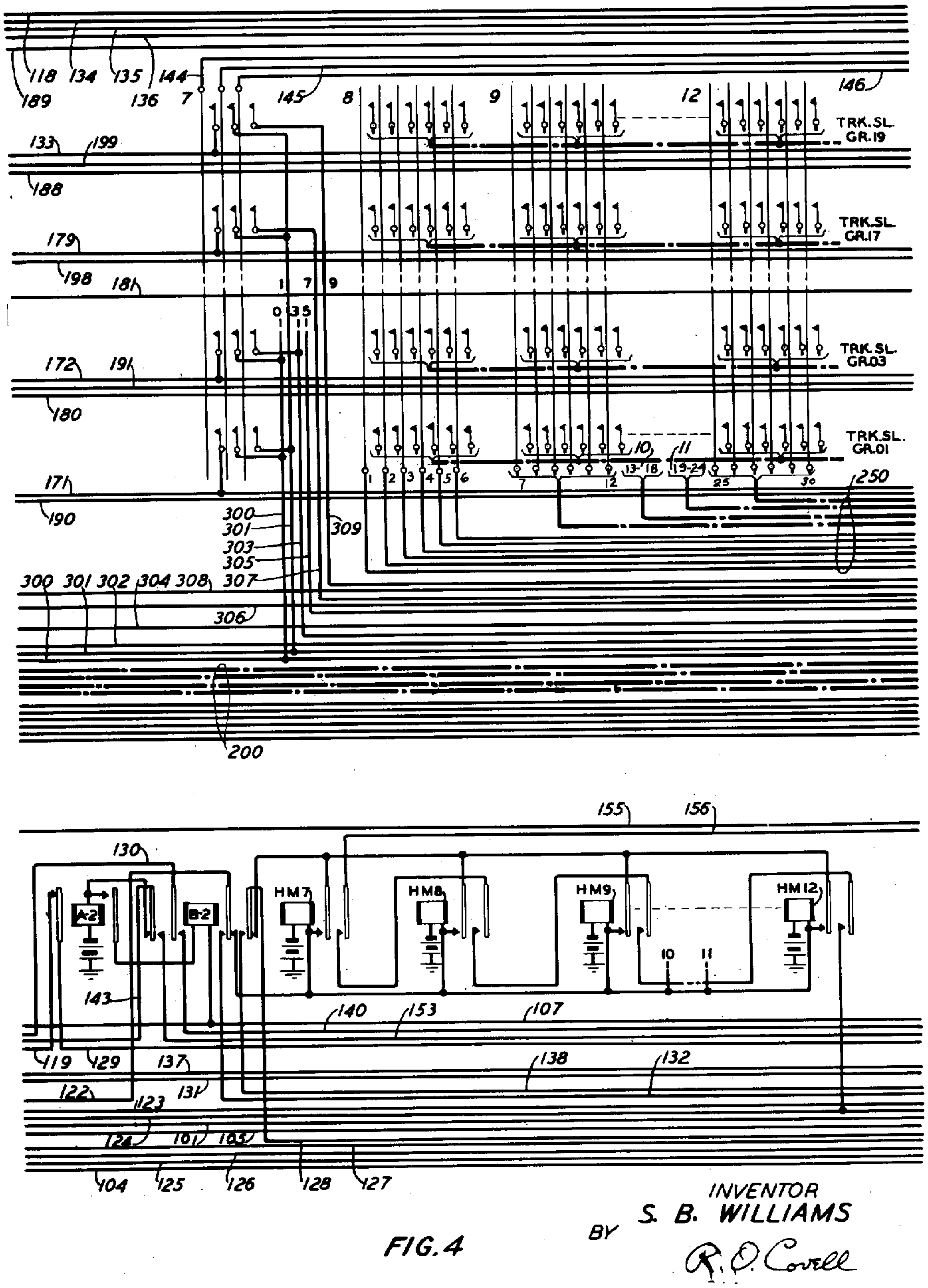
Figure 5:
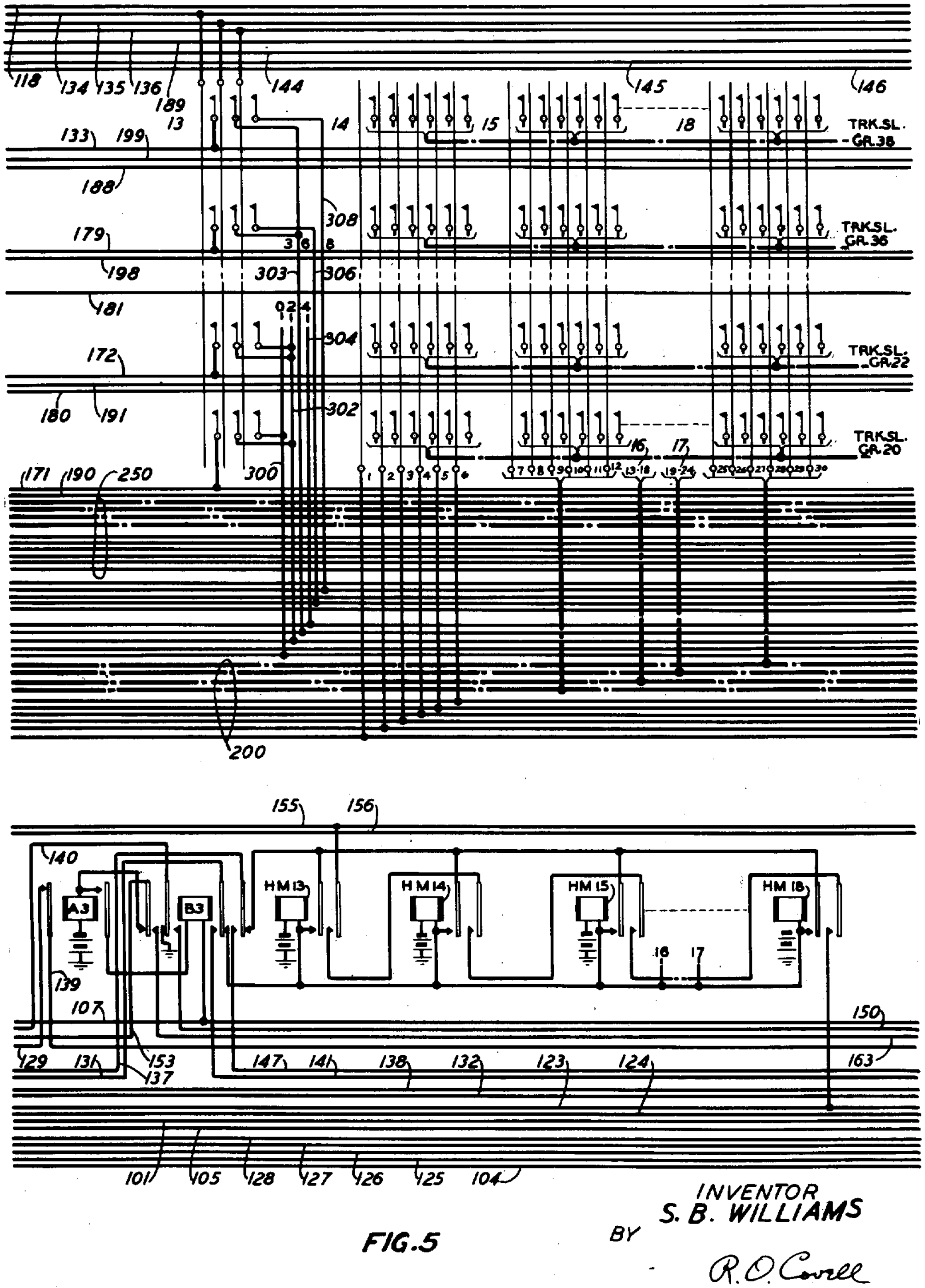
Figure 6:
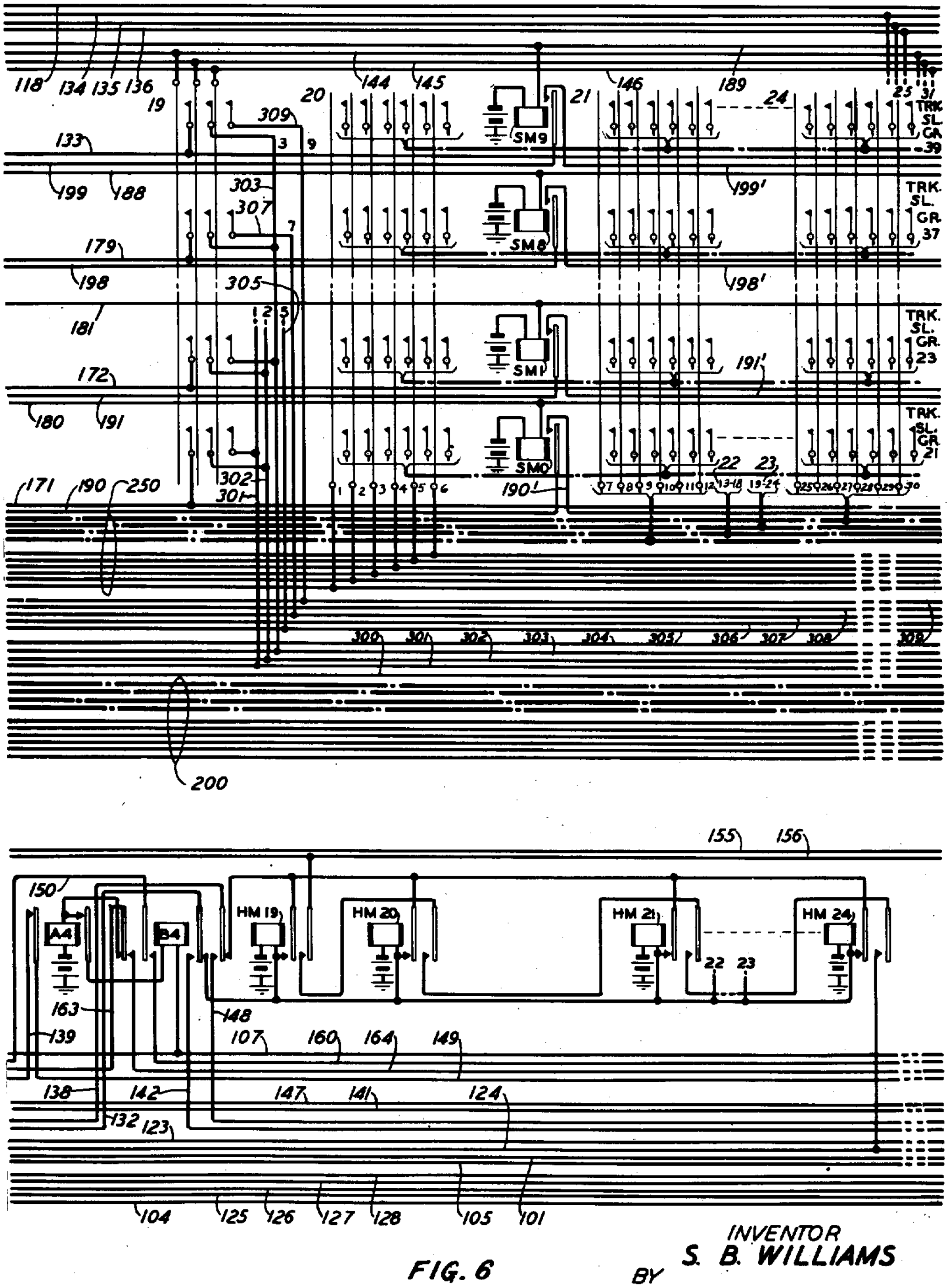
Figure 7:
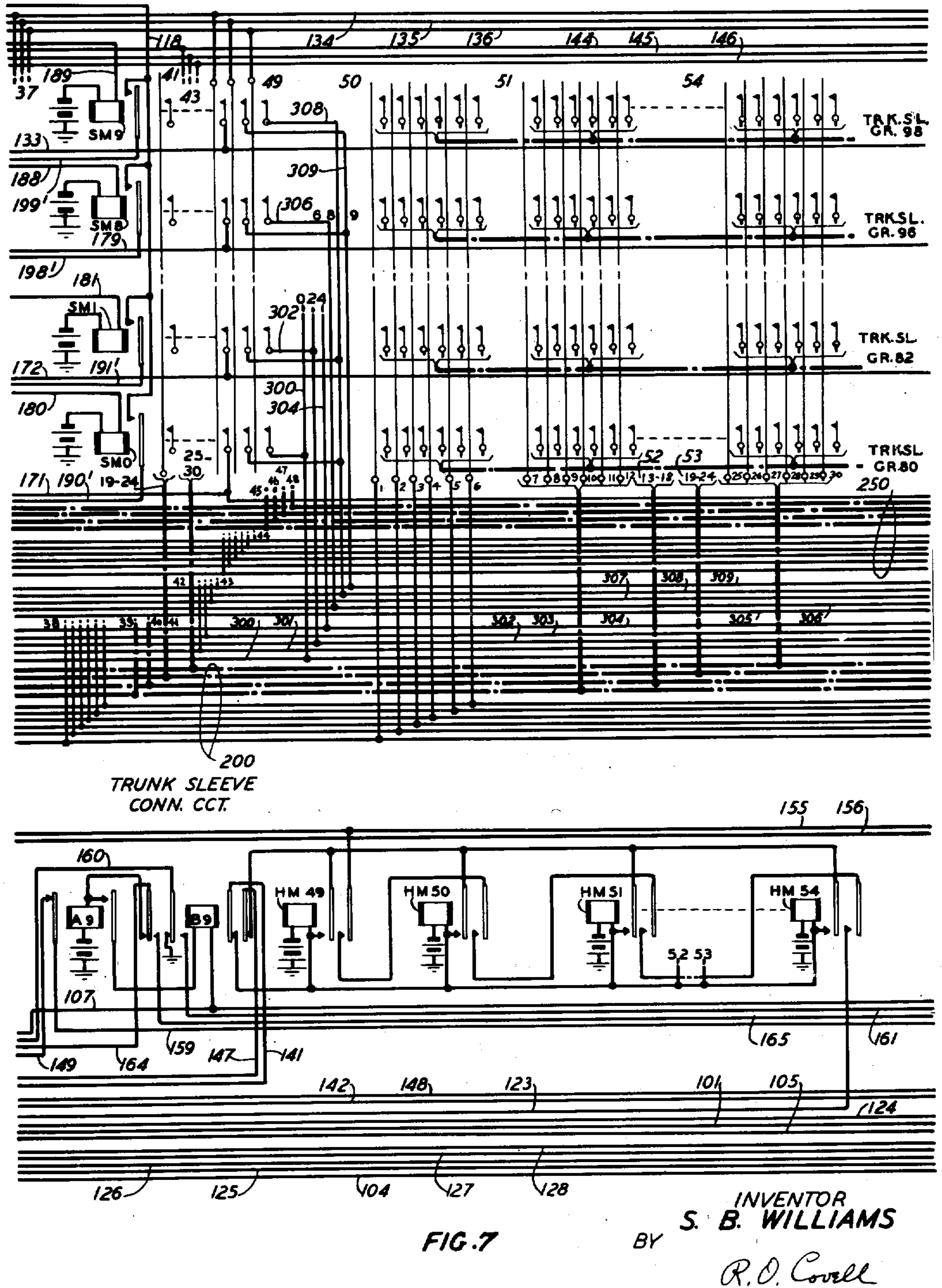
Figure 8:
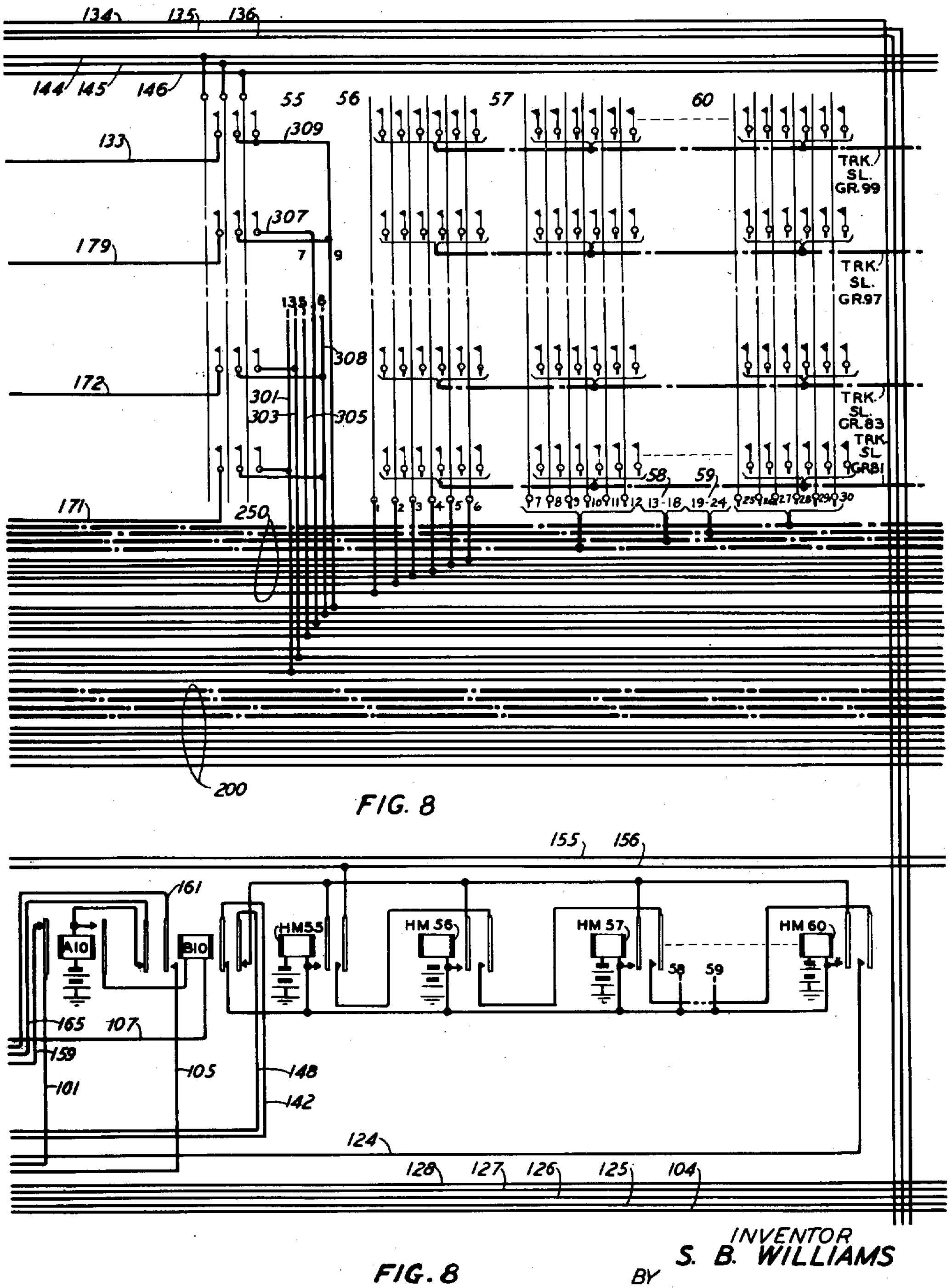

Referring now to the counting and computing system represented in Fig. 1 for use in an automatic telephone system, a group of three cross bar switches is provided which give access to the test or sleeve terminals of 100 groups of thirty trunks each. In counting the number of busy trunks or selectors, it is desirable to make as many counts during the observation period, one hour for example, as is possible. Theoretically, the number of such counts should be limited only by the time required for operating the cross bar switches to transfer a counting circuit from one trunk group to another. Provision is made for two counting circuits in the system represented in Fig. 1. If the time required for a counting circuit to test the thirty trunk sleeves of the group exceeds the time required for the cross bar switch to shift the counting circuit, it is possible to increase the number of counting circuits which are provided so that the maximum number of selector counts may be made during the hour. However, in the system shown, the results of the count are punched on a teletypewriter tape and the time required for punching the trunk group number and the busy trunk count becomes the factor which determines the number of counts per trunk group which can be obtained if this time exceeds that required by the cross bar switch for transferring the counting circuit from one group to another.

In the system represented in Fig. 1, provision is made for one trunk connector circuit, two counting circuits and a busy-count punch circuit. The punch circuit registers the trunk identifying number and the busy count for each trunk group tested and makes a tape record of these numbers. The punch circuit also controls a telegraph transmitter-distributor which transmits code signals corresponding to the trunk identifying number and busy count for each trunk group to a telegraph reperforator at the distant point at which the computer is located. The record punched on both tapes is the same and either will be called the "office" tape in the description of the computing circuit. If the computing equipment is located at the same point as the counting circuits and punch circuit the telegraph transmitter-distributor, the reperforator and the second "office" tape may be omitted, and the tape punched by the first punch circuit may be used with the computing equipment. The trunks in each of the hundred groups are tested in succession and the busy count for each group is recorded on the "office" tape. The testing of each group in succession is repeated as long as desired and the "office" tape records each busy count made on each group of trunks. In order to obtain the average number of trunks busy in each group it is necessary to add up the busy counts for each group and divide the total by the number of such counts made during the observation period. The computing equipment comprises a count transmitter, a computer control circuit, three computers, a "sum" punch circuit and a "sum" transmitter. The count and sum transmitters are telegraph transmitters of suitable type. The "office" tape is fed into the count transmitter to effect the transmission of the busy count records thereon, through the computer control circuit, to one of the computers; and another tape called the "summary" tape is punched by the "sum" punch circuit to record the sum of all of the busy counts recorded on the "office" tape for each trunk group. The busy count sum for each trunk group is put back into the computer and the next count for the same trunk group, recorded on the office tape and transmitted by the count transmitter, is added thereto to obtain a new accumulated sum which is recorded by the "sum" punch circuit on the "summary" tape. This action continues until such time that all counts for each trunk group have been accumulated. The computing equipment now divides the final accumulated sum as recorded on the summary tape by the number of counts per trunk group that have been made and punches the resulting average on the summary tape which will then record the trunk group number, the average number of trunks found busy and such other characters as may be necessary to introduce the final tape into a teletypewriter arranged for the purpose so that the final summary may be printed.

*Trunk sleeve connector*

The trunk sleeve connector circuit shown in Figs. 2 to 8 comprises three cross bar switches for connecting the counting circuits to the sleeve conductors of one hundred groups of trunks, a start key 100, a release key 102 and associated relays 103, 106 and 108, a timing interrupter 110, and relays 111, 112, 113, 114, 115 and 116.

Each of the cross bar switches consists of two hundred sets of contacts, each set consisting of six pairs of contact springs. The two hundred sets are arranged in twenty vertical units, each vertical unit consisting of ten sets of contacts, six contacts per set, and an associated holding magnet. The correspondingly located sets of contacts in each vertical unit form ten horizontal rows of contacts controlled by ten select magnets, one for each horizontal row. The sixty vertical units of the three cross bar switches are divided into ten groups, six vertical units per group. The contacts of the first vertical unit in each group of six are used for control purposes; and each set of six contacts in the other five vertical units of a group are connected to the sleeve conductors of a group of thirty trunks. Thus each group of six vertical units enables connection to ten groups of trunks, thirty trunks per group; and the three cross bar switches provide ten groups of six vertical units each, giving access to the sleeve circuits of one hundred groups of thirty trunks each.

The sixty vertical units are numbered from 1 to 60 and the associated sixty hold magnets are numbered from H1 to H60. The ten select magnets associated with the ten horizontal rows of each of the three switches are numbered SM0 to SM9; and the three like-numbered select magnets for each row of the three switches are connected in parallel and are operatively controlled by the corresponding one of ten select relays numbered S0 to S9. The six hold magnets, for the six vertical units of each of the ten groups into which the vertical units are divided, are connected in parallel and two relays are associated with each group of six hold magnets, these relays being numbered A1 and B1 for the first group, A2 and B2 for the second group, and so on to A10 and B10 for the tenth group. All of the contacts, hold magnets, select magnets and vertical group relays are not shown. The sixty vertical units are represented by a partial showing of units 1, 2, 3 and 6 in the first group, units 7, 8, 9 and 12 in the second group, units 13, 14, 15 and 18 in the third group, 19, 20, 21 and 24 in the fourth group, 41 in the sixth group, 49, 50, 51 and 54 in the ninth group, and 55, 56, 57 and 60 in the tenth group. The hold magnets are shown for each of these vertical units with the exception of the 41st vertical unit and the A and B relays are shown for each of these groups except the sixth group. The partial showing of each of these vertical units includes contact sets in the horizontal rows associated with select magnets SM0, SM1, SM8 and SM9 of the three cross bar switches; and these select magnets and the associated select relays S0, S1, S8 and S9 are also shown.

The thirty sleeve or test conductors of the trunks in trunk group number 00 are connected to contacts in horizontal row 0 of vertical units 2 to 6 of the first vertical unit group; the test conductors of the trunks in trunk group number 01 are connected to contacts in horizontal row 0 of vertical units 8 to 12 of the second vertical unit group; the test conductors of the trunks in trunk group number 02 are connected to contacts in horizontal row 1 of vertical units 2 to 6 of the first vertical group; the test conductors of the trunks in trunk group number 03 are connected to contacts in horizontal row 1 of vertical units 8 to 12 of the second vertical unit group, and so on, the test conductors of trunk group number 18 being connected to contacts in horizontal row 9 of vertical units 2 to 6 of the first vertical unit group and the test conductors of trunk group number 19 being connected to contacts in horizontal row 9 of vertical units 8 to 12 of the second vertical unit group. Thus trunk groups 00, 02, 04, 06, 08, 10, 12, 14, 16 and 18 are connected, one to each of the ten horizontal rows of terminals of vertical unit group 1; trunk groups 01, 03, 05, 07, 09, 11, 13, 15, 17 and 19 are connected one to each of the ten horizontal rows of contacts of vertical unit group 2; trunk groups 20, 22, 24, 26, 28, 30, 32, 34, 36 and 38 are connected one to each of the ten horizontal rows of contacts of vertical unit group 3; trunk groups 21, 23, 25, 27, 29, 31, 33, 35, 37 and 39 are connected one to each of the ten horizontal rows of contacts of vertical unit group 4; and so on, the trunk group 99 being connected to the contacts of horizontal row 9 of vertical units 56, 57, 58, 59 and 60 of the tenth vertical unit group.

The trunk test contacts of vertical unit groups 1, 3, 5, 7 and 9 are multiply connected through conductors 200 to counting circuit No. 1, the trunk test contacts of vertical unit groups 2, 4, 6, 8 and 10 are multiply connected over conductors 250 to counting circuit No. 2; and the trunk sleeve connector circuit is effective to connect trunk groups one at a time in numerical order to the one or the other of the two counting circuits.

*Counting circuits*

Figure 9:
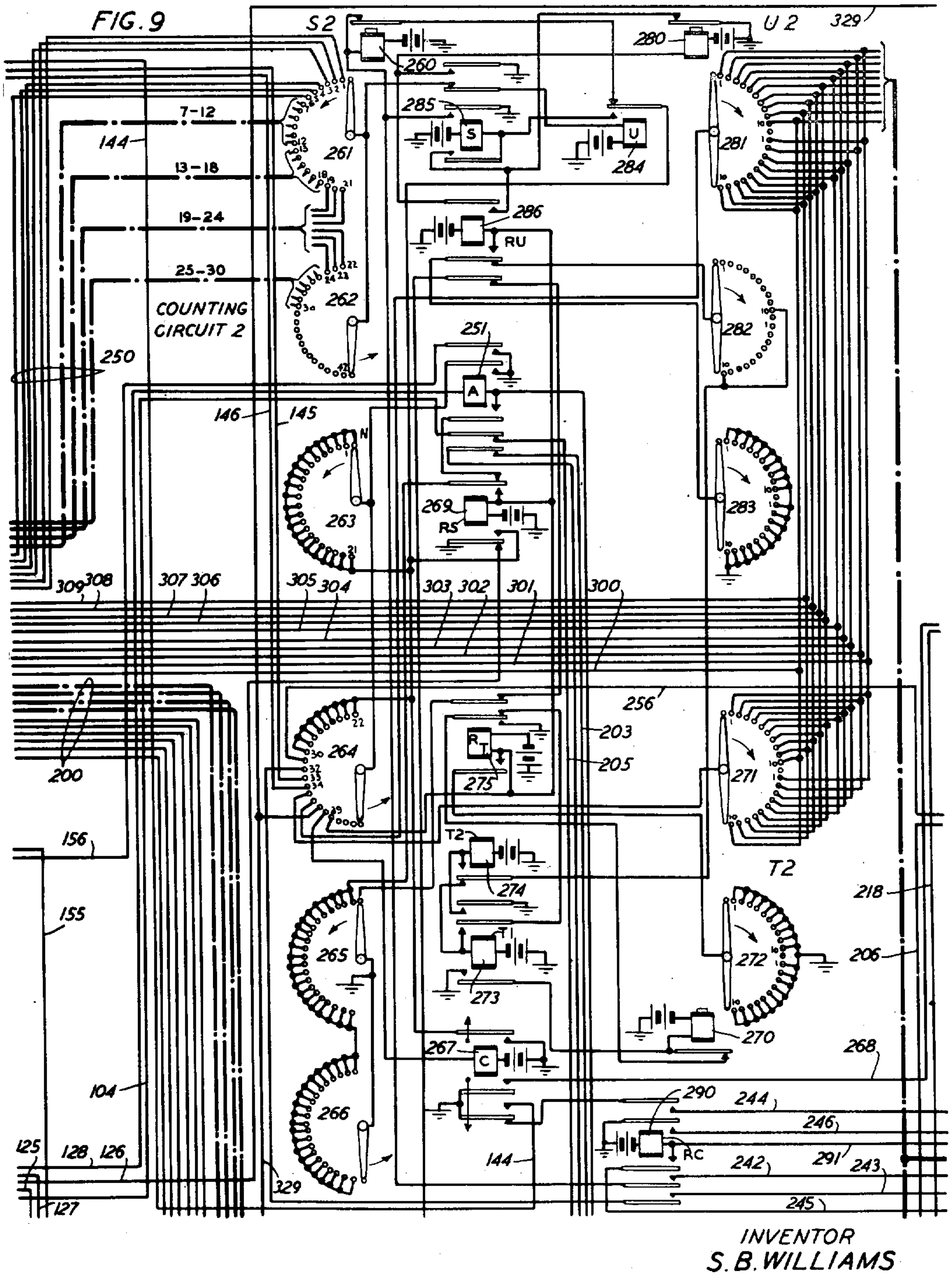
Figs. 9 and 10 represent two counting circuits for counting the number of busy trunks in the groups tested.
Figure 10:
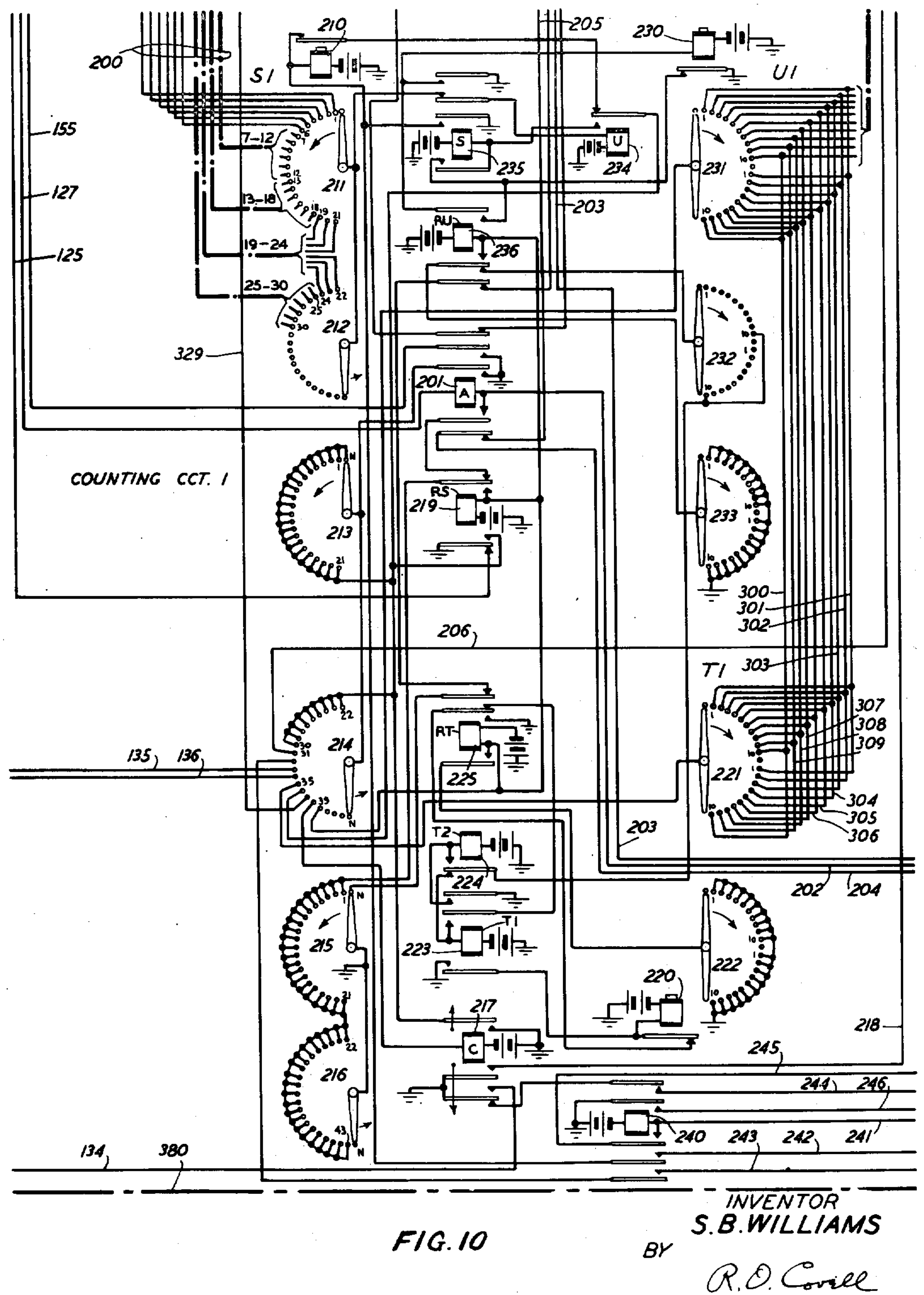

The two counting circuits for counting the number of busy trunks in each of the one hundred groups of trunks to which the trunk connector has access are shown in Figs. 9 and 10. As above stated, the No. 1 counting circuit shown in Fig. 10 is used to count the number of busy trunks in trunk groups whose sleeve or test conductors are connected to the contacts of cross bar vertical unit groups 1, 3, 5, 7 and 9; and the No. 2 counting circuit shown in Fig. 9 is used to count the number of busy trunks in trunk groups whose sleeve or test conductors are connected to contacts of cross bar vertical unit groups 2, 4, 6, 8 and 10.

Counting circuit No. 1 shown in Fig. 10 comprises three rotary switches S1, T1 and U1 and associated relays 201, 217, 219, 223, 224, 225, 234, 235, 236 and 240. The S1 switch includes a stepping magnet 210, brushes 211 to 216 and associated banks of terminals; the T1 switch includes a stepping magnet 220, brushes 221 and 222 and associated banks of terminals; and the U1 switch includes a stepping magnet 230, brushes 231, 232 and 233 and associated banks of terminals. The brushes of banks 211, 213 and 215 are 180 degrees out of phase with the brushes of banks 212, 214 and 216; so that brushes 211, 213 and 215 successively engage the terminals of their banks during one-half revolution of the brushes and brushes 212, 214 and 216 successively engage the terminals of their banks during the next half revolution of the brushes. The group of thirty conductors 200 to which even-numbered trunk groups are connected, a group at a time, are connected to thirty terminals in the banks 211 and 212 of switch S1. When the trunk sleeve connector operates to connect the test conductors of a group of thirty trunks to conductors 200, switch S1 is started. During the first half revolution of switch S1, the brush 211 successively connects the winding of relay 234 to each of twenty-one of the conductors 200 and then brush 212 successively connects the winding of relay 234 to each of the remaining of the thirty conductors 200. The test relay 234 operates each time it encounters a conductor which is connected to the sleeve of a busy trunk and the further advance of switch S1 is then delayed while the brushes of switch U1 are moved one step to count the busy trunk. Each time the brushes of switch U1 make a tenth step, the brushes of switch T1 are advanced one step so that the two switches indicate the number of busy trunks in any group tested.

The counting circuit No. 2 shown in Fig. 9 is similar to counting circuit No. 1 and comprises three rotary switches S2, T2 and U2 and associated relays 251, 267, 269, 273, 274, 275, 284, 285, 286 and 290. The switches and relays have like functions to those of the corresponding switches and relays of counting circuit No. 1.

*Punch circuit and allotter*

Figure 11:
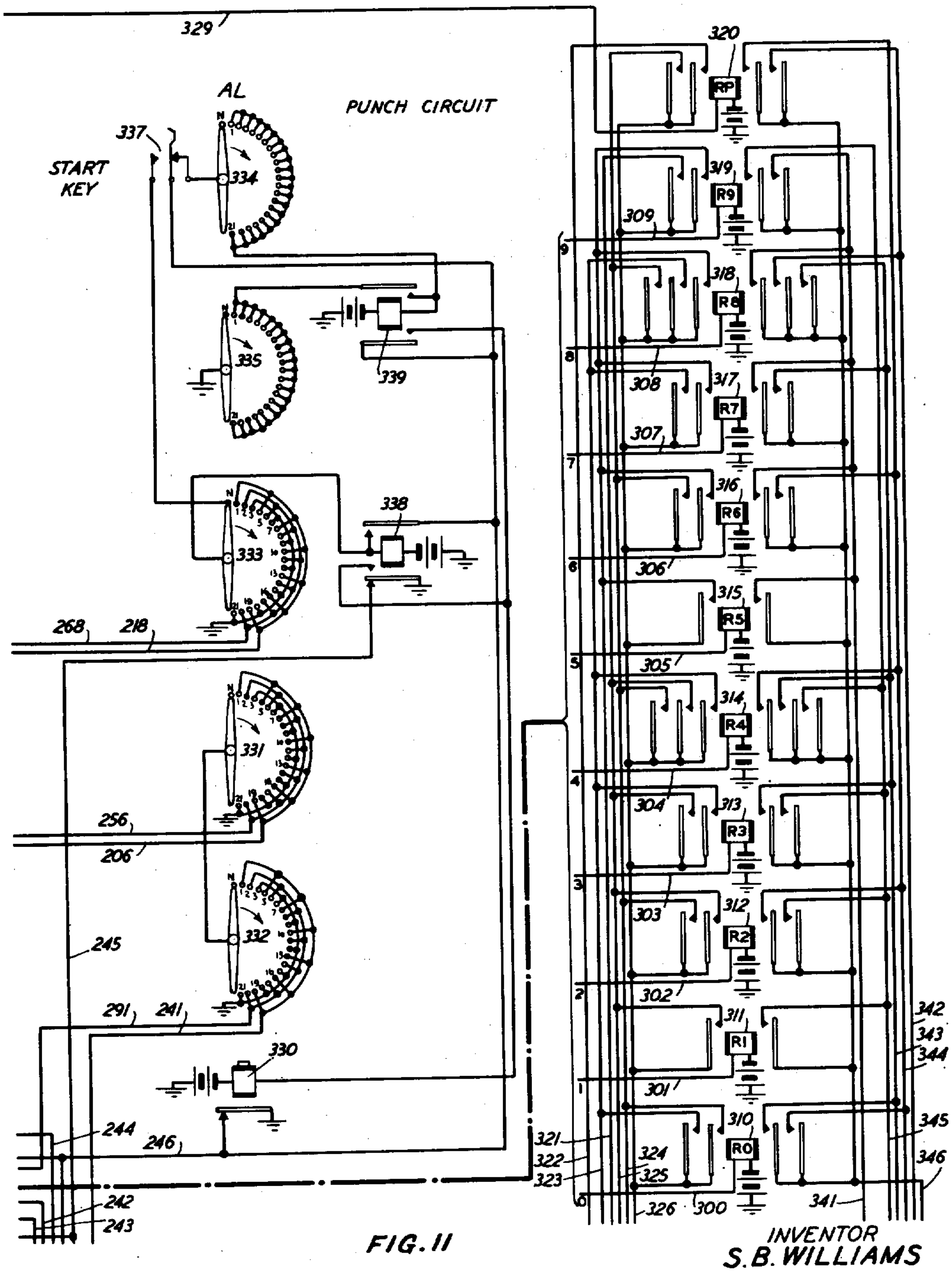
Figs. 11 and 12 represent a punch circuit, including an allotter switch AL, a set of register relays, means including a telegraph perforator for punching a tape, and a telegraph transmitter distributor.
Figure 12:
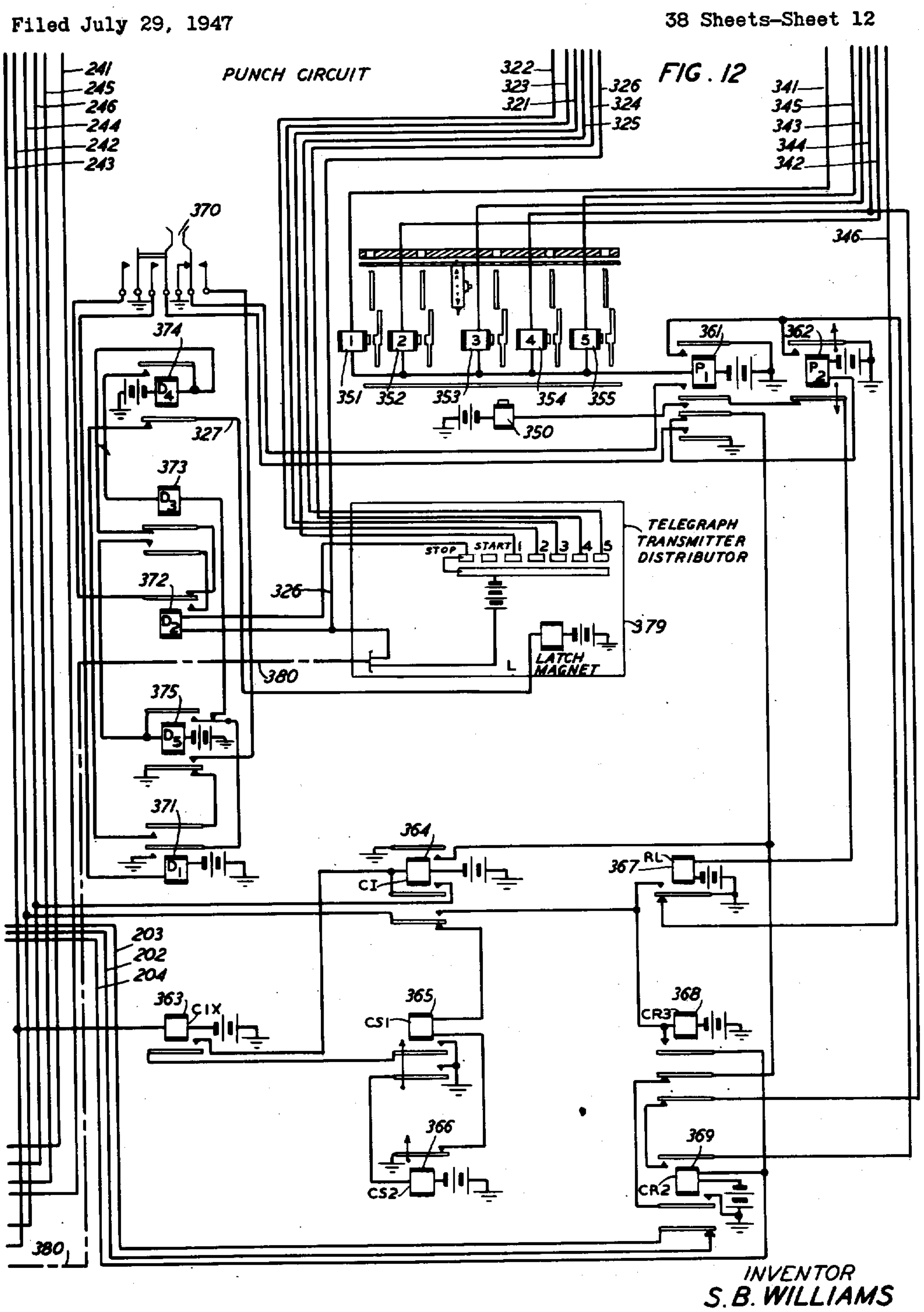

The punch circuit shown in Figs. 11 and 12 comprises an allotter AL and start key 337, a set of register relays numbered 310 to 320, inclusive, a set of punch setting magnets 351 to 355, inclusive, a set of punch setting magnets 351 to 355, inclusive, a punch magnet 350, control relays 361, 362, 363, 364, 365, 366, 367, 368 and 369, a key 370 and relays 371 to 375, inclusive. The start key may be a part of the start key 100 shown in Fig. 2. The allotter AL comprises a rotary switch having a stepping magnet 330 and five brushes 331 to 335 and associated banks of terminals, and two control relays 339 and 338. The windings of register relays 310 to 319, inclusive, are connected by conductors 300 to 309, inclusive, to the trunk group identifying contacts of the trunk connector of Figs. 2 to 8, inclusive, to the terminals of banks 221 and 231 of counting circuit No. 1 and to the terminals of banks 271 and 281 of counting circuit No. 2. Thus the register relays are controlled at times to register the tens and units digits of the trunk group number with which either of the counting circuits is associated and at other times to register the number of busy trunks in a trunk group.

The allotter assigns the counting circuits, the banks 331, 332 and 333 of allotter switch AL being wired for three counting circuits. Since only two counting circuits are provided in the arrangement of Figs. 2 to 8, inclusive, ground is connected to terminals 3, 6, 9, 12, 15, 18 and 21 of bank 333 so that the allotter switch becomes effective to alternately allot the two counting circuits shown in Figs. 9 and 10.

*Operation of connector, counting and punch circuits*

To initiate the operation of the trunk connector circuit and counting circuits, the start keys 100 and 337 are operated. When the start keys are operated, ground is connected through key 100 to conductor 101 to effect the operation of release relay 108 and select relay So; and ground is connected through key 336, normal terminal and brush 333 of allotter switch AL to operate relay 338. Relay UL locks to ground at the back contact of stepping magnet 330 and closes a circuit for operating this stepping magnet. The operation of stepping magnet 330 releases relay 338; and the release of relay 338 releases stepping magnet 330, thereby advancing switch AL from normal to position 1. The aforementioned operation of relay 108 causes the release of relay 106, if operated. The operation of select relay So closes a circuit for operating select magnets SMo of the three cross bar switches and closes a circuit for locking relay So under the control of relay 116. The operation of select magnet SMo closes a circuit for operating relay 111. As soon after relay 111 operates as interrupter 110 closes its contact, a circuit is completed from ground through the contact of interrupter 110, a front contact of relay 111, a back contact of relay 113, conductor 121, and a back contact of the first vertical group relay B1 to the windings of hold magnets HM1, HM2, HM3, HM4, HM5 and HM6 associated with the first group of six vertical units. With select magnets SMo and the hold magnets HM1 to HM6 of the first vertical group operated, the sleeve conductors of the thirty trunks in trunk group numbered 00 are connected through the closed contacts in the 0 level of vertical units 2, 3, 4, 5 and 6 to terminals numbered 1 to 30 in banks 211 and 212 of counting circuit No. 1 shown in Fig. 10. After the interrupter contacts open each of these hold magnets is locked operated through the outer right back contact of relay B1, conductor 127, winding of relay 201 of counting circuit No. 1, conductor 202, back contact of relay 369 of the punch circuit, conductor 203, a back contact of relay 251 of counting circuit No. 2, outer lower back contact of relay 236 of counting circuit No. 1, upper back contact of relay 225, normal terminal and brush of bank 215 to ground. The current in this circuit also operates relay 201 of counting circuit No. 1. The operation of the holding magnets and relay 201 closes a circuit for operating relay 116, this circuit being traced from the winding of relay 116, through the upper back contact of relay 113, conductor 123, outer front contact of each of these holding magnets in succession, conductor 155 and outer upper front contact of relay 201 to ground. The operation of relay 116 causes the release of relay So and select magnets SMo, thus opening the operating circuit of relay 111. After its operating circuit is opened, relay 111 is held operated and relay 113 is operated in a series circuit traced from battery through the winding and locking contact of relay 111, winding of relay 113, conductor 125, to ground at the lower back contact of relay 219 in the No. 1 counting circuit. After select magnets SMo release, the contacts of the 0 row of vertical units 1 to 6 are held operated but all other contacts of the cross bar switch are restored to normal. The operation of relay 113 causes the release of relay 116; and select relay So and select magnets SMo are immediately reoperated. The aforementioned operation of relay 201 also closes a circuit for operating the stepping magnet 210 of switch S1, this circuit being traced from ground through the inner upper front contact of relay 201, brushes of banks 213 and 214, strapped terminals N to 21 of bank 213 and 22 to 30 of bank 214, back contact of relay 234, interrupter contact and winding of stepping magnet 210, to battery. The stepping magnet 210 is thus alternately operated and released to step the brushes of switch S1 until brush 214 engages terminal 31. During this advance of switch S1, brushes 211 and 212 successively engage the thirty terminals to which conductors 200 are connected, these conductors being at this time connected through the contacts of vertical units 2 to 6 of the trunk connector circuit to the test conductors of the trunks in trunk group 00. Although the operating circuit through the winding of relay 201 is opened when brush 215 moves out of normal position, relay 201 and the holding magnets HM1 to HM6 are held operated through the lower front contact of relay 201, upper back contact of relay 219, and strapped terminals 1 to 43 of banks 215 and 216 and associated brushes to ground; that is, relay 201 and these holding magnets remain operated while switch S1 makes one revolution.

When brush 211 is stepped to terminal 1 of its bank, the test conductor of the first trunk in the group numbered 00 is connected through contact 1 of horizontal row 0 of vertical unit 2 of the trunk connector through one of conductors 200, terminal 1 and brush of bank 211, back contact of relay 235, to the winding of relay 234. If this trunk is idle, relay 234 does not operate and switch S1 is immediately advanced to terminal 2; but, if this trunk is busy, the ground connected to the test conductor as a busy condition effects the operation of relay 234. The operation of relay 234 opens the circuit for operating stepping magnet 210, and closes a circuit for operating relay 235, this circuit being traced from the winding of relay 235 through the front contact of relay 234, terminal and brush of bank 213 to ground at the inner upper front contact of relay 201. Relay 235 closes a circuit for operating stepping magnet 230 of switch U1, opens the operating circuit of relay 234, closes a circuit for operating stepping magnet 210 and closes a circuit for maintaining its own energization after relay 234 releases until stepping magnet 230 has operated. When relay 235 releases due to the operation of stepping magnet 230, it causes the deenergization of stepping magnet 210 whereby switch S1 is advanced to position 2, in which position the winding of relay 234 is connected through the back contact of relay 235 and brush 211 and another of conductors 200, and through contact 2 of horizontal row 0 of vertical unit 2 of the trunk connector to a second trunk in group 00. The release of relay 235 also releases stepping magnet 230 so that switch U1 is advanced from normal to position 1, indicating one busy trunk has been encountered. If the second trunk in group 00 is busy, relay 234 is again operated and switch U1 is advanced one step to count the busy condition. If and when ten busy trunks have been counted, relay 223 is operated by the closure of a circuit which is traced from its winding through a back contact of relay 224, terminal 10 and brush of bank 232, inner lower back contact of relay 236, and brush and terminal 10 of bank 233 to ground. The brushes of switch U1 have two normal positions with terminals between normal numbered from 1 to 10. Each time ten busy trunks have been counted, a circuit is closed through brushes 232 and 233 and a terminal 10 for operating relay 223 to advance switch T1 one step. Relay 223 locks through its inner front contact, a back contact of relay 225, back contact of stepping magnet 220, to ground at the lower front contact of relay 223; operates stepping magnet 220; and closes a circuit for operating relay 224. Relay 224 locks until switch U1 is advanced from terminal 10 and opens the operating circuit of relay 223. The operation of stepping magnet 220 opens the locking circuit of relay 223, and the release of relay 223 causes the release of stepping magnet 220, thereby advancing switch T1 one step to register the ten busy trunks counted by the ten steps of switch U1. If another busy trunk is encountered during the advance of switch S1, the advance of switch U1 to count this busy condition causes the release of relay 224. Thus the positions to which switches T1 and U1 are advanced, during the advance of switch S1 to test a group of thirty trunks, indicate the number of busy trunks encountered in the group.

When switch S1 reaches position 31 after testing all of the trunks in group 00, ground is connected from the inner upper front contact of relay 201, through brush 214 and terminal 31, conductor 206 terminal 1 and brush of bank 331 of allotter switch AL, brush 332 and terminal 1, and conductor 241 to the winding of relay 240. Relay 240 operates and locks through its inner lower front contact and conductor 245 to ground at the back contact of relay 338. Relay 240 connects ground to conductor 246 and closes a circuit for operating stepping magnet 210 of switch S1 and relay 365 of the punch circuit. This circuit is traced from battery through the winding of stepping magnet 210, middle lower front contact of relay 240, conductor 242, back contact of relay 364, winding of relay 365 to ground at a back contact of relay 366. Relay 365 closes a circuit for operating relay 366; the operation of relay 366 causes the release of stepping magnet 210 and relay 365; and the release of relay 365 causes the release of relay 366. The release of stepping magnet 210 advances the brushes of switch S1 to position 32 closing a circuit for operating relay 363, from ground through the inner upper front contact of relay 201, brush 214 and terminal 32, outer lower front contact of relay 240, conductor 243, and winding of relay 363 to battery. The release of relay 366 again closes the circuit for operating stepping magnet 210 and relay 365 in series. When relay 365 reoperates, it closes the circuit for operating relay 366 and, since relay 363 has operated, also closes a circuit including the front contact of relay 363 for operating relay 364. The operation of relay 366 causes the release of stepping magnet 210 and relay 365; the release of stepping magnet 210 advances switch S1 to position 33; and the release of relay 365 causes the release of relay 366. Relay 364 locks through its inner lower front contact, conductor 244, outer upper front contact of relay 240, to ground at a back contact of relay 217. The operation of relay 364 closes a circuit for operating relay 362, which circuit includes a back contact of relay 361. Relay 363 releases when switch S1 advances from position 32 to position 33.

With switch S1 in position 33, a circuit is closed for operating that one of register relays 310 to 319 which corresponds to the tens digit of the number of the trunk group connected to counting circuit No. 1. Since this is trunk group 00, a circuit is traced from ground at the inner upper front contact of relay 201, brush 214 and terminal 33 of switch S1, conductor 135, closed contact of the second pair of contacts in row 0 of vertical unit 1 of the trunk sleeve connector, conductor 300, and winding of relay 310 to battery. Relay 310 operates, closing circuits from battery through the winding of relay 361, windings of punch setting magnets 353 and 354, conductors 343 and 344, front contacts of relay 310, and conductor 346 to ground at a back contact of relay 367. Relay 361 and punch setting magnets 353 and 354 are thereby operated. The operation of relay 361 closes a circuit including the upper front contact of relay 364 for operating punch magnet 350 whereby the code for digit 0 is punched on a telegraph tape to indicate the tens digit of the trunk group number. The operation of relay 361 causes the release of relay 362; and the release of relay 362 closes a circuit including a front contact of relay 361 for operating relay 367. The operation of relay 367 disconnects ground from conductor 346, so as to release relay 361 and punch setting magnets 353 and 354, and closes circuits for operating relay 368 and stepping magnet 210 of switch S1. The operation of relay 368 closes a circuit for operating relay 369. The release of relay 361 releases punch magnet 350 and relay 367. The release of relay 367 causes the release of stepping magnet 210 and relay 368. The release of stepping magnet 210 advances switch S1 to position 34; and the release of relay 368 causes the release of relay 369.

With switch S1 of counting circuit No. 1 in position 34, a circuit is closed for operating that one of register relays 310 to 319 which corresponds to the units digit of the number of the trunk group connected to counting circuit No. 1. Since this digit is also 0, relay 310 is operated in a circuit including brush 214 and terminal 34 of switch S1, conductor 136, closed contact of the third pair of contacts in row 0 of vertical unit 1 of the trunk sleeve connector, and conductor 300. Relay 310 again closes circuits for operating relay 361 and punch setting magnets 353 and 354. The operation of relay 361 closes the circuit for operating punch magnet 350, whereby the code for digit 0 is punched on the telegraph tape to indicate the units digit of the trunk group number. Relay 362 releases, relay 367 operates, relay 361 and the punch setting magnets are released, relay 368 and stepping magnet 210 are operated, and relay 369 is operated all in the manner above described. The release of relay 361 releases punch magnet 350 and relay 367; and the release of relay 367 causes the release of stepping magnet 210 and the release of relays 368 and 369. The release of stepping magnet 210 advances the brushes of switch S1 to position 35.

With switch S1 in position 35, a circuit is closed for operating that one of register relays 310 to 319 which corresponds to the tens digit of the number of trunks which tested busy in trunk group 00. This circuit is traced from ground at the inner upper front contact of relay 201, brush 214 and terminal 35, brush 221 and engaged terminal of switch T1, to the winding of the corresponding one of relays 310 to 319. Assume for instance that the tens digit is 1, in which case relay 311 is operated closing circuits for operating punch setting magnet 355 and relay 361. The operation of relay 361 closes the circuit for operating punch magnet 350 whereby the code for digit 1 is punched on the tape. The operation of relay 361 causes the release of relay 362 and the operation of relay 367. The operation of relay 367 causes the operation of relays 368 and 369 and the stepping magnet 210 and causes the release of the punch setting magnets and relay 361. The release of relay 361 causes the release of relays 367 and punch magnet 350; and the release of relay 367 causes the release of relays 368 and 369 and stepping magnet 210 whereby switch S1 is advanced to position 36.

With switch S1 in position 36, a circuit is closed for operating that one of register relays 310 to 319 which corresponds to the units digit of the number of trunks which tested busy in trunk group 00. This circuit is traced from ground at the inner upper front contact of relay 201, brush 214 and terminal 36, brush 231 and engaged terminal of switch U1, to the winding of the corresponding one of relays 310 to 319. Assume for instance that the units digit is 9, in which case relay 319 is operated closing circuits for operating punch setting magnets 351 and 355 and relay 361. The operation of relay 361 closes the circuit for operating punch magnet 350, whereby the code for digit 9 is punched on the tape. The operation of relay 361 causes the release of relay 362 and the operation of relay 367. The operation of relay 367 causes the operation of relays 368 and 369 and stepping magnet 210 and causes the release of the punch setting magnets and relay 361. The release of relay 361 causes the release of relay 367 and punch magnet 350; and the release of relay 367 causes the release of relays 368 and 369 and the release of stepping magnet 210 whereby switch S1 is advanced to position 37.

With switch S1 in position 37, a circuit is closed through brush 214 and terminal 37 for operating relay 320. Relay 320 closes circuits for operating punch setting magnets 352 and 354 and relay 361. The operation of relay 361 closes the circuit for operating punch magnet 350 whereby the code for a period is punched on the tape. The operation of relay 361 causes the release of relay 362 and the operation of relay 367. The operation of relay 367 causes the operation of relays 368 and 369 and stepping magnet 210 and causes the release of the punch setting magnets and relay 361. The release of relay 361 causes the release of relay 362 and the operation of relay 367. The operation of relay 367 causes the operation of relays 368 and 369 and stepping magnet 210 and causes the release of the punch setting magnets and relay 361. The release of relay 361 causes the release of relay 367 and punch magnet 350; and the release of relay 367 causes the release of relays 368 and 369 and the release of stepping magnet 210 whereby switch S1 is advanced to position 38.

With switch S1 in position 38, a circuit is closed through brush 214 and terminal 38 for operating relay 217. The operation of relay 217 causes the operation of relay 338, the release of relay 364 and the operation of stepping magnet 210 in series with its interrupter contact. The circuit for operating relay 338 includes the inner lower front contact of relay 217, conductor 218, terminal 1 and brush 333 of allotter switch AL. Relay 338 locks under control of stepping magnet 330, closes a circuit for operating stepping magnet 330, and disconnects ground from conductor 245, causing the release of relay 240. The aforementioned release of relay 364 causes the release of relay 362. The operation of stepping magnet 210 actuates its interrupter contact; and the resulting release of stepping magnet 210 advances switch S1 to position 39. When switch S1 advances from position 38, relay 217 releases, opening the operating circuit of relay 338. With stepping magnet 330 operated and relay 217 released, relay 338 releases, in turn causing the release of stepping magnet 330, thereby advancing allotter switch AL to position 2. With switch S1 in position 39, release relays 219, 225 and 236 are operated in a circuit through terminal 39 and brush of bank 214. Each of these release relays locks, until its associated brush reaches normal position, and closes the self interrupting circuit for its associated stepping magnet. Thus each of stepping magnets 210, 220 and 230 is alternately operated and released until the associated brushes reach normal position at which time release relays 219, 225 and 236 release. The operation of release relay 219 causes the release of relay 201, the release of hold magnets HM1 to HM6, and the release of relays 111 and 113 of the trunk sleeve connector circuit.

The aforementioned release of relay 116, due to the operation of relay 113 causes the reoperation of select relay So and select magnets SMo. The operation of select magnets SMo closes a circuit through conductors 190, 190' and 118, inner lower front contact of relay 113 and the inner lower back contact of relay 114 for operating relay 112. With relays 111 and 112 operated, a circuit is closed for operating relay 115. Relay 115 locks under control of relay B1 and opens the operating circuit of relay So. As soon thereafter as interrupter 110 again closes its contact, ground is connected therefrom, through front contacts of relays 111, 113 and 112, a back contact of relay 114, conductor 122, inner right back contact of relay B2 of the second group of vertical units, to the windings of hold magnets HM7 to HM12, inclusive. When counting circuit No. 1 has completed its count of the busy trunks in trunk group 00, the release of relay 201 (when switch S1 reaches normal position as hereinbefore described) closes a circuit for locking hold magnets HM7 to HM12 and operating relay 251 of counting circuit No. 2. This circuit includes the windings and locking contacts of these hold magnets in parallel, the outer right back contact of relay B2, conductor 128, winding of relay 251 of counting circuit No. 2, a back contact of relay 201 of counting circuit No. 1, back contacts of relays 286 and 275, through the normal terminal and brush 265 of switch S2 to ground. Relay 251 locks through a lower front contact, back contact of release relay 269 and off-normal terminals of banks 265 and 266 of switch S2. The operation of relay 251 closes a circuit from ground through its outer upper front contact, conductor 156, front contacts of each of hold magnets HM7 to HM12, conductor 124, a back contact of relay 114, a front contact of relay 113 and the winding of relay 116. Relay 116 operates, causing the release of select relay So and select magnets SMo. When the select magnets SMo release, the operating circuit for relay 112 is opened and thereafter relay 112 is held operated through its locking contact, winding of relay 114, conductor 126, to ground at a back contact of release relay 269 of counting circuit No. 2. Relay 114 is thus operated and causes the release of relay 116. As soon thereafter as relay 217 of counting circuit No. 1 is operated as hereinbefore described, select relay S1 is operated through the first pair of contacts in the 0 row of vertical unit No. 1, conductor 134 and the outer lower front contact of relay 217. Select relay S1 locks through conductor 117 and the lower back contact of relay 116 and closes the circuit for operating select magnets SM1. With hold magnets HM7 to HM12, inclusive, and relay 251 of counting circuit No. 2 operated, this counting circuit is operated to successively test the 30 trunks in trunk group 01 and count the busy trunks therein in the same manner that counting circuit No. 1 tested the trunks in group 00 and counted the number of busy trunks therein, as hereinbefore described. With allotter AL in position 2, relay 290 is operated when switch S2 is in position 31; and the trunk group number 01 and number of busy trunks in group 01 are punched on the tape in similar manner to that in which group number 00 and the number of busy trunks in group 00 were punched, as hereinbefore described. Relay 267 is operated when switch S2 reaches position 39, thereby closing the circuit over conductor 144 for again operating select relay S1; and the operation of relay S1 effects the reoperation of select magnets SM1. When release relay 269 is operated, relays 112 and 114 are released.

After relays 111 and 113 have released, due to the operation of release relay 219 of counting circuit No. 1 as hereinbefore described, and with select magnets SM1 reoperated as hereinbefore described, a circuit is closed over conductor 118 and the inner lower back contact of relay 113 for reoperating relay 111. As soon after relay 111 reoperates as interrupter 110 closes its contact, the circuit is closed for reoperating hold magnets HM1 to HM6. When counting circuit No. 2 has completed its count of busy trunks in group 01, the release of relay 251 (when switch S2 reaches normal position as hereinbefore described) closes the circuit for locking hold magnets HM1 to HM6 and operating relay 201 of counting circuit No. 1. The operation of relay 201 again closes the circuit for operating relay 116. The operation of relay 116 releases select relay S1 and select magnets SM1. Relay 111 locks in series with relay 113; and relay 113 again operates through conductor 125 to ground at the back contact of release relay 219 of counting circuit No. 1. Counting circuit No. 1 now tests the trunks in trunk group 02 and counts the number of busy trunks. With allotter AL advanced to position 4, relay 250 is operated and trunk group number 02 and the number of busy trunks in group 02 are punched on the tape.

The trunk sleeve connector thus progresses in its operation to successively connect trunks groups 00 to 19 one at a time to counting circuits No. 1 and No. 2; and the trunk group numbers and number of busy trunks in each are punched on the tape. When trunk group number 18 has been tested and relay 217 of counting circuit No. 1 operates, a circuit is closed for operating relay A1. This circuit is traced from ground through the outer lower front contact of relay 217, conductor 134, first pair of contacts in row 9 of vertical unit 1, conductor 133, outer left back contact of relay B1 and winding of relay A1 to battery. When relay 217 releases, relay A1 is locked in series with the winding of relay B1 through conductor 107 to ground at key 100. The operation of relay B1 extends conductors 120, 121, 127 and 133 to conductors 130, 131, 137 and 143, respectively. When trunk group number 19 has been tested, and relay 267 of counting circuit No. 2 operates, a circuit is closed for operating relay A2. This circuit is traced from ground through the outer lower front contact of relay 267, conductor 144, first pair of contacts in row 9 of vertical unit 7, conductor 133, a front contact of relay B1, conductor 143, outer left back contact of relay B2 and winding of relay A2 to battery. Relay A2 operates and, when relay 267 releases, relay A2 is locked in series with the winding of relay B2, through conductor 107 to ground at key 100. The operation of relay B2 extends conductors 122, 128, 130 and 143 to conductors 132, 138, 140 and 153, respectively.

The operation of relay B1, above-mentioned, causes the release of relay 115 thereby closing the circuit for operating select relay So. Each of trunk groups 20 to 39 is now connected, in succession, to counting circuits Nos. 1 and 2 in similar manner to that in which trunk groups 00 to 19 were connected thereto, the busy count being made for each group. The trunk group number and busy count number for each group is punched on the tape in like manner to that in which the group numbers 00 and 01 and busy count numbers were punched as hereinbefore described. When group 38 has been tested, relays A3 and B3 are operated; and when group 39 has been tested relays A4 and B4 are operated in similar manner to that in which relays A1 and B1 and A2 and B2 were operated as above described. Thereafter trunk groups 40 to 59 are tested and relays A5 and B5 and relays A6 and B6 are operated; then trunk groups 60 to 79 are tested, and relays A7 and B7 and relays A8 and B8 are operated; and finally trunk groups 80 to 99 are tested and relays A9 and B9 and A10 and B10 are operated. When all of the groups have been tested, release relay 106 is operated in a circuit traced from its winding through the normally closed contact of release key 102, conductor 105, front contacts of relays B10, B9, B8, B7, B6, B5, B4, B3, B2 and B1, conductor 120, front contact of relay 115, and front contact of relays 112 and 111 to ground. Relay 106 locks under control of relay 108 and disconnects ground from conductor 107, releasing all of the A and B relays. When all of the A relays have released, relay 108 operates thereby causing the release of relay 106.

The entire cycle of operations is then repeated beginning with the testing of trunk group 00 and ending with trunk group 99. The test and busy count continues until start keys 100 and 337 are restored to normal in which case the test stops immediately or until release key 102 is operated in which case the test stops at the end of the cycle then in progress. The operation of key 102 connects the winding of relay 103 to conductor 105; and, as soon thereafter as the test of trunk group 99 is completed and relay B10 is operated, relay 103 is operated in a circuit traced from its winding through the front contact of key 102, conductor 105, front contact of relays B10 to B1, inclusive, conductor 120, front contacts of relays 115, 112 and 111 to ground. Relay 103 locks to ground at key 100, and connects ground to conductor 104. When relay 251 of counting circuit No. 2 releases due to the operation of release relay 269 when switch S2 reaches position 39, the ground connected to conductor 104 is extended through a back contact of relay 251, conductor 205, a back contact of relay 201 and conductor 204, to the winding of relay 369 of the punch circuit. Relay 369 operates, opens the circuit for operating relay 201 and closes a circuit for operating relay 362. The operation of relay 362 closes a circuit including a front contact of relay 369 for operating punch setting magnet 354 in series with relay 361. The operation of relay 361 closes a circuit for operating punch magnet 350 and opens the operating circuit of relay 362. Thus the code for a computer release or carriage return signal is punched on the tape. Since relay 362 is slow to release, the punch magnet circuit is held closed long enough to insure punching of the tape. When relay 362 releases, a circuit is closed for operating relay 367. The operation of relay 367 closes a circuit for operating relay 368. The operation of relay 368 causes the release of relay 361, punch setting magnet 354 and punch magnet 350. Relay 368 locks over conductor 204 in parallel with the winding of relay 369, under control of relay 103. When the start keys 100 and 337 are released, release relays 103, 368 and 369 release, and so also do relays A1 to A10, inclusive, and B1 to B10, inclusive. Before the trunk sleeve connector is again used, the release key 102 is also restored to normal.

Figures 26, 27:
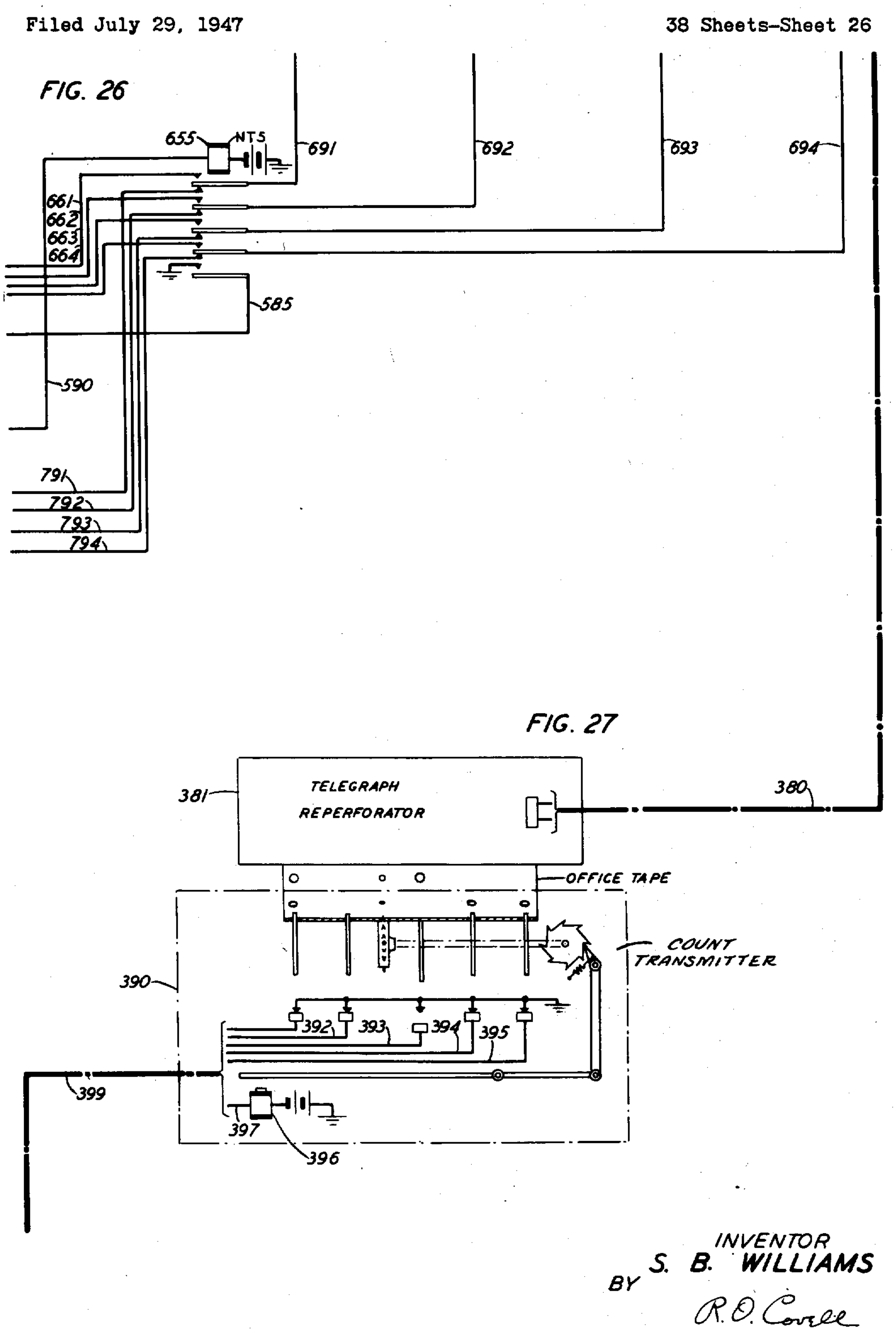
Fig. 27 represents a telegraph reperforator and a count transmitter.
Figure 28:
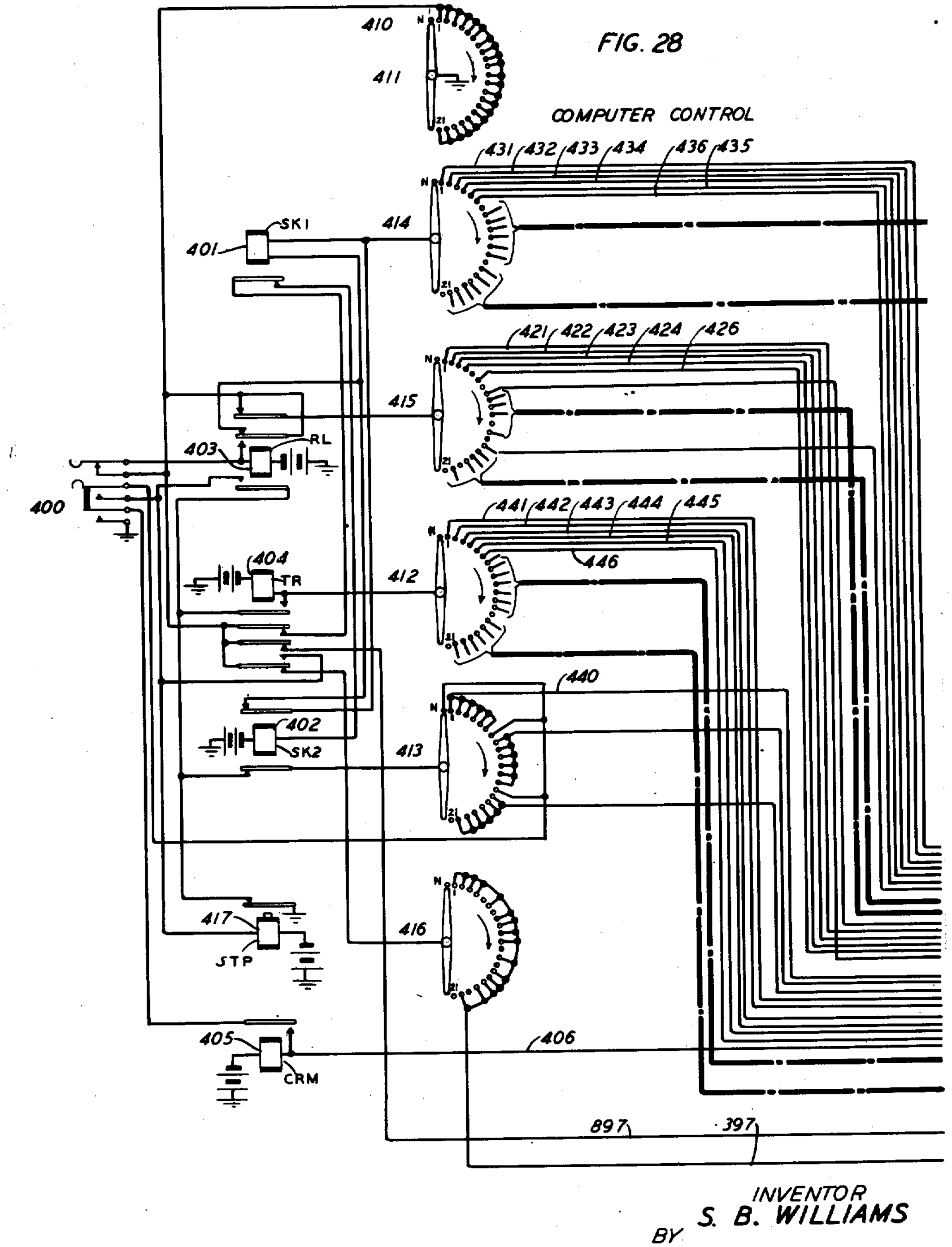
Figs. 28 to 31 represent a computer control circuit for three computers.
Figure 29:
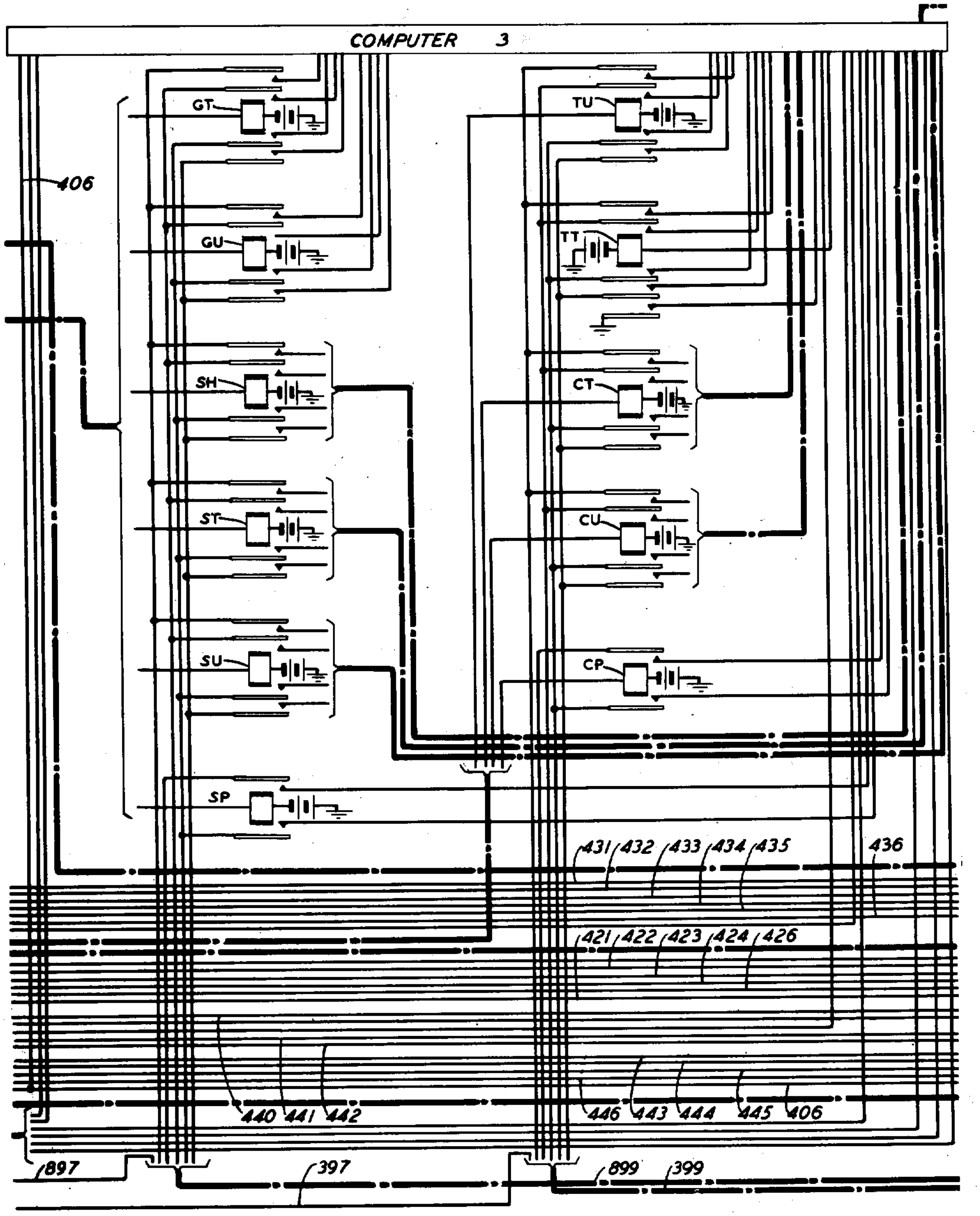
Figure 30:
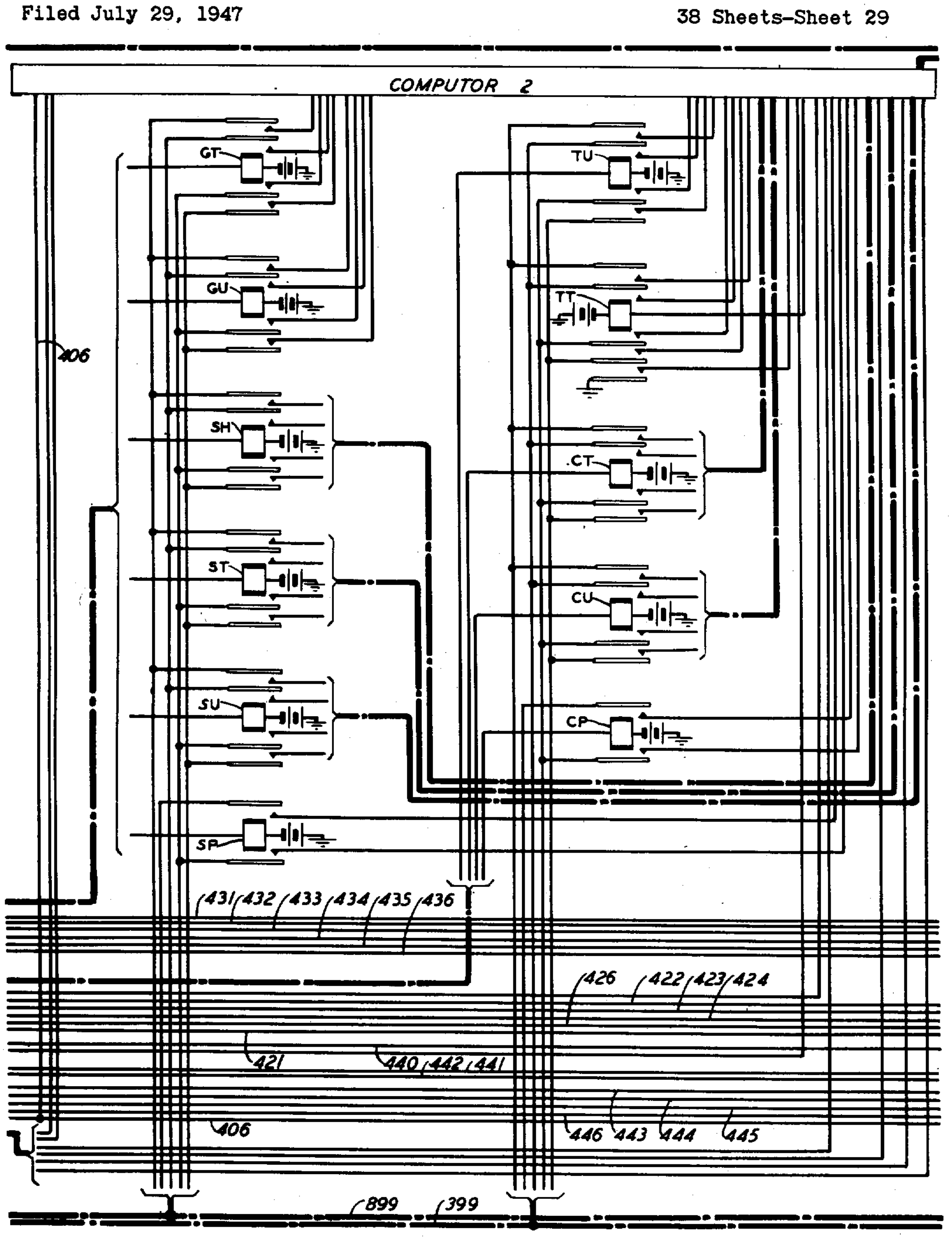

If the computer circuit is in the same office as the trunk sleeve connector, counting and punch circuits, the aforementioned tape made by the punch circuit is fed directly into the count transmitter shown in Fig. 27. But, if the computer is located at a remote point, this first tape is not used; and key 370 is operated before or at the same time that start keys 100 and 337 are operated. With key 370 operated, the register relays 310 to 320 control the operation of a telegraph transmitter-distributor 379 to send code signals over telegraph line 380 to the telegraph reperforator shown in Fig. 27, which reperforator punches a tape which is fed into the count transmitter. The operation of key 370 prepares a circuit for operating relay 374. While the distributor shaft is locked, the distributor brush is at rest in engagement with the "Stop" segment and a circuit is closed therethrough which operates relay 372. When relay 361 operates in series with the punch setting magnets as hereinbefore described, it closes a circuit for operating relay 371. The operation of relay 371 connects ground from the lower back contact of relay 375, through a back contact of relay 374 to conductor 327 to operate the latch magnet of the telegraph transmitter-distributor 379. The distributor shaft is thereby released to make one revolution. Reference may be had to the patent to E. F. Watson, No. 2,055,567, granted September 29, 1936, for a disclosure of a distributor including the latch mechanism. Relay 372 releases when the distributor brush advances from its rest position thereby closing a circuit from ground at a front contact of key 370, through back contacts of relays 372 and 373 for operating relay 374. The operation of relay 374 opens the latch magnet operating circuit. As soon as the distributor brush again reaches its rest position in engagement with the "Stop" segment, relay 372 is reoperated thereby opening the operating circuit of relay 374. Relay 374 is now held operated through its front contact, in series with the winding of relay 373 and a back contact of relay 375, to ground at a front contact of relay 371. Relay 373 is thus operated and it closes a circuit for operating relay 375. Relay 375 locks as long as relay 371 remains operated and closes a circuit for operating release relay 367; whereby the punch setting relays and relay 361 are released. The aforementioned release of relay 375 also causes the release of relays 373 and 374. The release of relay 361 causes the successive release of relays 371 and 375. During the time that relay 372 is released, the distributor brush makes successive contact with segments 1, 2, 3, 4 and 5 whereby signals are transmitted over line 380 to operate the telegraph reperforator 381 and thereby punch a tape to record the digits registered by relays 310 to 320 of the punch circuit. Thus each digit of the trunk group number and busy count is transmitted over line 380 to operate the perforator 381 to make a record on the office tape in the office where the computers are located.

*Computing equipment*

The computing equipment comprises three computers, a computer control circuit, a count transmitter for feeding the group busy counts recorded on the office tape into the computers, a punch circuit including a perforator for making a summary tape, and a sum transmitter for feeding the totalized group busy counts recorded on the summary tape into the computers. Three computers are provided in order that there will be no appreciable delay in producing the final tape due to the time required for making the additions and for the dividing operation to obtain the final average. The office tape coming from the punch circuit in case the computer is in the same office as the trunk groups being observed, or from the telegraph reperforator 381 in case the computer is in a different office from that in which the trunks are being observed, is fed into the count transmitter 390 and the summary tape coming from the perforator is fed into the sum transmitter. The computer control circuit directs successive trunk group records to different computers; for instance, the first count for groups 00, 03, 06, etc., are directed to computer No. 1, the first count for groups 01, 04, 07, etc., are directed to the second computer and the first count for groups 02, 05, 08, etc., are directed to the third computer. Since there are 100 groups being observed, the second count of group 00 will be directed to computer 2, the second count of group 01 to computer 3 and the second count of group 02 to computer 1, etc. in succession.

Figure 31:
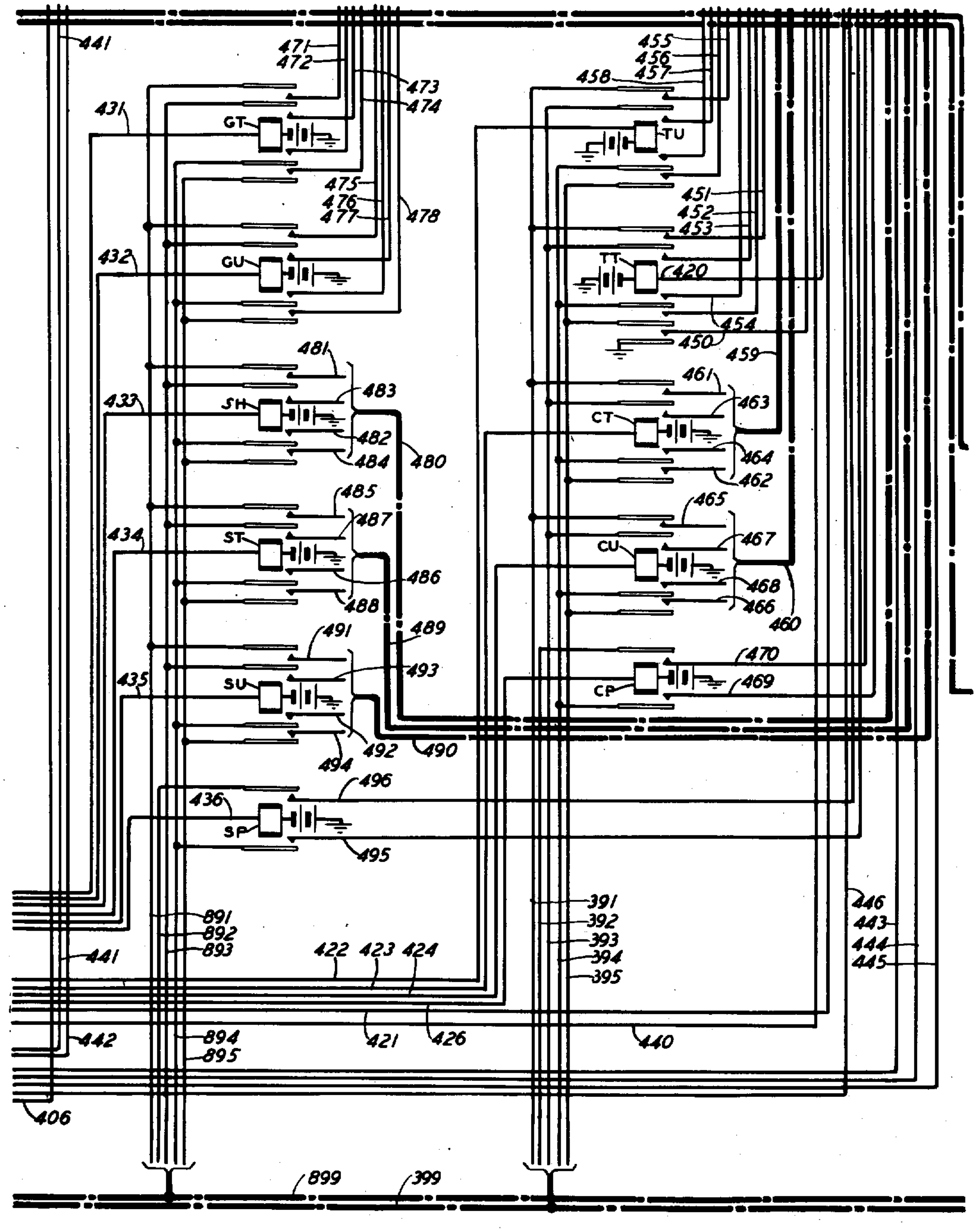
Figure 32:
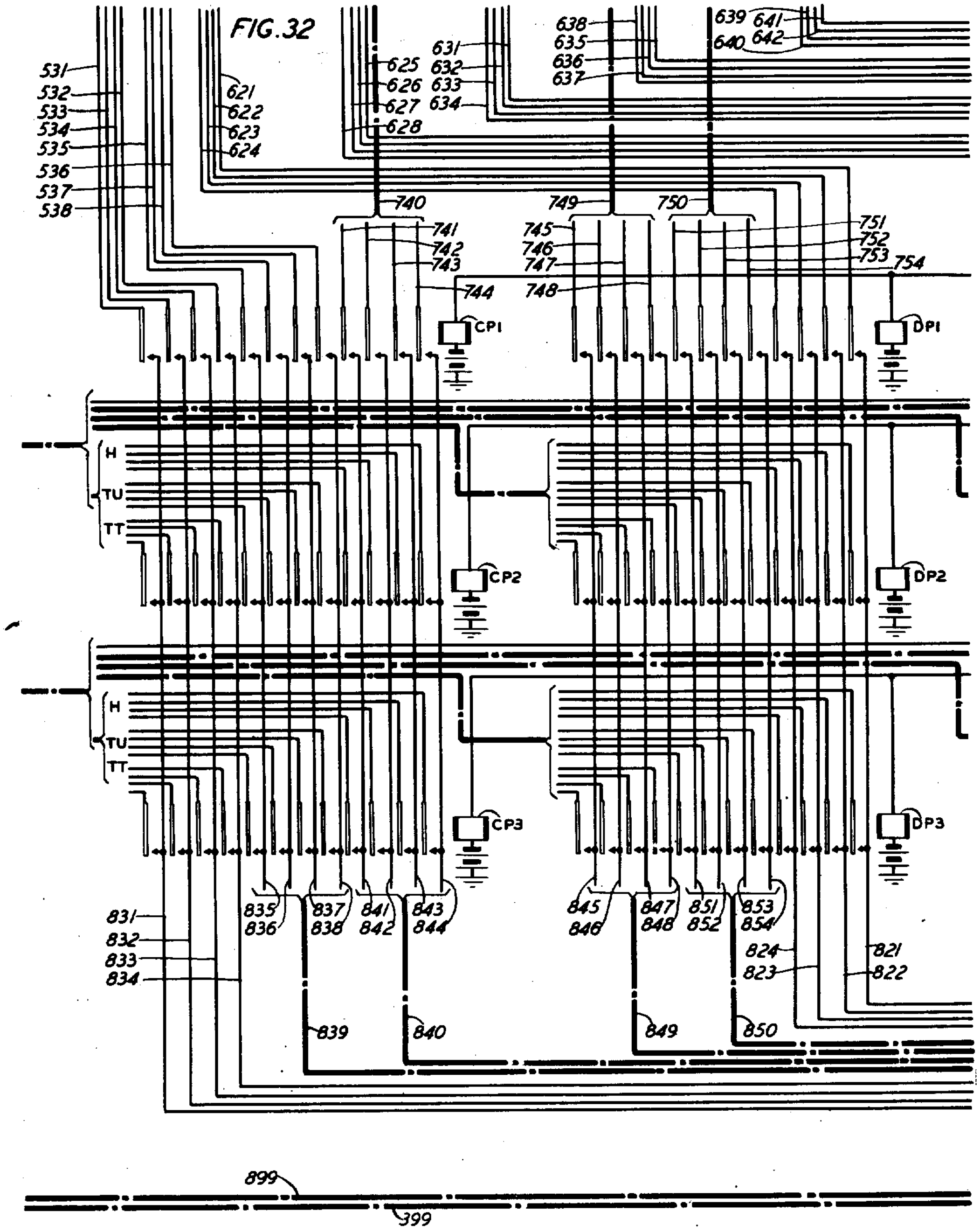
Figs. 32 to 38 represent a punch and perforator circuit.
Figure 33:
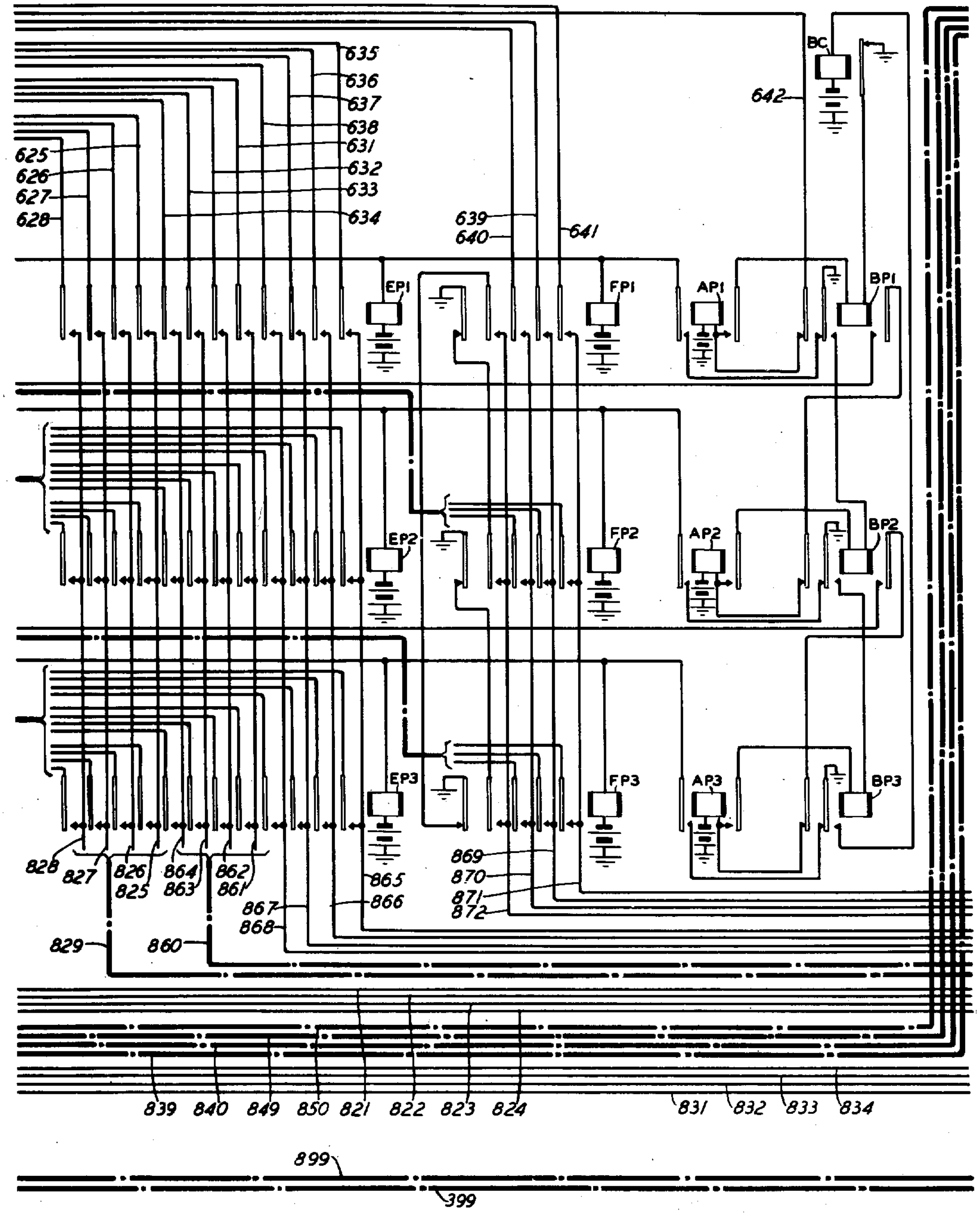
Figure 34:
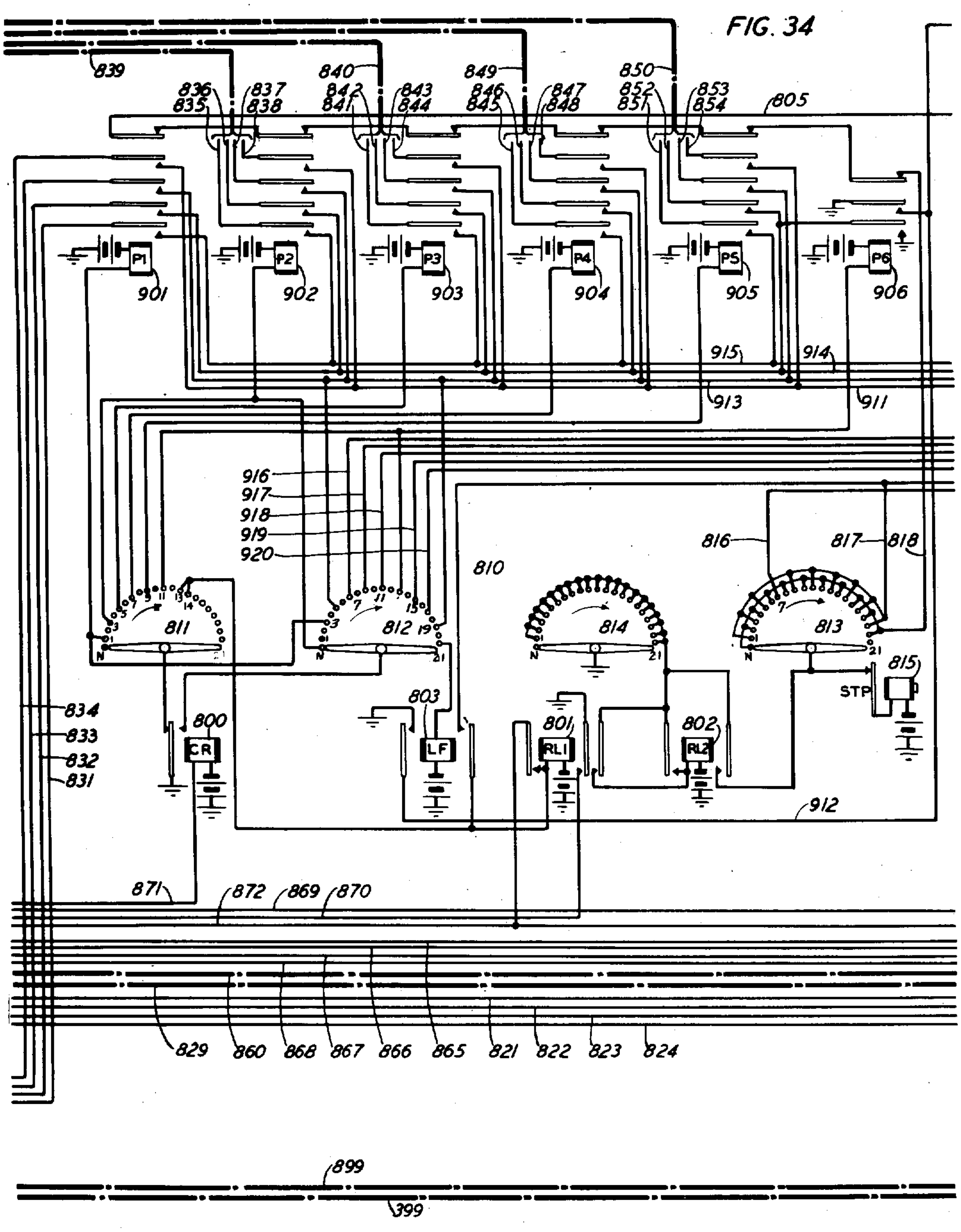
Figure 35:
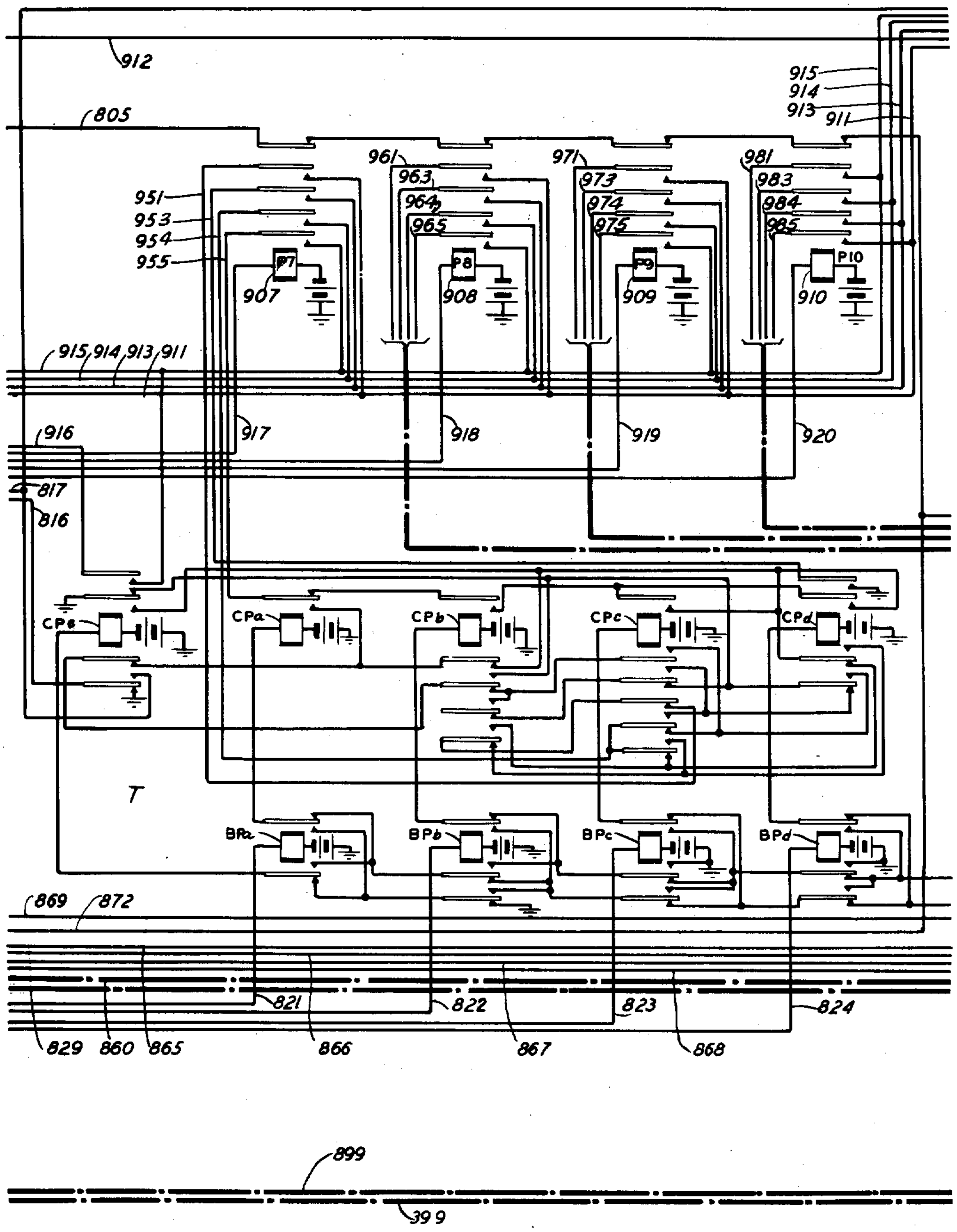
Figure 36:
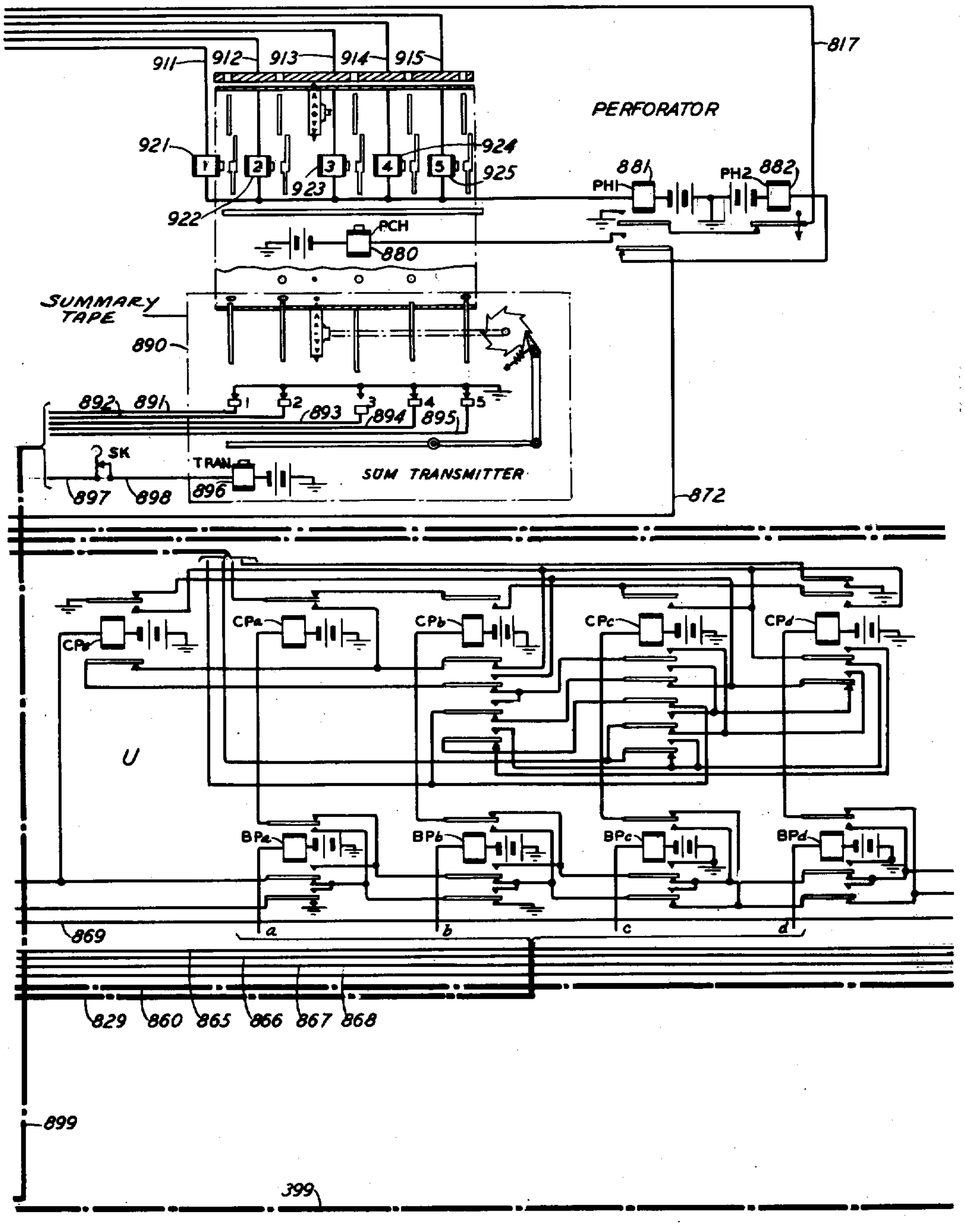
Figure 37:
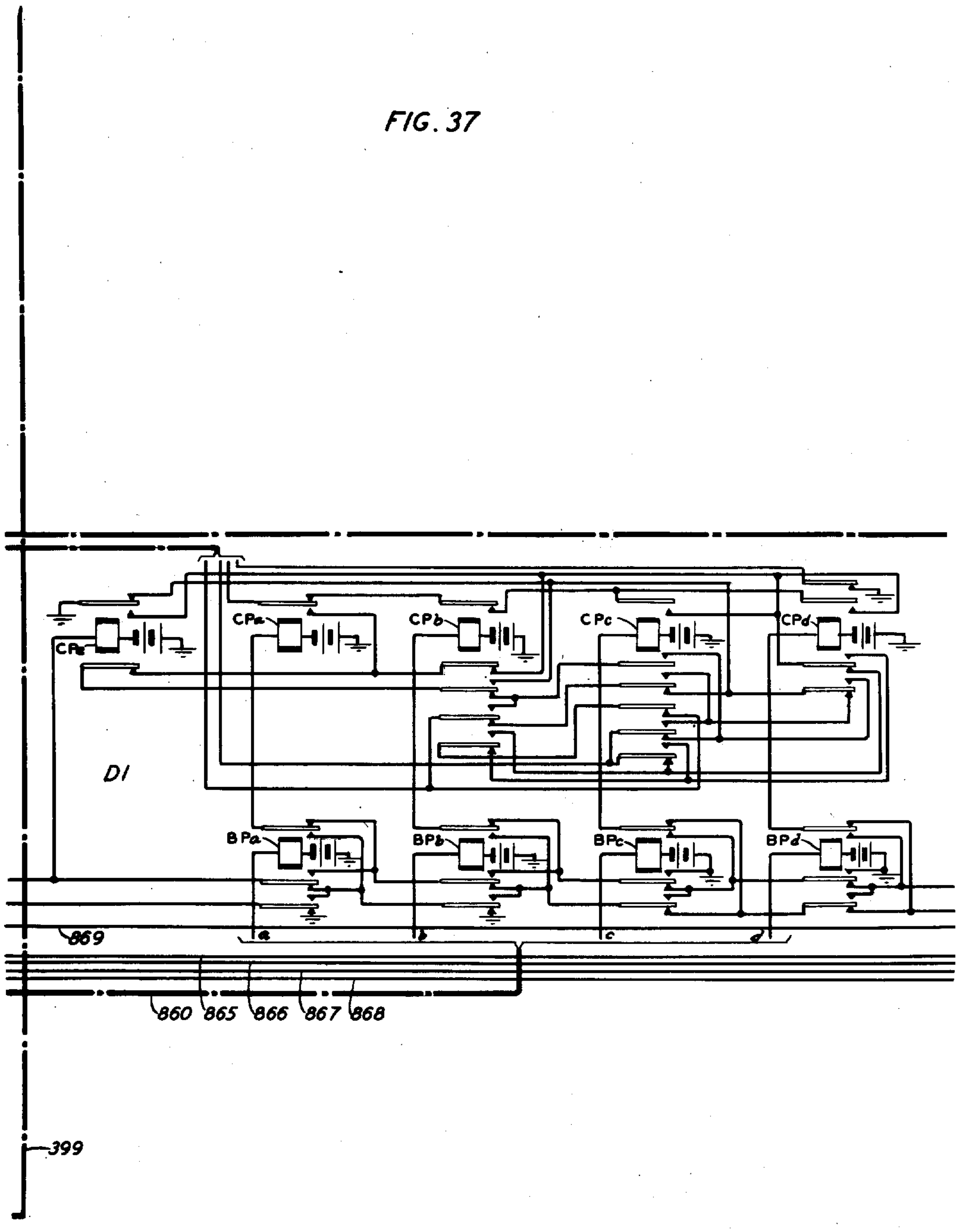
Figure 38:
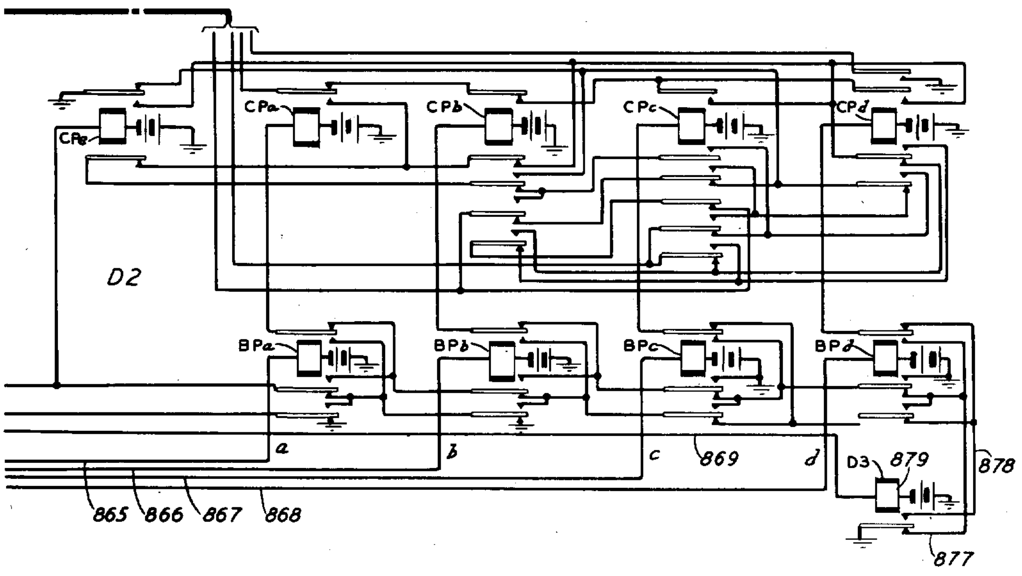
Figure 39:
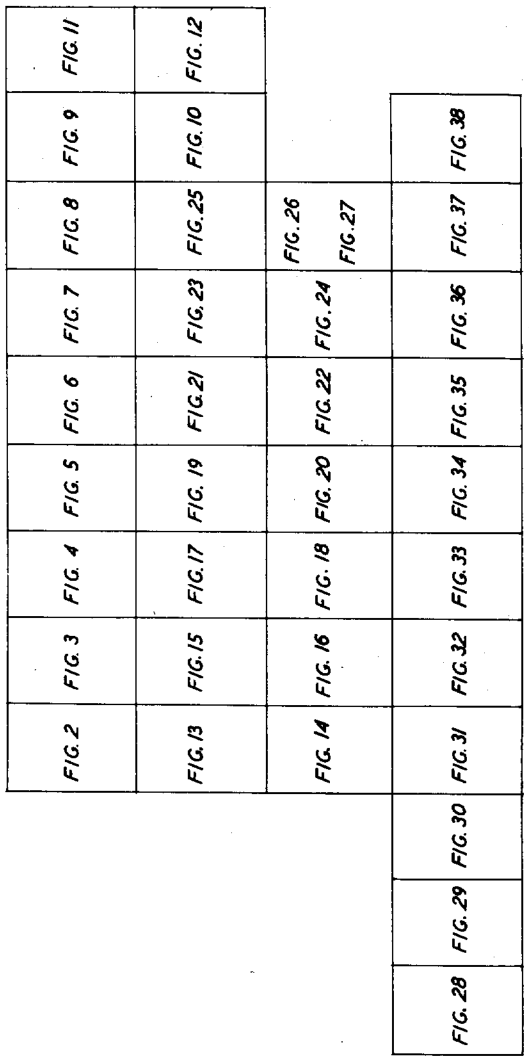

The computer control circuit, shown in Figs. 28, 29, 30 and 31, comprises a start key 400, a rotary switch 410, control relays 401 to 405, inclusive, common to all of the computers and three groups of control relays, a group for each computer. The group of relays for computer No. 1 are shown in Fig. 31, the relays for computer No. 2 in Fig. 30, and the relays for computer No. 3 in Fig. 29. The switch 410 comprises six wipers and associated banks of terminals 411 to 416, and a stepping magnet 417. Terminals 1 to 6 of banks 412, 413 and 414 are associated with the group of control relays individual to computer No. 1, terminals 8 to 13 are associated with the group of control relays individual to computer No. 2 and terminals 15 to 20 are associated with the group of control relays individual to computer No. 3. Each of the three groups of control relays includes relays TT, TU, CT, CU and CP for connecting the associated computer with the count transmitter 390; and includes relays GT, GU, SH, ST, SU and SP for connecting the associated computer with the sum transmitter 890.

Figure 13:
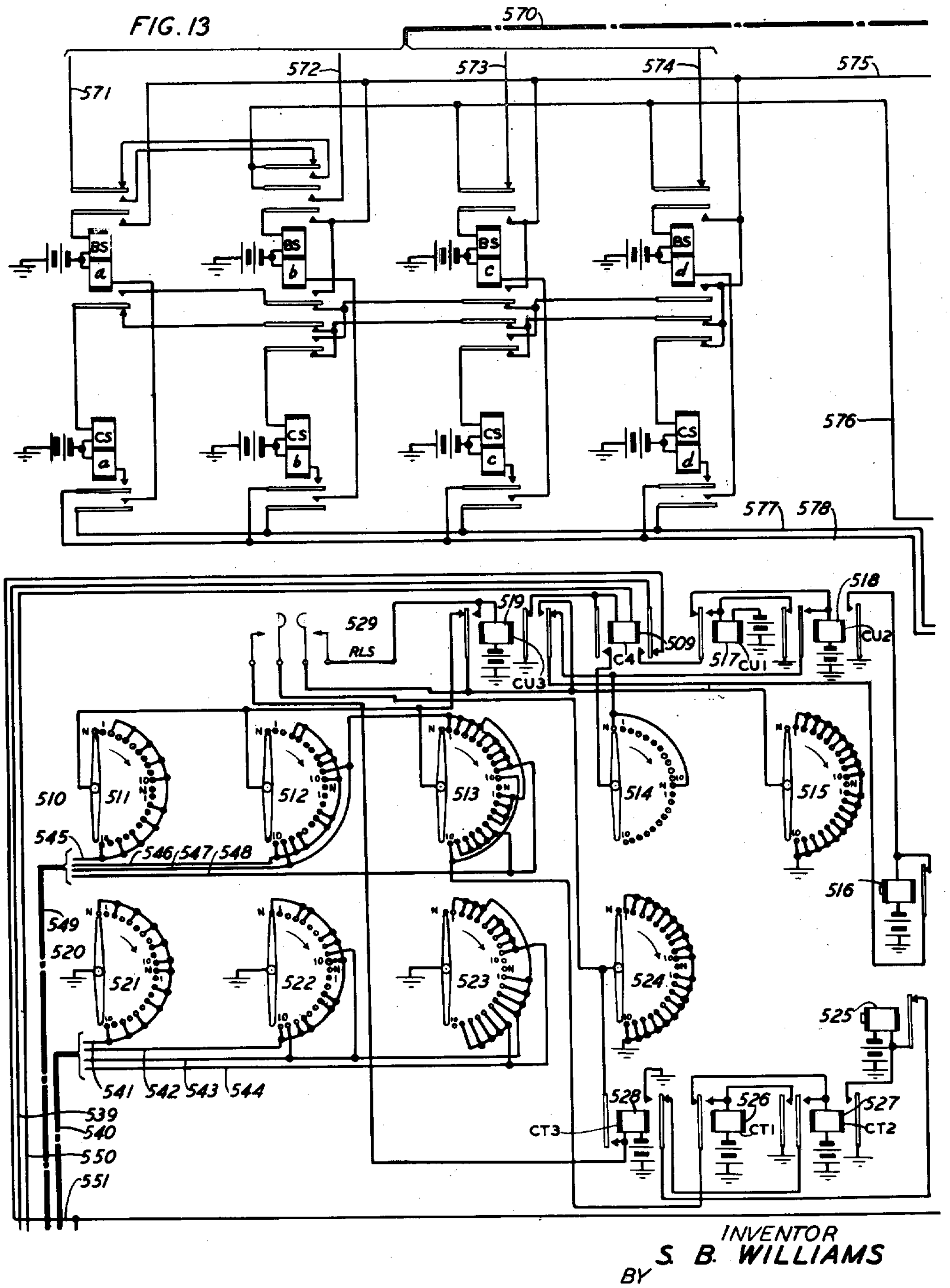
Figs. 13 to 26 represent a computer circuit.
Figure 14:
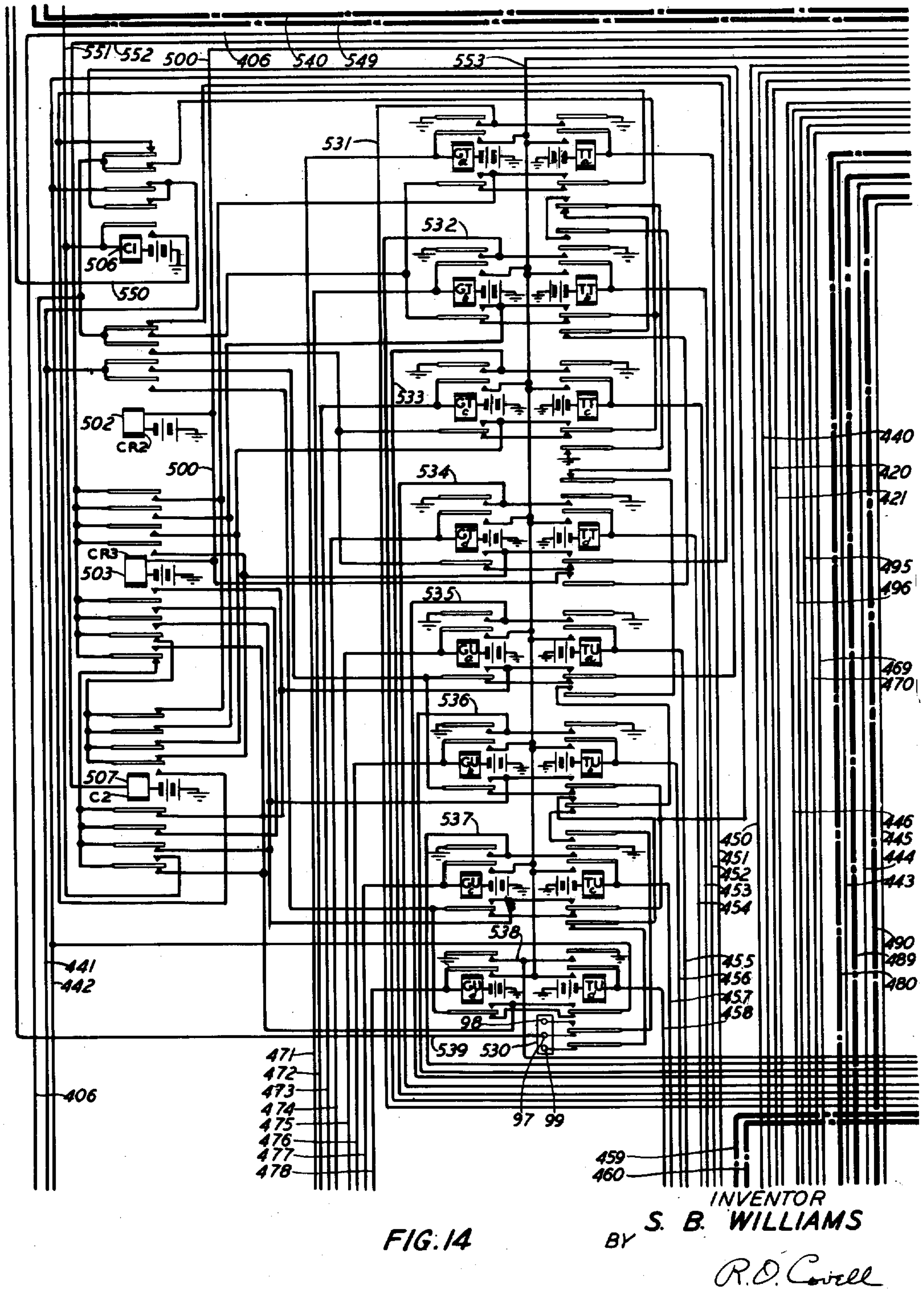
Figure 15:
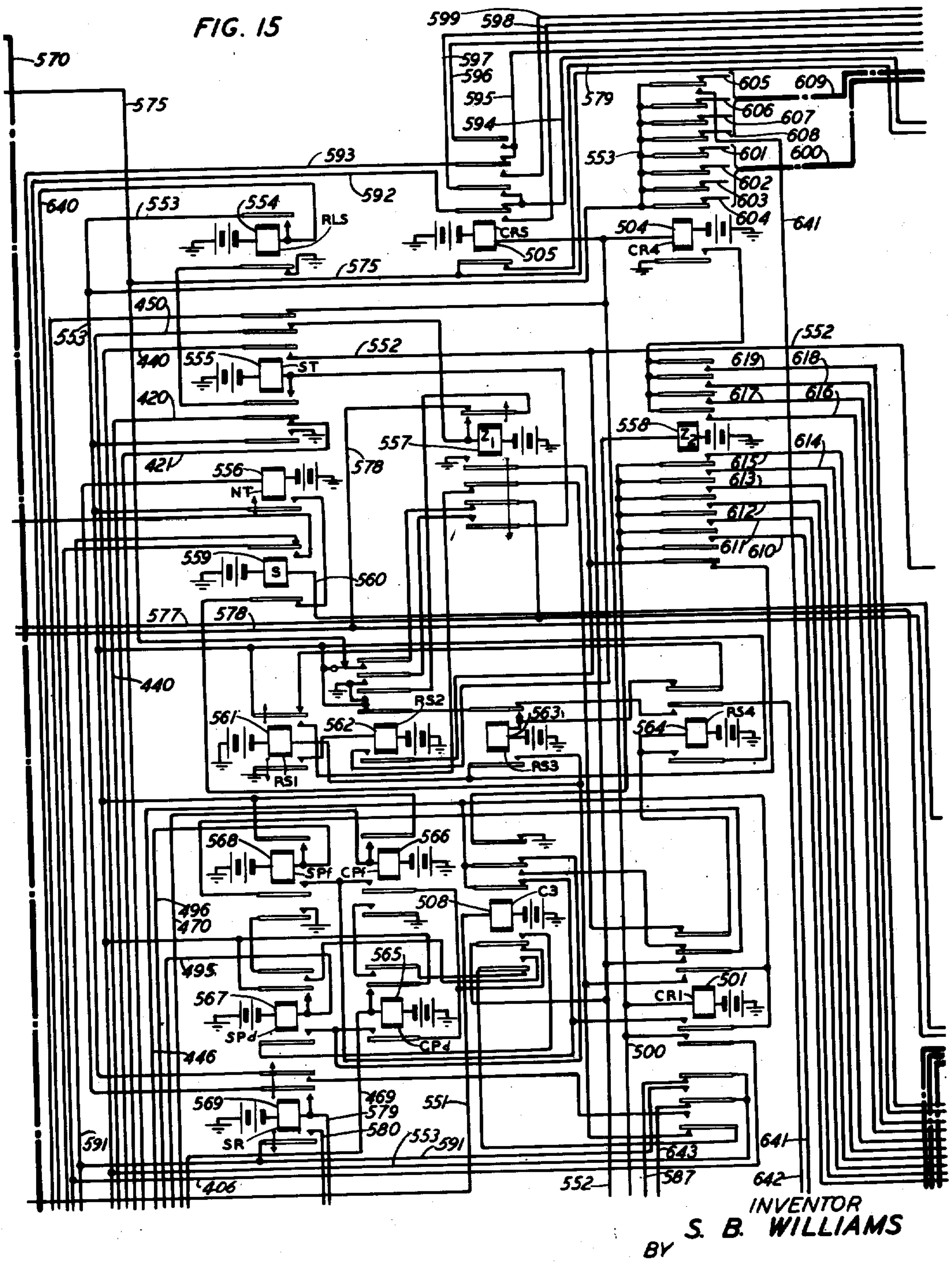

Each computer, one of which is shown in Figs. 13 to 26, inclusive, comprises a trunk group identifying circuit in Fig. 14, a control circuit in Figs. 13, 14, 15 and 16 and a computing relay circuit in Figs. 17 to 26. The computer shown is of the relay type and uses the binary principle of addition disclosed in the application of G. R. Stibitz, Serial No. 389,321, filed April 19, 1941, now abandoned, and in the continuing application filed November 23, 1944, Serial No. 564,853.

The trunk group identifying circuit comprises four groups of register relays, referred to herein as the TT relays, the TU relays, the GT relays and the GU relays. Each group consists of four relays identified as the *a*, *b*, *c* and *d* relays of the group. The trunk group number transmitted from the office tape is registered by relays GT and GU and the trunk group number transmitted from the summary tape is registered by relays TT and TU.

The individual computer control circuit shown in Figs. 13, 14, 15 and 16 comprises two rotary switches 520 and 510 and associated control relays; start relays 555, 557 and 558; release relay 554; computer reset relays 561, 562, 563 and 564; control relays 501, 502, 503, 504 and 505 which are operated upon receipt of the CR code at the end of the last trunk group record on the office tape; control relays 506, 507, 508 and 509 which are operated when the first busy count for any one of the last three groups of trunks has been punched on the summary tape; control relays 565, 566, 567 and 568 which are operated by the code for a period transmitted from the office and summary tapes at the end of the count for each trunk group; relays 559, 569, 556 and N1, N3, N5, N7 and N9 for shifting the registration on the A computing relays one column to the right after obtaining each digit of the quotient during the computing of the average busy count for a trunk group; relays T*a* to T*d*, U*a* to U*d*, D1*a* to D1*d*, D2*a* to D2*d* and D3*a* for registering the quotient when the computer is operated to divide the total busy count for a group by the number of counts; relays N2, N4, N6, N8 and N10 for successively connecting the T, U, D1, D2 and D3 relays for selective operation as each digit of the quotient is determined; and relays BS*a* to BS*d* and CS*a* to CS*d* for registering the number of times that the number of busy counts is subtracted from the total busy count or its remainder to determine each digit of the quotient and for controlling the selective operation of the aforementioned T, U, D1, D2 and D3 relays.

Each computer comprises five computing relay sets, an H or hundreds set, a T or tens set, a U or units set, a D1 or tenths set, and a D2 or hundredths set. Each set consists of three groups of register relays, an A group, a B group, and a C group. The A group of relays in each set, consists of four relays which register the addend; the B group of relays in each set consists of four relays which register the augend; and the C group of relays in each set consists of five relays which register the sum. These three groups of relays of each of the computing relay sets are hereinafter referred to as the A, B and C relays. The hundreds, tens and units relay sets are used both for totaling the busy count for a trunk group and for computing the average busy count; but the tenths and hundredths computing relay sets are used only when the computer is seized to compute the average number of busy trunks in a group. The first count for each of the trunk groups transmitted by the count transmitter from the office tape is repeated on the summary tape since at this time there is no record on the summary tape.

The computer further comprises control relays 644, 646 and 651 to 659 for controlling the operation of the A relays of the computing relay sets. When the computer is seized to total the busy counts for a trunk group, relay 646 and relays 652, 653, 657 and 658 are operated, whereby the A relays of the tens and units relay sets are operated to register the count transmitted from the office tape and the A relays of the hundreds relay set are operated to register 0. When the computer is seized to compute the average busy count for a trunk group, relay 644 is operated and relays 651 to 659 are progressively operated in pairs as hereinafter described to connect the banks of switches 520 and 510 of the relay control circuit to the A relays of the hundreds and tens, the tens and units, the units and tenths, the tens and hundredths relay sets in succession and finally to connect the banks of the switch 520 to the A relays of the hundredths set as hereinafter described.

*Punch circuit and sum transmitter*

The punch circuit shown in Figs. 32 to 38 is common to the three computers and the computers are operatively associated with the punch circuit one at a time in numerical succession. The punch circuit comprises start control relays AP1 to AP3, BP1 to BP3 and BC; auxiliary control relays CP1 to CP3, DP1 to DP3, EP1 to EP3 and FP1 to FP3 for connecting the three computers one at a time to the punch circuit; a tape perforator, which is represented by punch setting relays 921 to 925, control relays 881 and 882 and punch magnet 880; and control relays 901 to 905 and switch 810 which are provided for controlling the progressive connection of the trunk group number registers and the B relays of the hundreds, tens and units computing relay sets to the punch setting relays when the punch circuit is being operated to punch the total busy count for a trunk group. The punch circuit also includes T, U, D1 and D2 computing relay sets, each set consisting of a B group and a C group of relays. The B relays are set according to the quotient digits representing the average busy count for a trunk group as registered by the quotient register relays of the computer. The punch circuit further comprises a relay D3 which is controlled by relay D3*a* of the relay control circuit; so that, if the third decimal place of the quotient representing the average busy count for a trunk group is 5 or greater, the C relays are operated to register a number which is .01 larger than the number registered by the B relays. The C relays of the T, U, D1 and D2 relay sets of the punch circuit are successively connected to the punch setting relays under the control of relays 907 to 910 and switch 810 to effect the punching of the average busy count on the summary tape. The punch circuit further includes CR code relay 800, line feed code relay 803, period code relay 906 and release relays 801 and 802.

*Operation of the computer*

Assume and office tape having twelve counts for each of 100 trunk groups Nos. 00 to 99 recorded thereon in numerical and chronological order. The record for each trunk group consists of two digits indicating the trunk group number, two digits indicating the number of busy trunks in the group and the code for a period. The last trunk group count on the tape is followed by the CR or carriage return code. The perforator code according to which numbers are recorded on the office and summary tapes and by which these numbers are transmitted over conductors 391 to 395 from the count transmitter and over conductors 891 to 895 from the sum transmitter is as follows:

PERFORATOR CODE

| Digit or Signal | Perforation Positions | | | | |
|---|---|---|---|---|---|
| | 1 | 2 | 3 | 4 | 5 |
| 0 | | | * | * | |
| 1 | | | | | * |
| 2 | | | | * | * |
| 3 | | | * | | * |
| 4 | | | * | * | * |
| 5 | * | | | | |
| 6 | * | | | * | |
| 7 | * | | * | | |
| 8 | * | | * | * | |
| 9 | * | | | | * |
| Period | | * | | * | |
| Carriage return | | | | * | |
| Line feed | | * | | | |
| Space | | | * | | |

*Indicates perforations.

The code according to which trunk group number registers and according to which the A and B relays of the computing relay sets are operated is as follows:

COMPUTER CODE

| Digit | Trunk Group Number and A and B Register Relays Operated | | | |
|---|---|---|---|---|
| | *a* | *b* | *c* | *d* |
| 0 | | | * | * |
| 1 | | * | | |
| 2 | | * | | * |
| 3 | | * | * | |
| 4 | | * | * | * |
| 5 | * | | | |
| 6 | * | | | * |
| 7 | * | | * | |
| 8 | * | | * | * |
| 9 | * | * | | |

*Indicates relay operated.

The code according to which the C relays of the computing relay sets are operated is as follows:

COMPUTER CODE

| Digit | Register Relays Operated | | | | |
|---|---|---|---|---|---|
| | *a* | *b* | *c* | *d* | *e* |
| 0 | | * | * | | |
| 1 | | * | * | * | |
| 2 | * | | | | |
| 3 | * | | | * | |
| 4 | * | | * | | |
| 5 | * | | * | * | |
| 6 | * | * | | | |
| 7 | * | * | | * | |
| 8 | * | * | * | | |
| 9 | * | * | * | * | |
| 10 | | | | | * |
| 11 | | | | * | * |
| 12 | | | * | | * |
| 13 | | | * | * | * |
| 14 | | * | | | * |
| 15 | | * | | * | * |
| 16 | | * | * | | * |
| 17 | | * | * | * | * |
| 18 | * | | | | * |
| 19 | * | | | * | * |

*Indicates relay operated.

The office tape is inserted in the count transmitter and a blank tape, which is to be the summary tape, is inserted in the perforator of the punch circuit and drawn from the perforator to the sum transmitter with sufficient slack to provide for at least 100 trunk group records. The start key 400 is then operated. The operation of key 400 opens the circuit for energizing relay 403 and closes a circuit for operating stepping magnet 417 of switch 410. This circuit is traced from ground through the interrupter contact of the stepping magnet 417, a back contact of relay 402, brush 413 in normal position, a front contact of key 400 and the winding of the stepping magnet. When the interrupter contact opens this circuit, stepping magnet 417 releases thereby causing the advance of brushes 411 to 416, inclusive, to off-normal position 1.

*Registering the trunk group number in the computer*

With switch 410 in position 1, circuits are closed for operating the common control relay 402 and the control relay TT associated with computer No. 1. The circuit for operating relay 402 is traced from ground on brush 411 through terminal 1, back contact of relays 404 and 401 to the winding of relay 402. The circuit for operating relay TT is traced from ground on brush 411, back contact of relay 403, brush 415 and terminal 1, conductor 421, a back contact of relay 555 of the control relay circuit of computer No. 1, conductor 420, and the winding of relay TT. The operation of relay 402 opens a short circuit across the winding of relay 401 whereby the windings of relays 401 and GT are energized in a circuit which is traced from ground on brush 411, through a back contact of relay 403, winding of relay 401, brush 414 and terminal 1, conductor 431 and the winding of relay GT. The operation of relay 401 opens the operating circuit of relay 402, relay 402 being slow in releasing to allow time enough for recording the tens digit of the trunk group numbers as transmitted by the count and sum transmitters from the office and summary tapes. The release of relay 402 closes the short circuit across the winding of relay 401, whereby relay 401 releases; but relay GT is held operated until switch 410 is advanced to position 2. The operation of relay TT closes a circuit from ground at a front contact of relay TT through conductor 450 and a back contact of relay 555 of the relay control circuit, to the winding of relay 557. Relay 557 operates, closing a circuit including a back contact of relay 558 for operating relay 561. Relay 561 closes a circuit for operating relay 562 and relay 562 closes circuits for operating relays 555 and 558 and for holding relay 557. Relay 555 locks to a back contact of release relay 554, opens the operating circuit of relay 557 and connects holding ground to conductor 553. With relay 562 also operated, this holding ground is disconnected from conductors 575 and 579 so that the locking windings of all B relays of the computer will be deenergized. With relay 558 operated, ground at a back contact of relay 508 is connected to each of conductors 610 to 615, inclusive, to effect the operation of the Bc and B*d* computing relays of the hundreds, tens, units, tenths and hundredths computing relay sets, thereby to register zero on these relays. The operation of relay 558 opens the operating circuit of relay 561; and the release of relay 561 causes the release of relay 562 and the operation of relay 563. The release of relay 562 closes a locking circuit for relay 563 and connects the grounded holding conductor 553 to conductors 575 and 579, thereby to lock the operated Bc and B*d* relays of each of the computing relay sets. The release of relay 562 also causes the release of both of relays 557 and 558, thereby opening the operating circuits of the Bc and B*d* computing relays. The aforementioned operation of relay 555 also opens the operating circuit of the associated TT relay of the computer control circuit so that the computer cannot be seized while engaged.

With switch 410 in position 1 and relay 404 normal, ground is connected from brush 411 through back contacts of relay 404 to conductors 397 and 897 to energize start magnets 396 and 896 of the count and sum transmitters 390 and 890; whereby the tens digit of the trunk group number on the office tape is transmitted over conductors 391 to 395 and the tens digit of the trunk group number on the summary tape is transmitted over conductors 891 to 895 through front contacts of relays TT and GT to operate the corresponding relays of the trunk group identifying circuit. The trunk group number being 00, the TTc and TT*d* relays are operated and these relays lock to holding ground conductor 553. Since there is no record on the summary tape, during the transmission of the first count for each trunk group from the office tape, none of the GT and GU relays in the trunk identifying circuit are operated and no matching of the trunk group digits is possible. The advance of switch 410, from position 1 to position 2 after registering the tens digit of the group number, is effected by the operation of any one of the TT relays; whereby a circuit is closed for operating relay 404. This operating circuit is traced from the winding of relay 404 through brush 412 in position 1, conductor 441, a back contact of either relay 502 or relay 506 and a front contact of whatever TT relay is operated (for instance a front contact of relay TT*d* when the tens digit is zero), back contacts of relays 507 and 503, conductor 552, a front contact of relay 555, conductor 440, brush 413 and a back contact of relay 402 to ground at the back contact of stepping magnet 417. Relay 404 locks directly to the back contact of the stepping magnet and closes the circuit for operating the stepping magnet. When the stepping magnet operates, relay 404 releases. The release of relay 404 causes the release of the stepping magnet to advance switch 410 to position 2; and the advance of switch 410 from position 1 causes the release of control relays TT and GT.

With switch 410 in position 2, circuits are closed through brushes 414 and 415, over conductors 432 and 422, for operating control relays GU and TU. The aforementioned release of relay 404 closes the circuit for operating relay 402; and, when relay 402 reoperates, relay 401 is again energized in series with relay GU. The operation of relay 401 causes the delayed release of relay 402, during which the units digit of the trunk group number is registered in the computer by the operation of one or more of the GU relays and one or more of the TU relays in the trunk identifying circuit of the computer. The aforementioned release of relay 404, after registration of the tens digit of the trunk group number in the trunk group identifying circuit, reconnects ground to conductors 397 and 897 to operate the start magnets 396 and 896 of transmitters 390 and 890, thereby to effect the transmission of the units digit of the trunk group number from the office and summary tapes; and, with control relays TU and GU operated, the TU and GU relays of the trunk group identifying circuits are selectively actuated to register these digits. Assuming the units digit of the trunk group number to be zero, relays TUc and TU*d* are operated and locked to holding ground conductor 553. None of the GU relays are operated on the first round of contacts since the summary tape is blank at that time. With relays TUc and TU*d* operated, a circuit is closed (when relay 402 releases) through conductors 440 and 442 for operating relay 404, to effect the advance of switch 410 to position 3 in like manner to that in which it was advanced to position 2, as hereinbefore described. Relay 404 is released when stepping magnet 417 operates and relays TU and GU are released when the switch advances.

*Registering a group busy count in the computer*

With switch 410 in position 3 and relay 404 released, the circuit for operating relay 402 is closed, ground is reconnected to conductors 397 and 897 to again energize start magnets 396 and 896 of the count and sum transmitters 390 and 890, and relays CT and SH of the computer control circuit are operated. When relay 402 operates, relay 401 is energized in series with the winding of relay SH; and the operation of relay 401 causes the delayed release 402, during which selective operation of computing relays in the hundreds relay set is effected over conductors 391 to 395 and conductors 891 to 895, under control of the count and sum transmitters. The aforementioned connection of holding ground to conductor 553 upon operation of relay 555 causes the operation of relays 646, 652, and 657 of the computing relay circuit. The operation of relay 646 connects ground to conductors 647 and 648. The ground connected to conductor 648 is further extended through back contacts of relay 656 to conductors 673 and 674 to operate relays Ac and Ad of the hundreds relay set, thereby to register 0. With relay CT of the computer control circuit and relays 646, 652 and 657 of the computing relay circuit operated, conductors 391 to 395 from the count transmitter are connected through front contacts of relays CT, conductors 461 to 464, front contacts of relay 646, conductors 661 to 664, and front contacts of relay 652 to the windings of the A relays of the tens computing relay set, whereby these relays are selectively operated to register the tens digit of the trunk group busy count on the office tape. With relay SH of the computer control circuit operated, conductors 891 to 895 from the sum transmitter are connected through front contacts of relay SH, conductors 481 to 484 to the operating windings of the B relays of the hundreds computing relay set, whereby these B relays are selectively operated to register the hundreds digit of the busy count sum for the trunk group in question as recorded on the summary tape. The A relays thus operated in the tens relay set lock through the associated conductors 601 to 604 and back contacts of relay 504 to holding ground conductor 553. The B relays thus operated in the hundreds relay set lock to holding ground conductor 575. On the first round of counts the Bc and Bd relays of each of the hundreds, tens and units computing relay sets are operated to register zero, as hereinbefore described. The operation of the Bc and Bd relays of the hundreds set closes a circuit including conductors 440 and 443 for operating relay 404 whereby the switch 410 is advanced to position 4 and control relays CT and SH are released.

With switch 410 in position 4 and with relay 404 released, the circuit for operating relay 402 is closed, ground is reconnected to conductors 397 and 897 to energize start magnets 396 and 896 of the count and sum transmitters 390 and 890, and relays CU and ST of the computer control circuit are operated. When relay 402 operates, relay 401 is energized in series with the winding of relay ST; and the operation of relay 401 causes the delayed release of relay 402, during which selective operation of computing relays is effected under control of the count and sum transmitters. With control relay CU operated, conductors 391 to 395 from the count transmitter are connected through front contacts of relay CU, conductors 465 to 468, front contacts of relay 646, conductors 665 to 668, front contacts of relay 657, conductors 781 to 784, back contacts of relay 653, and conductors 681 to 684 to the windings of the A relays of the units relay set. With control relay ST operated, conductors 891 to 895 from the sum transmitter are connected through front contacts of relay ST, conductors 485 to 488, to the operating windings of the B relays of the tens computing relay set whereby these relays are selectively operated to register the tens digit of the total busy count sum for the trunk group in question. The A relays thus operated in the units relay set lock through conductors 605 to 608 and back contacts of relay 504 to holding ground conductor 553. The B relays thus operated in the tens relay set lock to holding ground conductor 575. On the first round of counts the Bc and Bd relays are operated to register as hereinbefore described; and the operation of the Bc and Bd relays of the tens set closes a circuit including conductors 440 and 444 for operating relay 404, whereby switch 410 is advanced to position 5 and control relays CU and ST are released.

With switch 410 in position 5 and with relay 404 released, the circuit for operating relay 402 is closed, ground is reconnected to conductor 897 to energize start magnet 896 of the sum transmitter 890, and relay SU of the computer control circuit is operated. When relay 402 operates, relay 401 is energized in series with the winding of relay SU; and the operation of relay 401 causes the delayed release of relay 402, during which selective operation of the B computing relays of the units relay register is effected. With relay SU operated, conductors 891 to 895 from the sum transmitter are connected through front contacts of relay SU, conductors 491 to 494 to the operating windings of the B relays of the units computing relay set, thereby to effect the selective operation of these relays to register the units digit of the total busy count of the trunk group in question. The B relays thus operated in the units relay set lock to holding ground conductor 575. On the first round of counts the Bc and Bd relays of the units set are operated to register zero as hereinbefore described; and the operation of these relays closes a circuit including conductors 440, 552 and 445 for operating relay 404 of the computer control circuit whereby switch 410 is advanced to position 6 and control relay SU is released.

With switch 410 in position 6 and with relay 404 released, the circuit for operating relay 402 is closed, ground is connected to conductors 397 and 897 to energize the start magnets 396 and 896 of the count and sum transmitters 390 and 890, and relays CP and SP of the computer control circuit are operated. When relay 402 operates, relay 401 is energized in series with the winding of relay SP; and the operation of relay 401 causes the delayed release of relay 402. With control relay CP operated, conductors 392 and 394 from the count transmitter are connected through front contacts of relay CP and conductors 470 and 469 to the windings of relays 566 and 565 of the relay control circuit; and, with relay SP operated, conductors 892 and 894 from the sum transmitter are connected through front contacts of relay SP and conductors 496 and 495 to the windings of relays 568 and 567 of the relay control circuit. During the first round of transmission of counts from the office tape there is no transmission from the summary tape and therefore relays 567 and 568 are not operated. Relays 566 and 565 operate, lock to holding ground conductor 553, and close a circuit including back contacts of relays 508 and 501 and a front contact of relay 563 for operating relay 561.

*Adding the busy counts for a trunk group*

The operation of relay 561 closes a circuit for operating relay 562, opens the operating circuit of relay 563, and closes a circuit including back contacts of relays 557 and 501 for operating relay i64. Relay 564 locks to holding ground conductor i53 so as to prevent the reclosing of the operating ircuit of relay 563 when relay 561 releases. The peration of relay 562 opens the locking circuit of elay 563 and connects ground through a back ontact of relay 557 to conductor 578, thereby to ock up all C relays which have operated in each f the computing relay sets as controlled by the A and B relays of the same set, thus performing he addition of the number registered by the A nd B relays of the hundreds, tens and units reay set in the same manner described in detail in Stibitz application Serial No. 564,853, filed Noember 23, 1944. The operation of relay 562 disonnects ground from holding ground conductors 575 and 579, thereby (*a*) to release all operted A and B computing relays, (*b*) to open the perating circuit of the C computing relays, and c) to connect ground to conductor 577 to reperate the B computing relays under the conrol of the locked C computing relays. Thus one ddition has been performed and the B relays ave been reset to register the sum. When relay 563 releases due to the opening of its locking ciruit by the operation of relay 562, it causes the elease of relays 561 and 562 in succession, relay 561 being slow in releasing to allow time for the eoperation of the B computing relays. When reay 562 releases, it reconnects locking ground to onductor 575 before it disconnects the operating round from conductor 577, so as to hold operted the B relays which register the sum.

A typical addition in one relay set will be decribed. Assume the units computing relay set o have registered the digit 3 on the A relays and he digit 0 on the B relays, relays A*b* and A*c* having been operated from the count transmitter and elays B*c* and B*d* from the sum transmitter. The um of 3 and 0 is 3, which requires the operation f relays C*a* and C*d*. The circuit for operating elay C*a* is traced from the upper winding hrough back contacts of relays B*a*, A*a* and B*b*, ront contacts of relays A*b*, B*c* and A*c*, over conluctor 575 to ground. The circuit for operating elay C*d* is traced from the upper winding of this elay through a front contact of relay B*d*, a back ontact of relay A*d*, conductor 595, a back contact f relay 505, and through conductor 593 to ground t a back contact of relay 644. When relay 562 perates, relays A*b*, A*c* and B*d* release and relay Bc is held operated and relay B*b* is operated. The ircuit for operating relay B*b* is traced from the ower winding of this relay, through back contacts f relays C*b*, C*c*, and C*e* and conductor 577. The ircuit for holding relay B*c* operated is traced rom the lower winding of this relay, through a ack contact of relay C*c*, a front contact of relay C*d*, and a back contact of relay C*e* to conductor 577.

*Punching the trunk group number and busy count total on summary tape*

With relay 564 operated and relays 563 and 562 eleased, ground is connected to start conductor 642 to effect the operative association of the comuter with the punch circuit, if idle. A similar tart conductor is provided for each of the other wo computers. The connection of ground to conluctor 642 causes the operation of relay AP1. The three sets of relays AP1 and BP1, AP2 and BP2 and AP3 and BP3, one set for each computer, ogether with a common relay BC cause the punch ircuit to be successively connected to the comuters, one at a time and only in numerical order. The operation of relay AP1 causes the operation of relays CP1, DP1, EP1, and FP1, thereby to connect conductors 531 to 538 from the contacts of the TT and TU relays of the trunk identifying circuit to conductors 831 to 838, to connect conductors 741 to 744 from the contacts of the B relays of the hundreds computing relay set to conductors 841 to 844, to connect conductors 745 to 748 from the contacts of the B relays of the tens computing relay set to conductors 845 to 848, to connect conductors 751 to 754 from the contacts of the B relays of the units computing relay set to conductors 851 to 854, to connect conductors 621 to 624 from the contacts of relays T*a*, T*b*, T*c* and T*d* of the relay control circuit to conductors 821 to 824, to connect conductors 625 to 628 from the contacts of relays U*a*, U*b*, U*c* and U*d* of the relay control circuit to conductors 825 to 828, to connect conductors 631 to 634 from the contact of relays D1*a*, D1*b*, D1*c* and D1*d* of the relay control circuit to conductors 861 to 864, to connect conductors 635 to 638 from the contacts of relays D2*a*, D2*b*, D2*c* and D2*d* of the relay control circuit to conductors 865 to 868, to connect conductors 639, 640 and 641 to conductors 869, 870 and 871, and to connect ground from a back contact of relay FP3 through a front contact of relay FP1 to conductor 872. Ground connections are thus extended from the contacts of the operated ones of relays TT and TU in the trunk group identifying circuit and from the contacts of the operated ones of the B relays in the hundreds, tens and units computing relay sets to selectively operate the punch selecting relays as required for recording on the summary tape the trunk group identifying number and busy count for the identified trunk group as hereinafter described.

The successive selective operations of the punch setting relays for each digit to be recorded on the summary tape are controlled by switch 810 and the associated control relays of the punch circuit. The connection of ground to conductor 872, when relay FP1 operates, causes the operation of stepping magnet 815 of switch 810 and the operation of relay 882. The circuit for operating stepping magnet 805 is traced from conductor 872, through back contacts of relays 910, 909, 908 and 907, conductor 805, back contacts of relays 901, 902, 903, 904, 905 and 906, conductor 818, normal terminal and brush 813 of switch 810, through the interrupter contact and winding of stepping magnet 815 to battery. The stepping magnet, when energized, opens its operating circuit whereby the magnet is deenergized to effect the advance of brushes 811 to 814 from normal position into engagement with terminals 1. With the brushes of switch 810 in position 1, relay 901 operates thereby extending conductors 831 to 834 through conductors 911, 913, 914 and 915 to the windings of punch setting relays 921, 923, 924 and 925 to selectively operate one or more of these relays, according to the setting of register relays TT of the trunk group identifying circuit, in series with the winding of relay 881. The operation of relay 881 closes a circuit for operating punch magnet 880, thereby to punch the summary tape to record the tens digit of the group identifying number. The operation of relay 881 also opens the operating circuit of relay 882; and, after a predetermined interval of terminal, relay 882 releases. The release of relay 882 closes a circuit including the front contact of relay 881, back contact of relay 882, conductor 817, terminal 1 and brush 813, for reoperating the stepping magnet 815, thereby to effect the advance of switch 810 to position 2. The advance of switch 810 from position 1, causes the release of relay 901; and the release of relay 901 causes the release of the punch setting relays and the release of relay 881. The release of relay 881 causes the release of punch magnet 880 and disconnects ground from conductor 817. The stepping magnet 815 is reoperated through brush 813 in position 2, conductors 818, 805 and 872 to ground at the back contact of relay FP3 as above described. The switch 810 is thus advanced to position 3 in which relay 902 is operated to extend conductors 835 to 838 through conductors 911, 913, 914 and 915 to selectively operate the punch setting relays corresponding to the units digit of the trunk group number, as registered by the TU relays of the trunk group identifying circuit. Relays 882 and 881 and punch magnet 880 are operated to record the units digit on the summary tape in similar manner to that in which the tens digit was recorded. When relay 882 releases ground is connected to conductor 817 to operate stepping magnet 815 and thereby effect the advance of switch 810 to position 4 followed by the release of relay 902, the release of the punch setting relays and relay 881 and the release of punch magnet 880. In position 4 the stepping magnet 815 is reoperated through conductors 818, 805 and 872 to advance switch 810 to position 5. With switch 810 in position 5, relay 903 is operated to extend conductors 841 to 844 through conductors 911, 913, 914 and 915 to selectively operate the punch setting relays corresponding to the hundreds digit of the busy count as registered by the B relays of the hundreds computing relay set. This digit is punched in the manner hereinbefore described and the switch 810 is advanced to position 6 so as to release relay 903, the punch setting relays and the punch magnet 880. Switch 810 is then advanced to position 7 in which relay 904 is operated to extend conductors 845 to 848 through conductors 911, 913, 914 and 915 to selectively operate the punch setting relays corresponding to the tens digit registered by the B relays of the tens computing relay set. This digit is punched on the summary tape, switch 810 is advanced to position 8 to release relay 904 and then to position 9 in which relay 905 is operated. With relay 905 operated conductors 851 to 854 are extended through conductors 911, 913, 914 and 915, to effect the selective operation of the punch setting relays in accordance with the units digit of the busy count as registered by the B relays of the units computing relay set. When relay 881 operates, the punch magnet 880 is operated, relay 882 releases and switch 810 is advanced to position 10 to release relay 905, the punch setting relays, relay 881 and punch magnet 880. Switch 810 is then advanced to position 11 in which relay 906 is operated thereby connecting ground to conductors 912 and 914 to operate punch setting relays 922 and 924 and relay 881; and the punch magnet 880 is operated to punch the code for a period on the summary tape. When relay 882 releases it closes a circuit for operating stepping magnet 815 to advance switch 810 to position 12 so as to effect the release of relay 906, the punch setting relays, relay 881 and punch magnet 880. When relay 906 releases, the circuit which includes conductors 818 and 805 and 872 is again closed to operate stepping magnet 815 and thus effect the advance of switch 810 to position 13. With brush 811 in position 13, a circuit is closed from ground at the back contact of relay 800 for operating release re lay 801. Relay 801 locks to conductor 872, close a circuit including brush 814 for operating aux iliary release relay 802, and connects ground t conductor 870 to operate release relay 554 of th relay control circuit of the computer. Relay 80 locks and closes the operating circuit of step ping magnet 815; so that switch 810 is advance to normal position, whereupon relay 802 release The operation of computer release relay 55 after the punch circuit has punched the tens an units digit of a trunk number and the hundred tens and units digits of the total busy count o the group as registered by the B relays of th hundreds, tens and units computing relay set causes the release of start relay 555 thereby dis connecting ground from conductors 500, 553, 57 and 579. The disconnection of ground from con ductor 553 causes the release of relay 564, th release of all operated relays in the computin relay sets and the release of relays 646, 652, 65 657 and 658. The release of relay 555 disconnect ground from conductor 642, thereby opening short circuit across the winding of relay BP1 i the punch circuit; whereby relay BP1 is oper ated and relay AP1 is held operated in a serie circuit to ground at the back contact of rela BC. The operation of relay BP1 further open the operating circuit of relay AP1 and connect the start conductor from computer No. 2, whic conductor corresponds to conductor 642 fron computer No. 1, through to the winding of rela AP2 so that the punch circuit will next be opera tively associated with computer No. 2 as soon a that computer is ready to make use of the punc circuit. The operation of relay BP1 causes th release of relays CP1, DP1, EP1, and FP1. Th release of relay FP1 disconnects ground from con ductor 872 releasing relay 801.

*Advance of computer control circuit to next computer*

At the time that relays 565 and 566 were op erated as hereinbefore described, a circuit wa closed for operating relay 404 of the compute control circuit. This circuit for operating rela 404 includes brush 412 in position 6, conducto 446, a back contact of relay 508, a front contac of either one of relays 565 and 566, another bac contact of relay 508, conductor 552, conductor 440 brush 413, back contact of relay 402 to groun at the interrupter contact of stepping magne 417. Relay 404 locks through the interrupter con tact of stepping magnet 417 and closes the circui for operating the stepping magnet thereby t cause the successive release of relay 404 an stepping magnet 417 whereby switch 410 is ad vanced to position 7. Since the start key 400 ha not been released, the stepping magnet is agai energized in the circuit through brush 413 i position 7, thereby to advance switch 410 to posi tion 8. Switch 410 now advances from positio 8 to position 14 in like manner to that in which i was advanced from position 1 to position 7, dur ing which advance the TT, TU, CT, CU, CP, GT GU, SH, ST, SU and SP relays which are individ ual to computer No. 2 are energized to opera tively associate the count and sum transmitter 390 and 890 with computer No. 2. Computer No 2 registers the tens and units digits of the trun number and the hundreds, tens and units digit of the busy counts for the next trunk group. O the first round of counts, the Bc and Bd relays ar operated to zero as above described; and whe the B relays have been reset to register the sum he punch circuit is effective to punch the trunk roup number and sum of the busy counts for the roup on the summary tape in the manner above escribed.

After the count and sum transmitters 390 and 90 have completed the transmission of a trunk roup number and busy count to computer No. 2, witch 410 is advanced to position 15 and from osition 15 to position 20 in like manner in which ; was advanced from position 6 to position 13 uring which advance the count and sum transnitters 390 and 890 are effective to transmit a runk group number and busy count for a third roup of trunks to computer No. 3. Thus the umber and busy count for each trunk group in uccession is transmitted to the computers in umerical succession; and the summary tape is unched to record the trunk number and total usy count for each trunk group.

*ind of first round of counts—Operation on succeeding rounds of counts*

When the trunk group number and first busy ount for trunk group No. 97 is transmitted from he office tape to the trunk identifying circuit nd computing relays of computer No. 1, the opration of relay TT*a*, TT*b*, TU*a* and TU*c* of the runk identifying circuit, which relays correspond o group No. 97, closes a circuit for operating reays 506, 507 and 508. This circuit includes conluctor 539 and terminal 97 of connecting block i30 and a back contact of relay 509. When the unch circuit completes the punching of the summary tape for group 97, relay 554 operates and elay 555 releases; and the disconnection of round from conductor 553 causes the release f the TT and TU relays of the trunk identifying ircuit, whereby the operating circuit of relays i06, 507 and 508 is opened and these relays are nergized through the locking contacts of relay i06 and conductor 550 in series with the winding f relay 509, so that relay 509 also operates. All our of these relays are held operated under the ontrol of relay 519 so that on the second and ucceeding round of counts transmitted to the omputer, each registration of a trunk group umber on relays TT and TU from the office tape nust match the simultaneous registration of the runk group number on relays GT and TU from he summary tape. Since matching of the trunk umber registered by the trunk group identifying elays is not possible on the first round of counts, he operation of any one of relays TT connects round to conductor 441 and the operation of any ne of relays TU connects ground to conductor 142 to effect the operation of relay 404 in each ase as hereinbefore described. On succeeding ounds with relay 507 operated, ground is connectd to conductor 441 only if the corresponding nes of relays GT and TT are operated; and round is connected to conductor 442 only if the orresponding one of relays GU and TU are oprated. For instance with group 01 registered, elays TT*c* and TT*d* and GT*c* and GT*d* will be perated; and ground is connected from conluctor 552 through a back contact of relay 503 nd a front contact of relay 507, back contacts f both of relays TT*a* and GT*a*, back contacts of oth of relays GT*b* and TT*b*, front contacts of oth of relays TT*c* and GT*c* and front contacts f both of relays GT*d* and TT*d*, all in series, to onductor 441; and with relays TU*b* and GU*b* perated, ground is connected from conductor 552 hrough a back contact of relay 503 and a front ontact of relay 507, back contacts of both of relays TU*a* and GU*a*, front contacts of both of relays GU*b* and TU*b*, back contacts of both of relays TU*c* and GU*c*, and back contacts of both of relays GU*d* and TU*d*, all in series, to conductor 442.

If a sufficient length of summary tape is allowed between the punch and the sum transmitter, the punch record of trunk group 00 will appear before the contacts of the sum transmitter coincidentally with the punched record of the second count for trunk group 00 at the count transmitter. It is desirable to leave too much rather than too little tape between them so that the summary tape can be advanced by the operation of key 898 until the two tapes are in synchronism. This, of course, will not occur until after the busy count for trunk group 99 has been recorded on the summary tape.

Another result of the aforementioned operation of relays 506, 507, 508 and 509 is the moving of counting switch 510 from normal position. The operation of relay 509 closes a circuit from battery through the winding and interrupter contact of stepping magnet 516, a back contact of relay 519, normal terminal and brush 514, and the front contact of relay 509 to ground at a back contact of relay 519. The brushes of switch 510 are thereby advanced from normal to position 1 so as to indicate that one count has been registered on the summary tape for one round of trunk group counts employing computer No. 1. Computers Nos. 2 and 3 are likewise arranged to advance a like counting switch one position when trunk groups Nos. 98 and 99 are registered on the TT and TU relays of these computers respectively. To this end, conductor 539 of computer No. 2 is connected to terminal 98 of terminal block 530; and conductor 539 of computer No. 3 is connected to terminal 99 of connecting block 530. Thus when one round of counts for trunk groups 00 to 99 has been completed, the counting switches 510 of each of the three computers is in position 1. Each succeeding round of counts advances switch 510 one position, that is, when group 97 is again registered by relays TT and TU, the ground thus connected to conductor 539 causes the operation of relay 518. Relay 518 locks through the back contact of stepping magnet 516, closes a circuit for operating stepping magnet 516, and closes a circuit for operating relay 517. Relay 517 opens the operating circuit of relay 518 and locks through the front contact of relay 509 over conductor 539 until relays TT and TU are released. The operation of stepping magnet 516 causes the release of relay 518; and the release of relay 518 causes the release of stepping magnet 516, thereby advancing switch 510 to position 2. Relay 517 holds until relays TT and TU release to prevent further advance of switch 510 until another round of counts has been completed. Each time switch 510 has been advanced ten steps, relay 527 is operated through brush 513 in position 10, a back contact of relay 519, and brush 515 to ground. Relays 526 and 527 and stepping magnet 525 operate to advance the tens counting switch 520 one position for each ten steps of the units counting switch 510; whereby switches 520 and 510 of each computer register the number of rounds of counts transmitted thereto from the office tape. Whenever the release key 529 is actuated, relays 519 and 528 are operated, thereby to effect the return of the counting switches to normal. The count registered on switches 520 and 510 is needed to obtain the average count for each group as hereinafter described. Since relay 508 is held operated after the first round of counts until the release key 529 is operated, the operation of relay 558 on rounds after the first round is ineffective to cause the operation of the Bc and Bd relays of the hundreds, tens and units computing relay sets, as above described for the first round of counts. Thus on the second and succeeding rounds, with the same trunk group number registered in the trunk groups identifying relays, the busy count from the office tape is registered on the A computing relays and the total count from the summary tape is registered on the B computing relays of the hundreds, tens and units computing relay sets. Furthermore, when relays 565 and 566 of the relay control circuit are operated from the count transmitter, relays 567 and 568 are operated from the sum transmitter. With relay 508 operated and relays 565, 566, 567 and 568 operated, ground on conductor 552 is connected through a front contact of relay 508, a front contact of relay 567, a front contact of relay 565, a front contact of relay 566, a front contact of relay 568, a back contact of relay 501 and another front contact of relay 508 to conductor 446 to effect the operation of relay 404 of the common computer control circuit; whereby switch 410 is advanced to the next position to prepare for the transmission of the next trunk group number and busy count from the count and the sum transmitters to the next computer. The single addition made by each computer for each successive busy count is punched on the summary tapes as above described.

*Computing the average busy count for each trunk group*

Since the code CR follows the last busy count on the office tape, it is transmitted to the next computer following the one which accumulated the last count for trunk group 99 and is registered on the TT relays of the trunk group identifying circuit by the operation of relay TT*d* alone. The operation of control relay TT closes the circuit for operating relay 557, as hereinafter described; and the operation of relay TT*d* closes a circuit including conductor 500 for operating relays 501, 502, 503, 504 and 505. The operation of relay 557 closes the circuit for operating relay 561; relay 561 closes the circuit for operating relay 562; relay 562 closes the circuit for operating relays 558 and 555; relay 558 opens the operating circuit of relay 561; and relays 561, 562 and 557 release in succession, all as described above. When relay 561 releases, relay 563 operates and locks under control of relay 562. Relay 555 locks, opens the operating circuit of relay 557, and connects ground to conductor 553. When relay 562 releases, the ground on conductor 553 is connected to conductor 575, thereby causing the operation of each of relays CS*a*, CS*b*, CS*c* and CS*d*; and, as soon as relay 557 releases, relays BS*a*, BS*b*, BS*c* and BS*d* are operated. The operation of relay 501 extends the ground, connected to conductor 500, over conductor 406 to operate relay 405 of the common computer control circuit; and relay 405 locks under control of the start key 400. With relay 405 operated, relays 501, 502, 503, 504, 505 are held operated until the start key 400 is released. As each of the other computers restore to normal, following completion of the accumulation of the last count transmitted thereto from the office tape, the corresponding relays 501, 502, 503, 504 and 505 are operated in each of these computers. At the same time that relay TT*d* was operated by the CR code from the office tape, relays GT*a*, GT*b*, GT*c* and GT*d* of the trunk group identifying circuit are selectively operated over conductors 891 to 894 from the sum transmitter to register the tens digit of the trunk group number of the first trunk group. With relay 504 operated, the aforementioned operation of relay 558 connects ground to each of conductors 616 to 619 to set the B relays of the first and second decimal relay sets to zero. Relay 558 does not connect ground to conductor 610 to 615 because relay 508 is operated. Since relay 501 is operated, the operation of relay 555 closes circuits for operating relays 644, 651 and 656, instead of operating relays 646, 652, and 657 as above described when the computer is being operated to add the busy counts for a group. With relays 644, 651 and 656 operated, conductors 541 and 544 from the terminals of the tens counting switch 520 of the trunk group identifying circuit are connected through front contacts of relays 644, conductor 661 to 664, and through front contacts of relay 651 to selectively operate the A relays of the hundreds computing relay set to register the complement of the tens digits of the number of rounds of busy counts transmitted from the office tape, as registered on switch 520. And conductors 545 to 548 from the terminals of the units counting switch 510 are connected through front contacts of relay 644, conductors 665 to 668, front contacts of relay 656, conductors 775 to 778 and back contacts of relay 652 to selectively operate the A relays of the tens computing relay set to register the complement of the units digit of the number of rounds of busy counts as registered on switch 510.

The aforementioned operation of relay 644 disconnects ground from conductor 593 and connects ground to conductor 592 to prepare the tenths and hundredths computing relay sets for use; and connects ground to conductors 645 and 649. The aforementioned operation of relay 651 connects ground to conductor 581 to operate relay 569 of the relay control circuit. Relay 569 locks through a back contact of relay 559, conductor 591 and a front contact of relay 501, to holding ground conductor 553; and closes a circuit for operating relay N1. The operation of relay N1 transfers the winding of relay 569 from conductor 581 to conductor 582. With relays 555, 502 and 503 operated and one or more of the GT relays of the trunk group identifying circuit operated, a circuit is closed (when relay 402 of the computer control circuit releases) for operating relay 404 of the computer control circuit. This circuit is traced from ground through the back contact of stepping magnet 417 of switch 410, a back contact of relay 402, brush 413, conductor 440, a front contact of relay 555, conductor 552, front contacts of relay 503 and the operated ones of relays GT*a*, GT*b*, GT*c* and GT*d*, a front contact of relay 502, conductor 441 and brush 412. The operation of relay 404 thereupon effects the advance of switch 410 to the next position. The advance of switch 410 causes the release of relays TT and GT and the operation of relays TU and GU of the computer control circuit. The release of relay 404, after the switch 410 has advanced, connects ground to conductors 397 and 897 to operate the start magnets 396 and 896 of the count and sum transmitters 390 and 890. Since there is no further record to transmit from the office tape, none of the TU relays of the trunk group identifying circuit are operated; but relays GU*a*, GU*b*, GU*c* and GU*d* of the trunk group identifying circuit are selectively operated to register the units digit of the trunk group number transmitted over conductors 891 to 894 from the summary tape. For the first trunk group, the units digit is zero; so that relays GUc and GUd are operated and locked. With any one or more of relays GUa, GUb, GUc and GUd operated, the grounded conductor 552 is connected through front contacts of relay 503 and the operated ones of the GU relays, a front contact of relay 502 and conductor 442 to operate relay 404 and thereby cause the advance of switch 410 another position. The advance of switch 410 causes the release of relays TU and GU and the operation of relays CT and SH of the computer control circuit. When relay 404 releases, after the advance of switch 410, ground is again connected to conductors 397 and 897 to operate start magnets 396 and 896 of the count and sum transmitters; whereby the hundreds digit of the total busy count for group 00 is transmitted by the sum transmitter 890, over conductors 891 and 894 and conductors 481 to 484, to selectively operate the B relays of the hundreds computing relay set to register this digit. The operated B relays lock to conductor 575 and connect conductor 552 to conductor 443 to again operate relay 404 of the computer control circuit and thereby cause the advance of switch 410 another position. The advance of switch 410 causes the release of relays CT and SH and the operation of relays CU and ST of the computer control circuit. When relay 404 releases after advance of the switch, the start magnet 896 of the sum transmitter is energized and the tens digits of the busy count total on the summary tape is transmitted, over conductors 891 to 894 and conductors 485 to 488, to selectively operate the B computing relays of the tens computing relay set. The operated B relays lock to conductor 575 and connect conductor 552 to conductor 444 to operate relay 404 of the computer control circuit and thereby cause the advance of switch 410 another position so as to release relays CU and ST and operate relay SU of the computer control circuit. When relay 404 releases after advance of the switch, the start magnet 896 of the sum transmitter is energized and the units digit of the busy count total on the summary tape is transmitted, over conductors 891 to 894 and conductors 491 to 494, to selectively operate the B relays of the units computing relay set. The operated B relays lock to conductor 575 and connect conductor 552 to conductor 445 to operate relay 404 of the computer control circuit and thereby cause the advance of switch 410 another position, so as to release relay SU and operate relays CP and SP of the relay control circuit. When relay 404 releases after advance of the switch, the start magnet of the sum transmitter is energized and the code for a period is transmitted over conductors 891 to 895 to operate relays 567 and 568 of the computer circuit. Relays 567 and 568 lock to conductor 553 and connect conductor 552 to conductor 446 to operate relay 404 of the common computer control circuit and thus effect the advance of the switch 410 another position, so that control relays CP and SP are released. The switch 410 is then advanced to the next group of positions in which the trunk group number and the total busy count, recorded on the summary tape for trunk group 01, are transmitted by the sum transmitter to set the trunk group identifying relays and B register relays of the next computer, as soon as it becomes idle, for computing the average busy count of trunk group 01. In similar manner the total busy count for each trunk group in succession is transmitted by the sum transmitter to the computers in turn until the average number of busy trunks has been individually computed for each of the one hundred groups of trunks.

The aforementioned operation of relays 567 and 568, after the B relays of the hundreds, tens and units computing relay sets have registered the total busy count for a group of trunks, closes a circuit including front contacts of relays 569, 508 and 501 for operating the slow-to-operate relay 556. Relay 556 closes a circuit including a front contact of relay 563 and a back contact of relay 559 for reoperating relay 561. Relay 561 opens the operating circuit of relay 563 and closes the circuit for operating relay 562. When relay 562 operates, relay 563 releases and the grounded conductor 553 is first connected to conductor 578 and then disconnected from conductor 575 so as to first close the locking circuits for all operated C computing relays and then open the locking circuit of all B computing relays. Thus the number of busy counts as registered by the A computing relays is subtracted from the total busy count registered by the B computing relays of the hundreds, tens, units, tenths and hundredths sets; and the C relays, which register the remainder, are locked to conductor 578. When relay 562 releases, the operating circuit for relay 563 is again closed and ground is first reconnected to conductor 575 and then disconnected from conductor 578, whereby only those B computing relays remain operated which have their operating circuits closed by the locked C relays. Thus the remainder of the busy count, after one subtraction of the number of counts (that is, one addition of the complement of the number of busy counts), is now registered by the B computing relays. After locking these B relays, the disconnection of ground from conductor 578 unlocks the C relays and only those C relays remain operated which correspond to the operated B relays. The reoperation of relay 563, after relay 561 releases, again closes the operating circuit for relay 561; and relay 563 locks until relay 562 operates. Thus relays 561, 562 and 563 continue to operate and release in the above-described cycle until the operating circuit of relay 561 is opened by the operation of relay 559; and each cycle of operations of relays 561, 562 and 563 effects one subtraction of the number of busy counts from the remainder of the busy count registered by the B relays. When this remainder becomes less than the number of busy counts, the addition of the complement of the number of counts as registered on the A computing relays of the hundreds and tens relay sets, causes the connection of ground to conductor 560 to operate the column shift relay 559 and thereby stop the subtraction as hereinafter described.

Each time that relays 561, 562 and 563 go through a cycle to effect one subtraction of the number of busy counts from the total busy count or remainder of this count, the BS and CS relays of the relay control circuit shown in Fig. 13 also go through a cycle of operations to register thereon each subtraction. At the end of the first subtraction, the BS relays will register 1, at the end of the second subtraction the BS relays will register 2, etc., so that, when relay 559 operates to shift the subtraction as hereinafter described, the digit registered by the BS relays will be the first digit of the quotient, that is, the first digit of the average busy count for the trunk group in question. When ground is connected to conductor 575 due to the release of relay 562 after operation of relay 555 at the time of seizure of the computer, all of relays CSa, CSb, CSc and CSd are operated. The aforementioned connection of ground to conductors 577 and 578 and disconnection of ground from conductor 575, due to the first operation of relay 562 following the first operation of relay 563, locks the CS relays and opens the locking circuit of the BS relays so that only those BS relays remain operated which correspond to operated CS relays. If all CS relays are operated, all of the BS relays operate. As soon thereafter as relay 562 releases, ground is reconnected to conductor 575 and disconnected from conductor 578 whereby the operated BS relays are locked, the CS relays are unlocked, and only those CS relays remain operated as have operating circuits closed by the BS relays which are locked operated. Thus only relays CSa, CSb and CSc remain operated. With all of the BS relays locked operated, a circuit is prepared for operating relay Tb of the relay control circuit shown in Fig. 16, but this circuit is not closed unless relay 559 operates after the first subtraction has been completed. On the next cycle of operation of relays 561, 562 and 563, relay CSa, CSb and CSc are locked to conductor 578; and relays BSa, BSb and BSc are operated to ground on conductor 577. When relay 562 releases, relays BSa, BSb and BSc are locked to conductor 575; the CS relays are unlocked; and relays CSa, CSb, and CSd remain operated. With relays BSa, BSb and BSc operated, circuits are prepared for operating relays Tb and Td in Fig. 16. Thus at the end of each cycle of operation and release of relays 561, 532 and 563, the operated ones of the BS relays register the number of subtractions which have been made of the number of busy counts from the total busy count or remainder of the total busy count; and, when relay 559 operates as hereinafter described, the Ta, Tb, Tc and Td relays are selectively operated over conductors 571 to 574 to register the first digit of the quotient.

Assume now that the subtractions have progressed to the point where the first digit of the quotient has been determined and the remainder of the hundreds and tens digits is less than the divisor (that is, less than the number of busy counts), the next subtraction of the number of busy counts should be made from the digits registered by the B computing relays of the tens and units relay sets, instead of from the digits registered by the B computing relays of the hundreds and tens relay sets. In such a case, relay Ba of the hundreds relay set is operated and relay Ca is not operated or vice versa; and ground is thus connected to conductor 560 to operate the shift relay 559. The operation of relay 559 causes the release of relays 569 and 556 in succession; and relay 561 cannot reoperate until relay 556 reoperates and relay 559 has released. Relay 569 is slow in releasing to insure the operation and locking of the operated T relays in Fig. 16 so as to register the first digit of the quotient. The release of relay 569 also opens the operating circuit of relay N1 so that relay N1 is now held operated in series with relay N2 to grounded conductor 553; and relay N2 is thereby operated. The operation of relay N2 opens the operating circuit of relay N1; transfers control conductors 571 to 574 from the T relays to the U relays of the relay control circuit of Fig. 16; causes the release of relays 651 and 656; and closes a connection from conductor 591, through a back contact of relay N4, to conductor 587 to operate relays 652 and 657. The operation of relay 652 connects ground to conductor 582 to effect the reoperation of relay 569. With relays 652 and 657 operated, conductors 541 to 544 are connected through conductors 661 to 664 and conductors 675 to 678 to the windings of the A relays of the tens computing relay set; and conductors 545 to 548 are connected through conductors 665 to 668, front contacts of relay 657, conductors 781 to 784, back contacts of relay 653, and conductors 681 to 684 to the windings of the A relays of the units computing relay set. Thus the complement of the number of busy counts registered by switches 520 and 510 are registered by the A relays of the tens and units computing relay sets. With relay 644 operated and relays 651 and 656 released, the ground connected to conductor 649 effects the operation of relays Aa and Ab of the hundreds, tenths and hundredths relay sets to register 9. The B relays of the tens and units computing relay sets register the remainder to which the complement of the number of busy counts is to be added, so as to proceed with the division to obtain the next digit of the average number of trunks busy. The aforementioned reoperation of relay 569 again closes a circuit for operating relay 556 and closes a circuit for operating relay N3. With relay 559 released, the circuit for operating relay 561 is again closed and the division by subtraction is thereupon resumed. The BS and CS relays of Fig. 13 are operated and released progressively in the manner hereinbefore described to register the number of times relays 561, 562 and 563 are operated and released.

Figure 16:
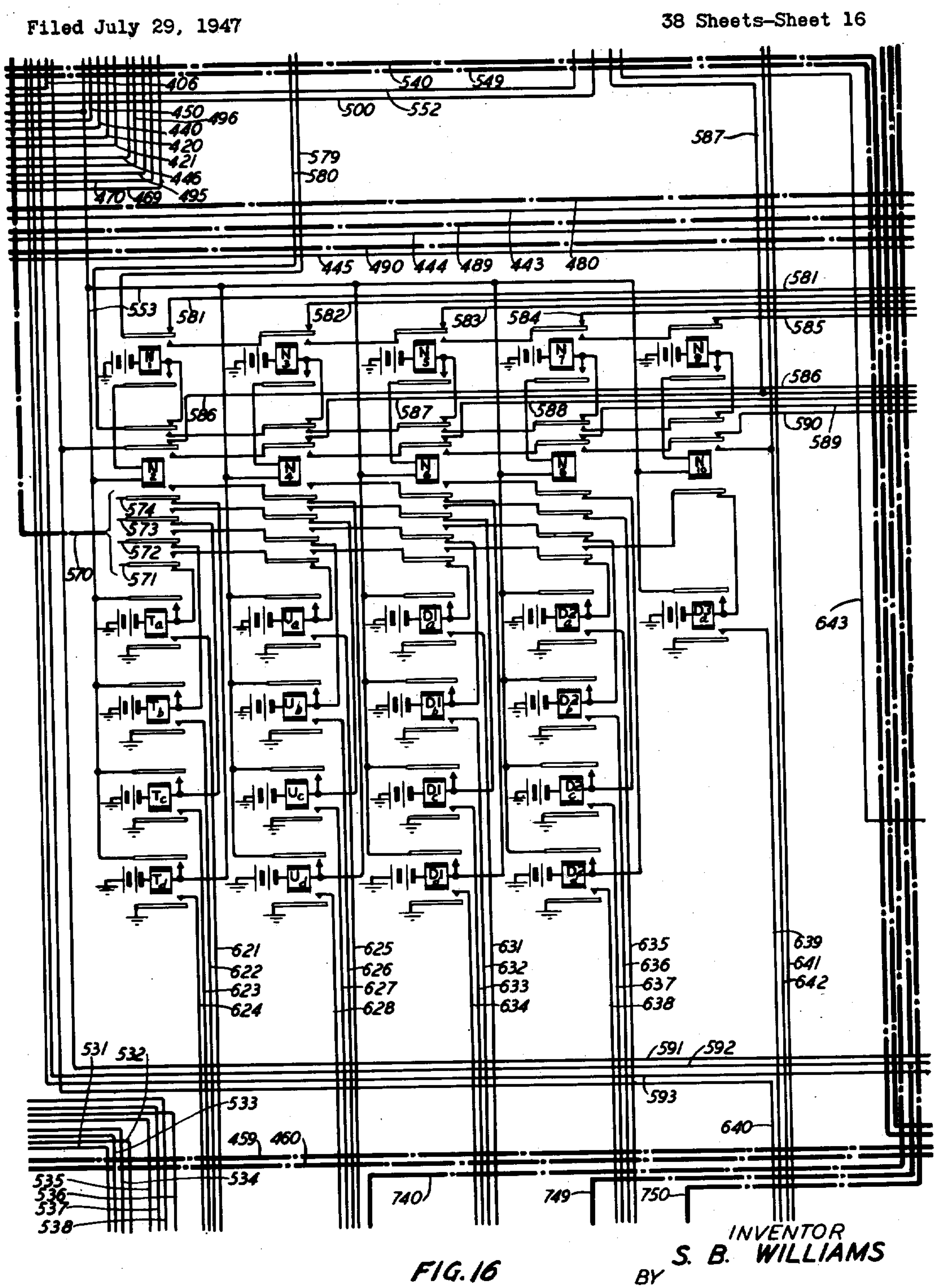
Figure 17:
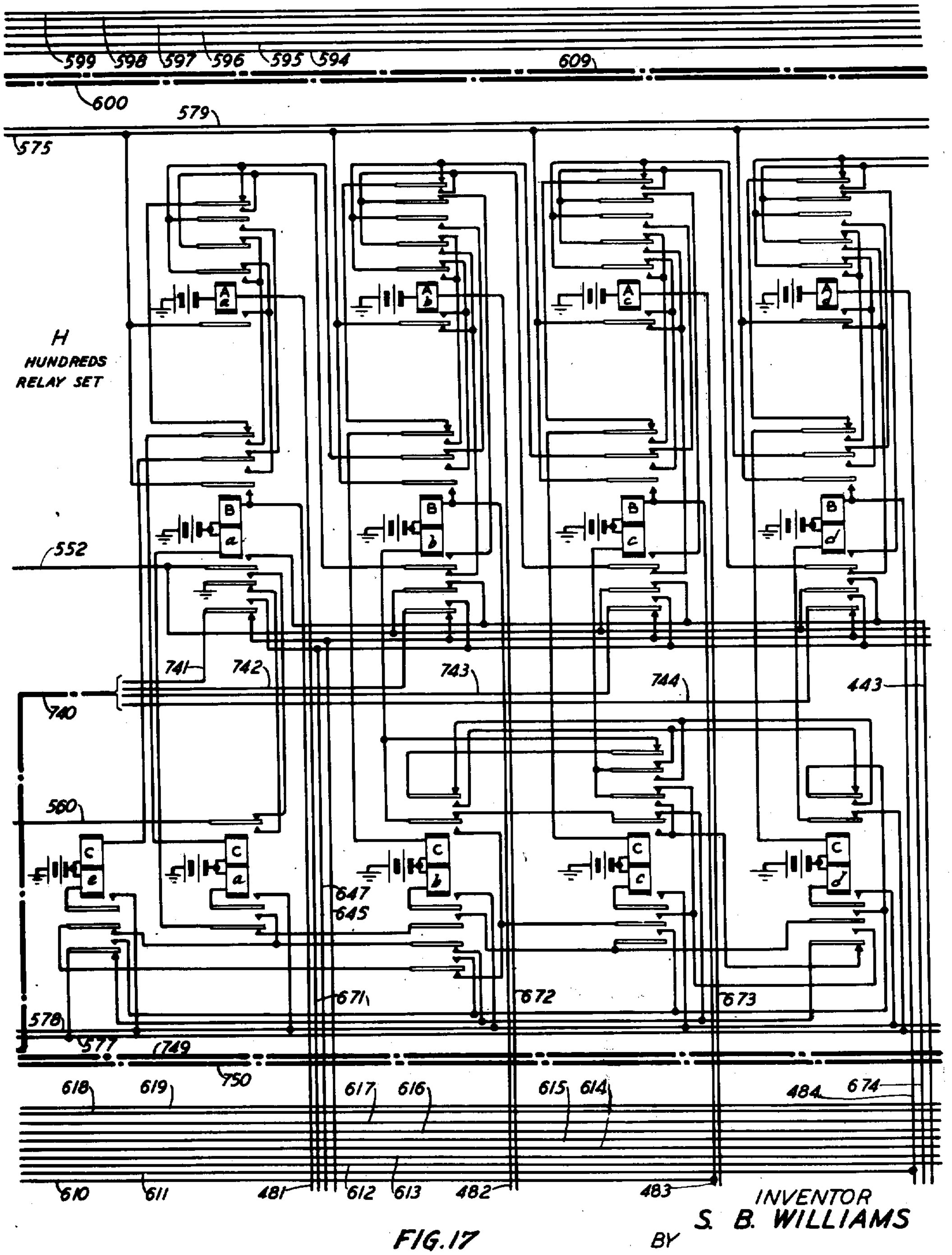
Figure 18:
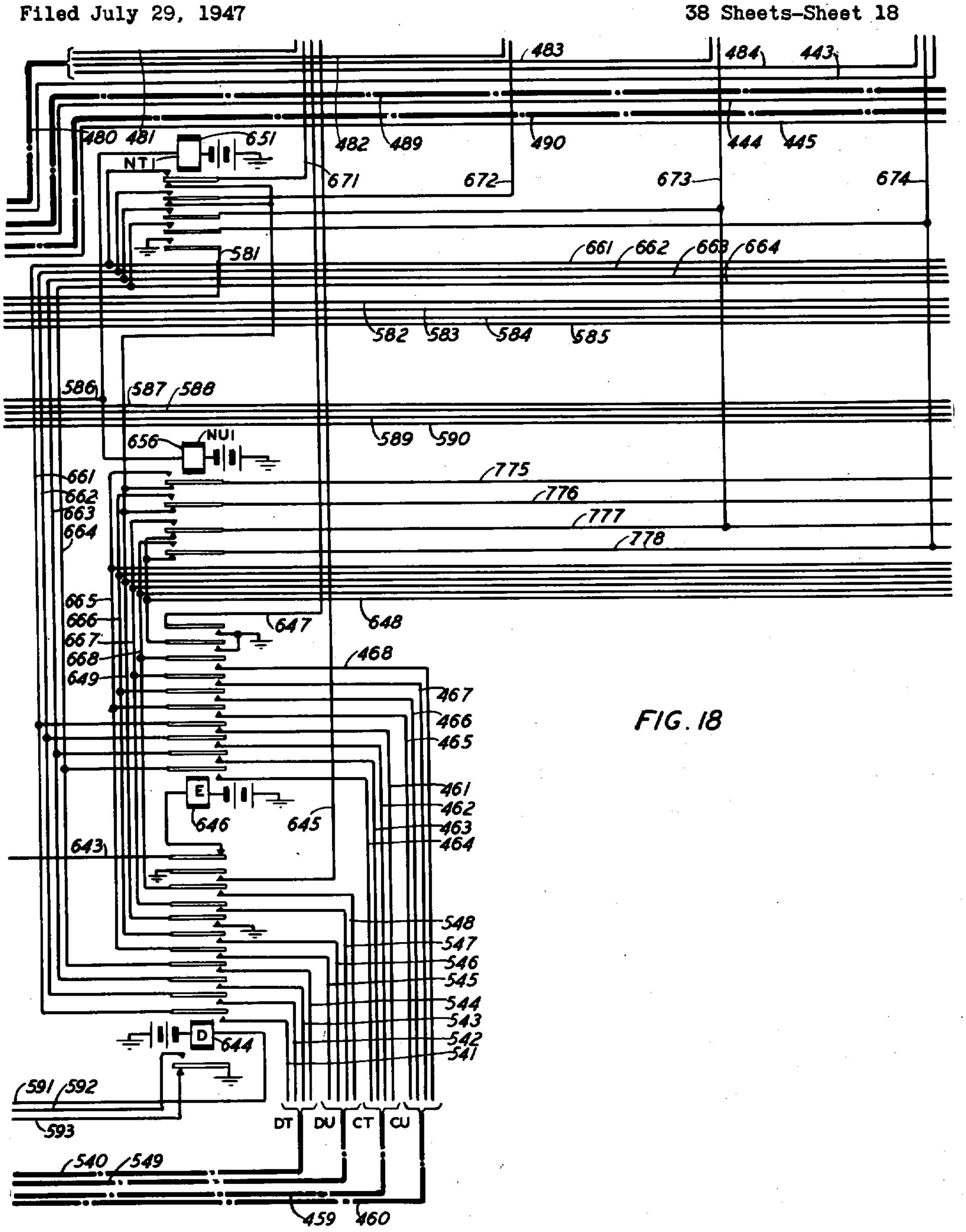
Figure 19:
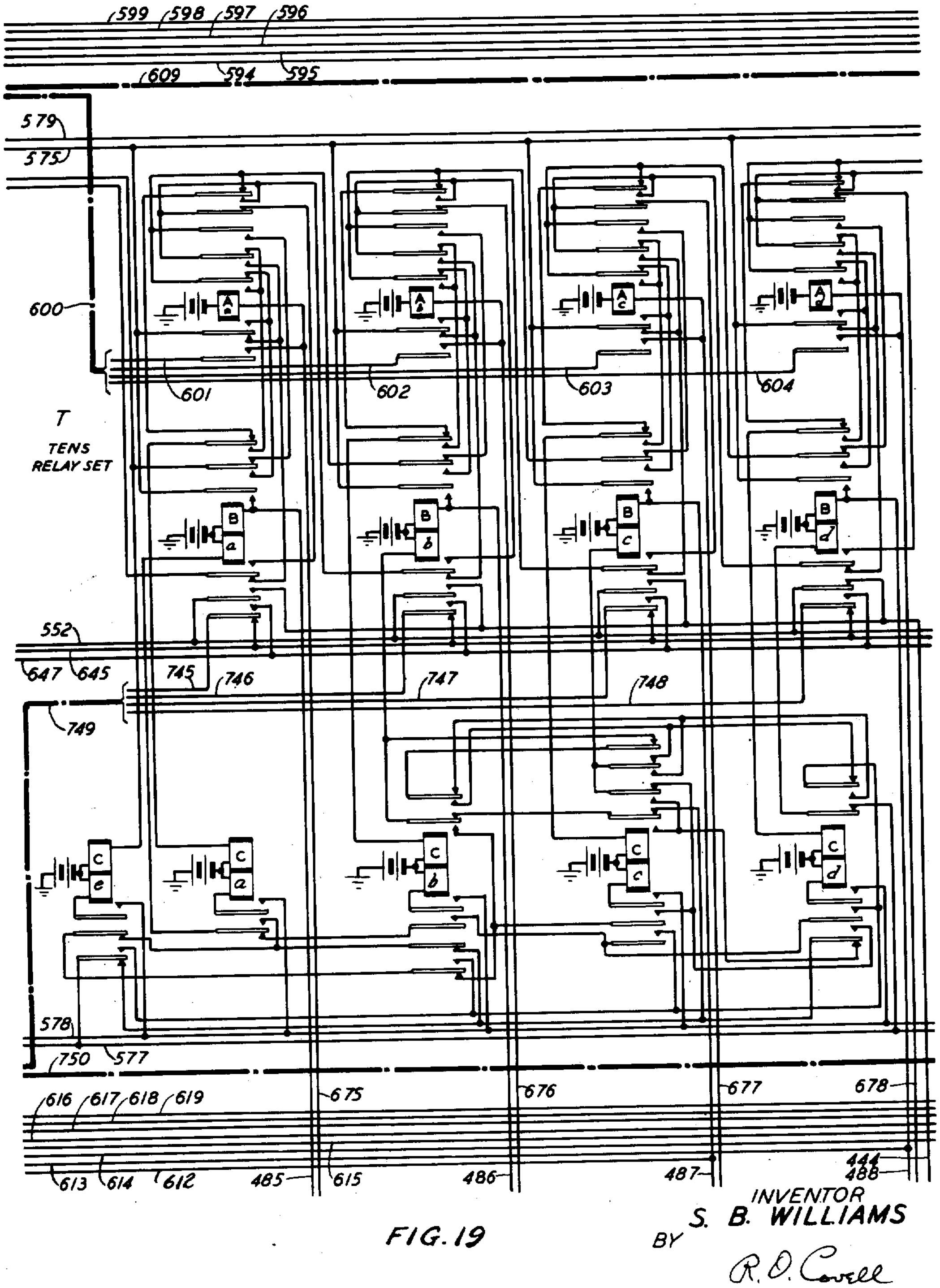
Figure 20:
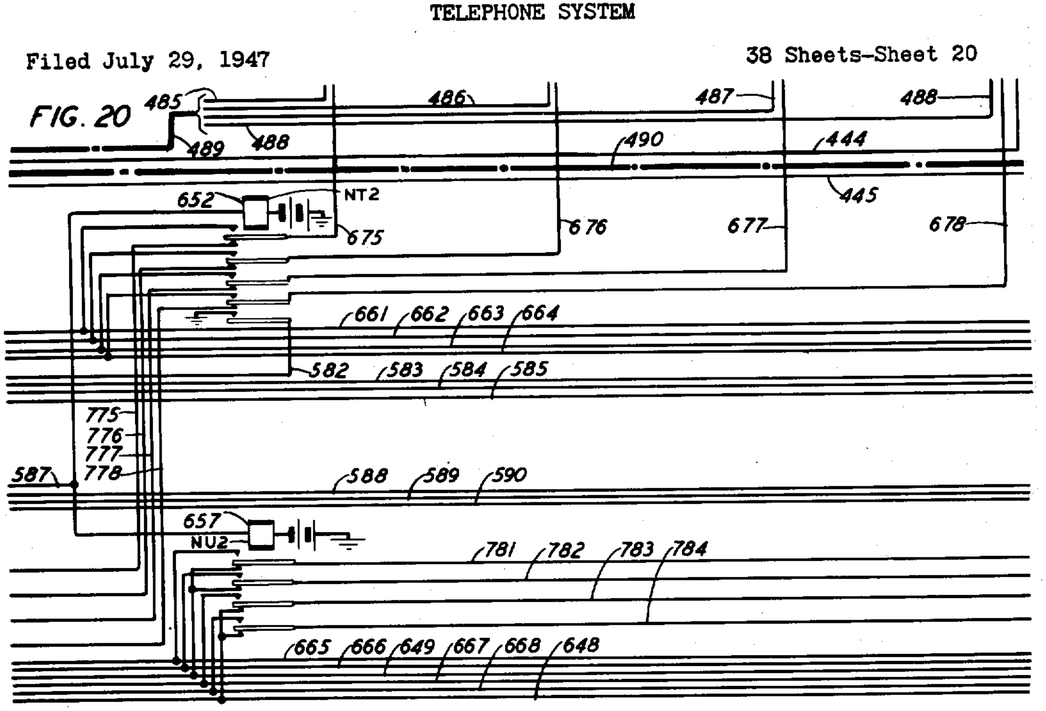
Figure 21:
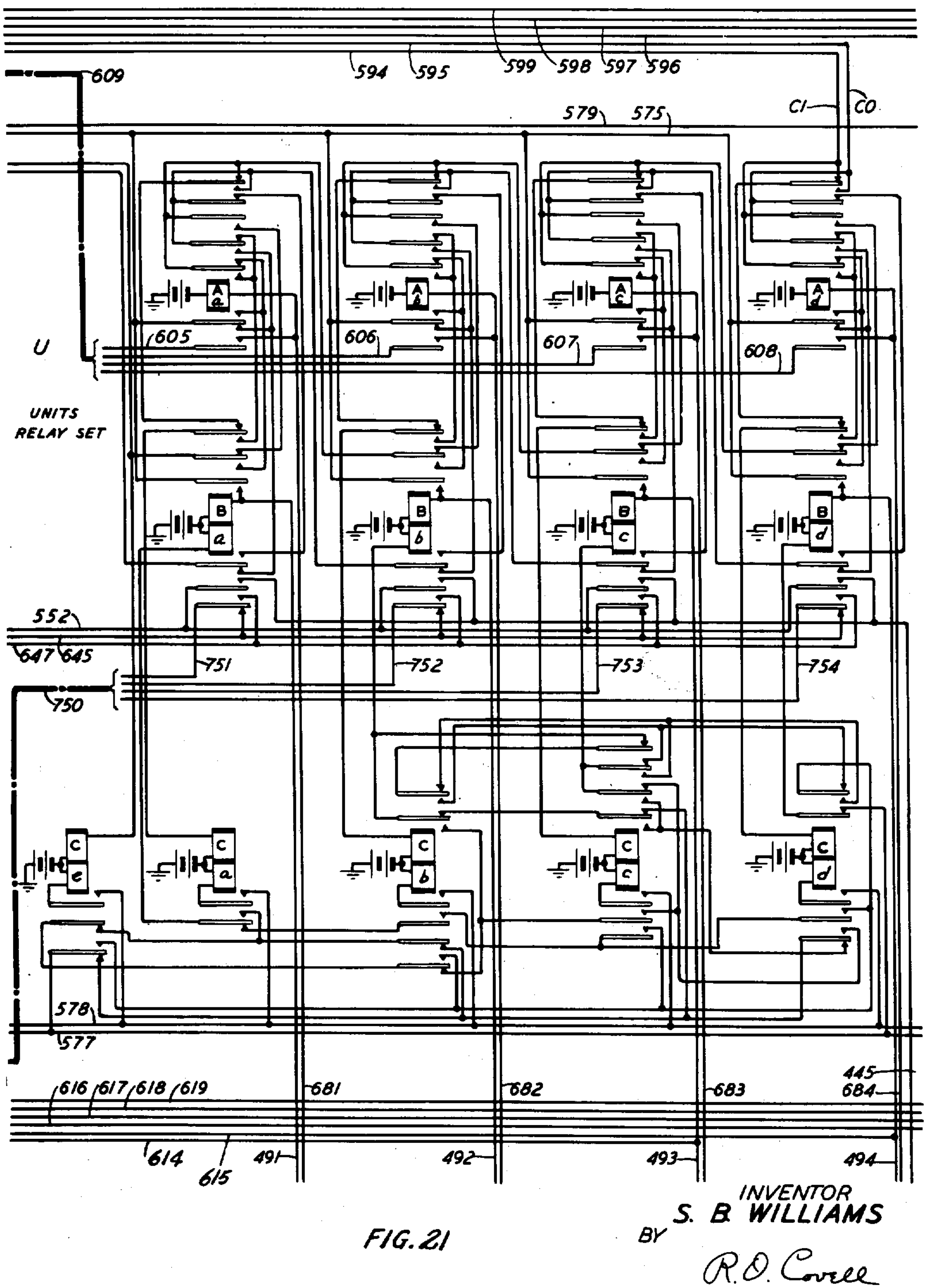
Figure 22:
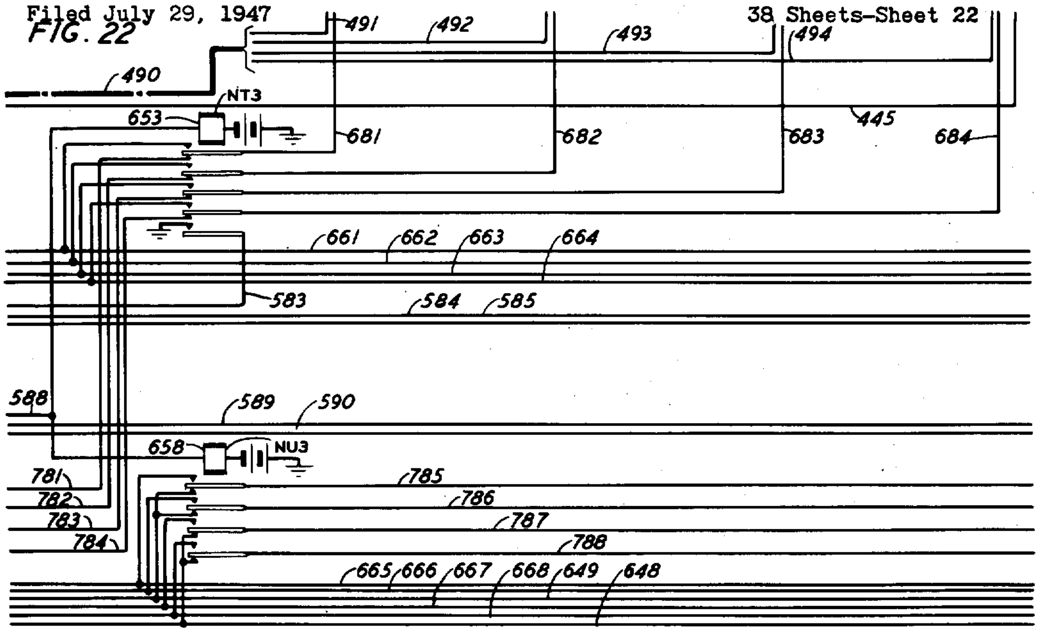
Figure 23:
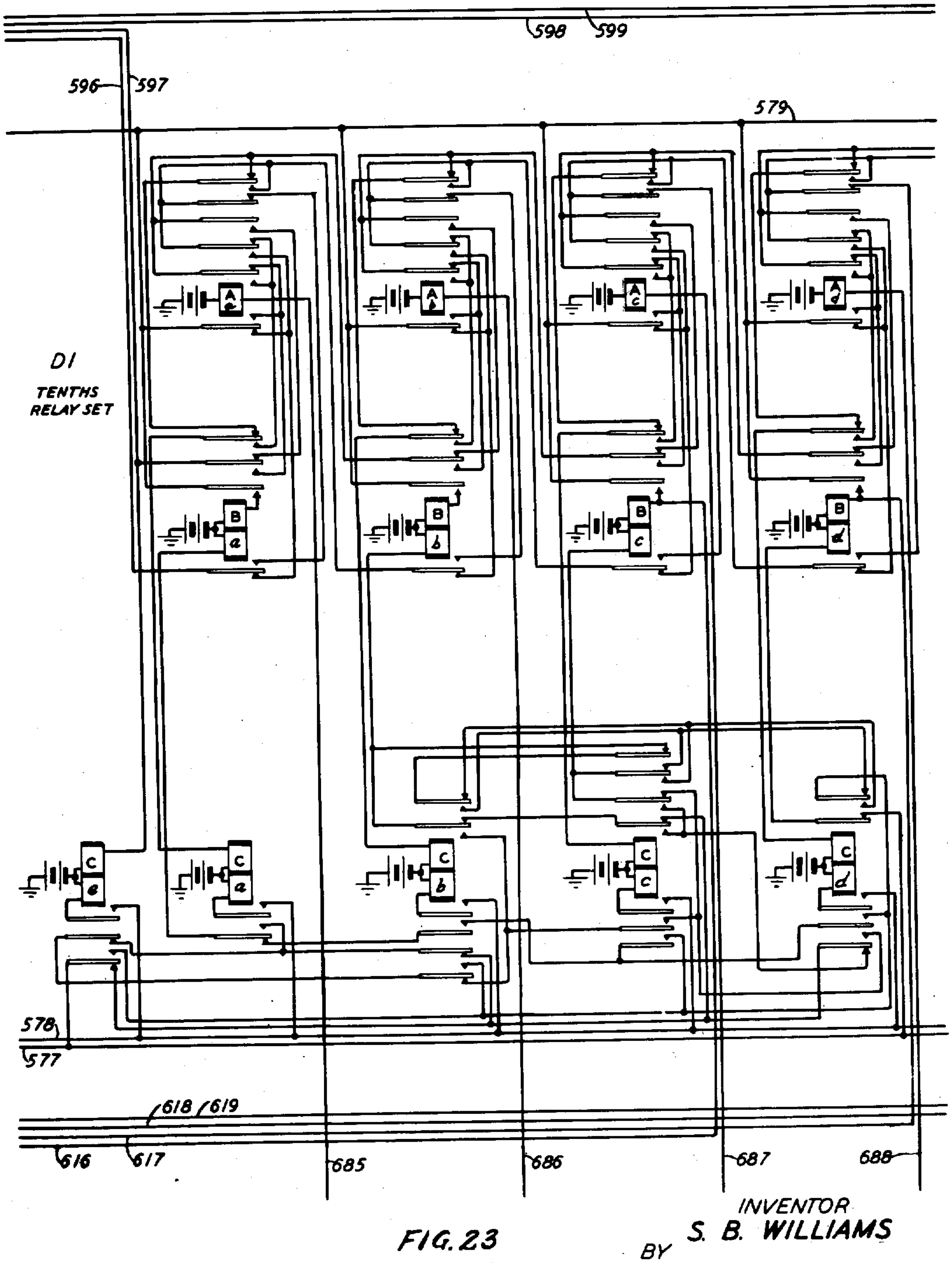
Figure 24:
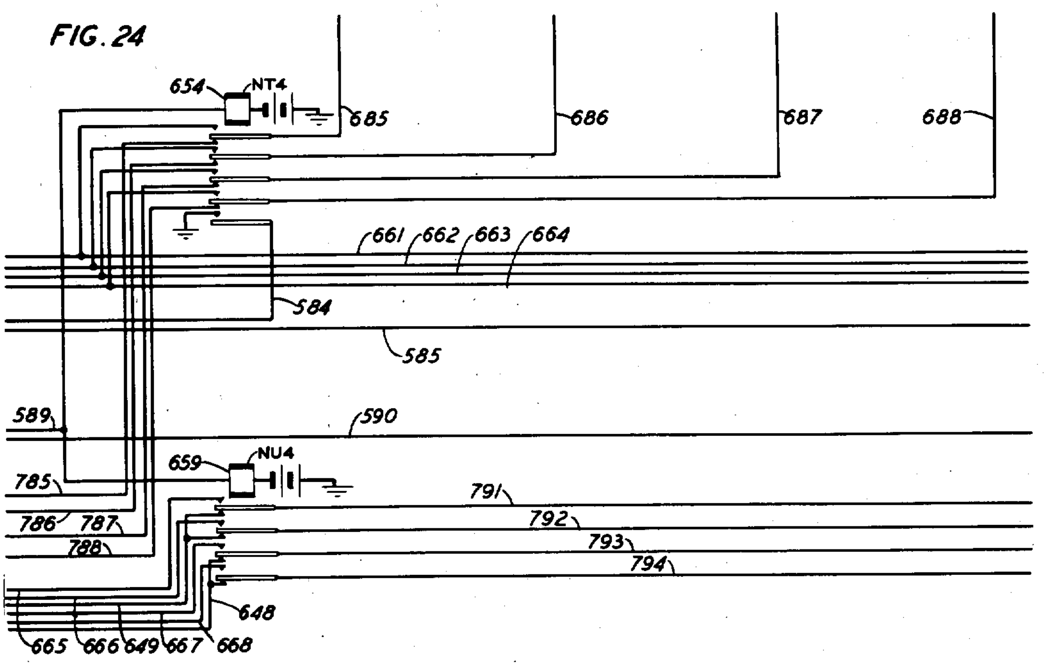
Figure 25:
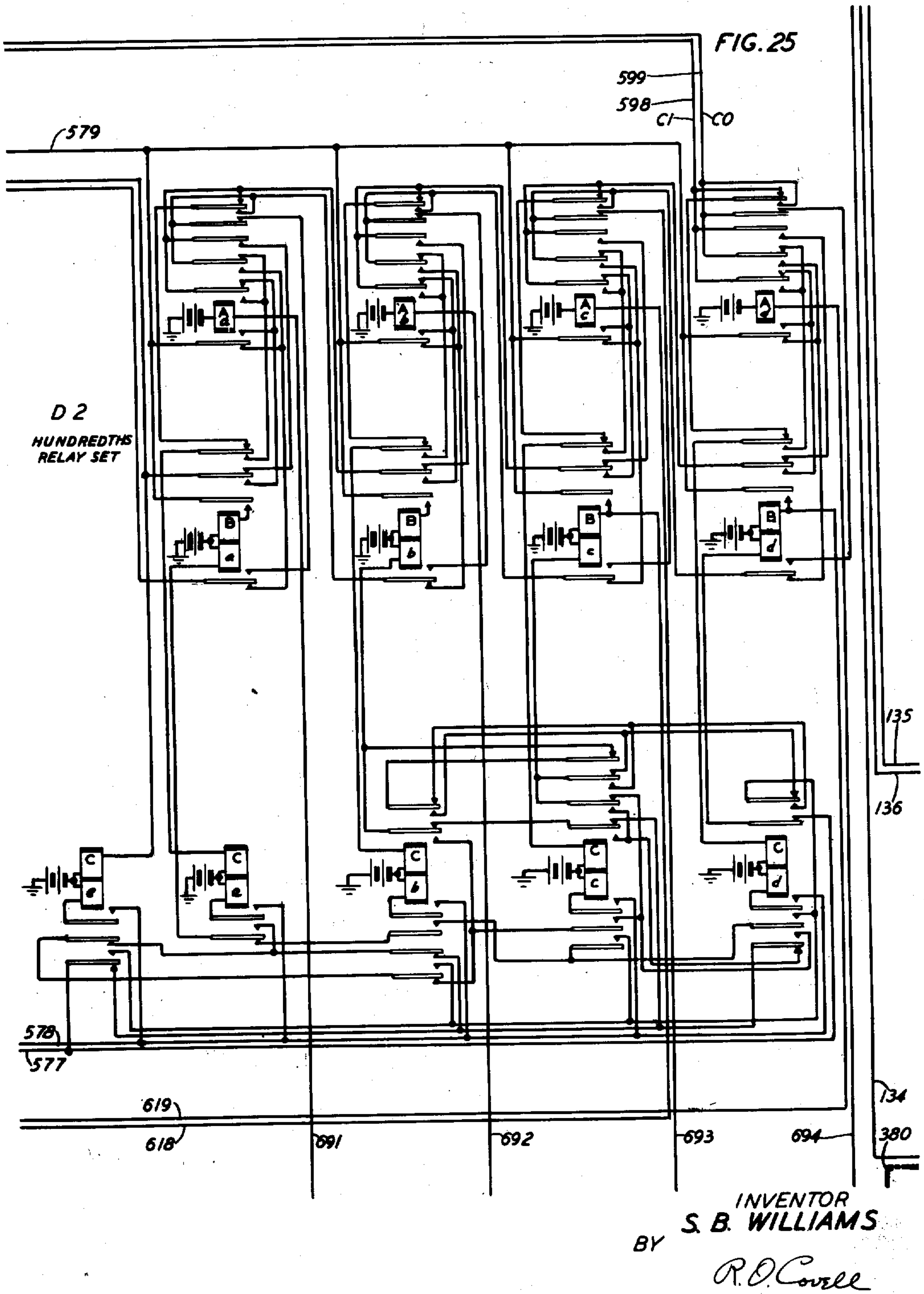

When the remainder of the tens and units digits is less than the divisor, ground is again connected to conductor 560 by the relays of the computing relay sets to operate relay 559. Relay 559 prevents the reoperation of relay 561 and opens the locking circuit of relay 569. While relay 569 is releasing, the U relays in Fig. 16 are selectively operated under the control of the BS relays of Fig. 13 to register the units digit of the quotient. The release of relay 569 opens the short circuit across the winding of relay N4, whereby relay N3 is held operated and relay N4 is operated. The operation of relay N4 opens the operating circuit of relay N3, transfers the control conductors 571 to 574 from the U register relays to the D1 or tenths register relays of the relay control circuit in Fig. 16; causes the release of relays 652 and 657; and closes a connection from grounded conductor 591, through front contacts of relays N2 and N4 and a back contact of relay N6, to conductor 588 to operate relays 653 and 658. The operation of relay 653 connects ground to conductor 583 to reoperate relay 569; and, with both of relays 653 and 658 operated, conductors 541 to 548 are connected to the windings of the A relays of the units and tens computing relay sets; whereby the complement of the number of busy counts registered by switches 520 and 510 of the trunk group identifying circuit are registered by these A relays. With relay 644 operated and relays 651, 652, 656 and 657 released, the A relays of the hundreds, tens and hundredths relay sets are selectively operated to register the digit 9. The B relays of the units and tens relay sets register the remainder to which the complement of the number of busy counts is to be added. The reoperation of relay 569 again closes the circuit for operating relay 556 and closes a circuit for operating relay N5. With relay 559 released, the operating circuit of relay 561 is again closed and the division by subtraction is resumed. The BS and CS relays of Fig. 13 are operated and released progressively in the manner hereinbefore described to register the number of times relays 561, 562 and 563 are operated and released. When the remainder of the units and tenths digits is less than the divisor, ground is again connected to conductor 560 to operate shift relay 559. Relay 559 prevents the reoperation of relay 561 and opens the locking circuit of relay 569. While relay 569 is releasing, the D1 relays of Fig. 16 are selectively operated under the control of the BS relays of Fig. 13 to register the tenths digit of the quotient. The release of relay 569 opens the short circuit across the winding of relay N6, whereby relay N5 is held operated and relay N6 is operated in a series circuit. The operation of relay N6 opens the operating circuit of relay N5; transfers the control conductors 571 to 574 from the D1 register relays of the relay control circuit in Fig. 16 to the D2 register relays; causes the release of relays 653 and 658; and closes a connection from conductor 591, through front contacts of relays N2, N4 and N6 and a back contact of relay N8, to conductor 589 to operate relays 654 and 659. The operation of relay 654 connects ground to conductor 584 to reoperate relay 569; and, with both of relays 654 and 659 operated, conductors 541 to 548 are connected to the windings of the A relays of the tenths and hundredths computing relay sets; whereby the complement of the number of busy counts registered by switches 520 and 510 of the trunk group identifying circuit is registered by these A relays. With relay 644 operated and relays 651, 652, 653, 656, 657 and 658 released, the A relays of the hundreds, tens and units relay sets are selectively operated to register 9. The B relays of the tenths and hundredths relay sets register the remainder to which the complement of the number of the busy counts is to be added. The reoperation of relay 569 again closes the circuit for operating relay 556 and closes a circuit for operating relay N7. With relay 559 released, the operating circuit of relay 561 is again closed and the division by subtraction is resumed. The BS and CS relays of Fig. 13 are operated and released progressively in the manner hereinbefore described to register the number of times relays 561, 562 and 563 are operated and released.

When the remainder of the tenths and hundredths digits is less than the divisor, ground is again connected to conductor 560 to operate relay 559. Relay 559 prevents the reoperation of relay 561 and opens the locking circuits of relay 569. While relay 569 is releasing, the D2 relays of Fig. 16 are selectively operated to register the hundredths digit of the quotient. The release of relay 569 opens the short-circuit across the winding of relay N8, whereby relay N7 is held operated and relay N8 is operated. The operation of relay N8 opens the operating circuit of relay N7; prepares a circuit for operating relay D3a under the control of the BS relays of Fig. 13; causes the release of relays 645 and 569; and closes a connection from conductor 591 through front contacts of relays N2, N4, N6 and N8 and a back contact of relay N10 to conductor 590 to operate relay 655. The operation of relay 655 connects ground to conductor 585 to reoperate relay 569; and connects conductors 541 to 544 to the windings of the A relays of the hundredths counting relay set; whereby the complement of the tens digit of the number busy counts registered by switch 520 in the trunk group identifying circuit is registered on these A relays. With relay 644 operated and relays 651, 652, 653, 654, 656, 657, 658 and 659 released, the A relays of the hundreds, tens, units and tenths relay sets are selectively operated to register the digit 9. The B relays of the hundredths set register the first digit of the remainder of the total busy count. The reoperation of relay 569 again closes a circuit for operating relay 556 and closes a circuit for operating relay N9. With relay 559 released, the operating circuit of relay 561 is again closed and the computer proceeds to subtract the tens digit of the number of busy counts from the remainder registered by the hundredths relay set. The BS and CS relays of Fig. 13 are operated and released progressively in the manner hereinbefore described to register the number of times relays 561, 562 and 563 are operated and released. When the remainder of the hundredths digit is less than the divisor digit (that is, less than the digit registered by switch 520), ground is connected to conductor 560 to operate relay 559; thereby to prevent further operation of relay 561 and cause the release of relay 569. While relay 569 is releasing, relay D3*a* is operated if the quotient digit registered by the BS relays of Fig. 13 is 5 or greater than 5. The release of relay 569 opens the short-circuit across the winding of relay N10 whereby relay N9 is held operated and relay N10 is operated. The operation of relay N10 opens the operating circuit of relay D3*a*. If operated, relay D3*a* is locked under control of relay 555.

With all of relays N2, N4, N6, N8 and N10 operated and relay 559 released, ground is connected to conductor 642; whereby the computer in question is, in its turn, operatively associated with the punch circuit (when idle) in the manner hereinbefore described. Assume relay AP1 of the punch circuit to be operated by the connection of ground to conductor 642. Relays CP1, DP1, EP1, and FP1 are also operated; whereby the digits registered by the T, U, D1 and D2 relays of the relays control circuit of Fig. 16 are transmitted over conductors 621 to 628 and conductors 631 to 638, to set the B relays of the T, U, D1 and D2 relay sets of the punch circuit. Since relay 504 has been operated, a connection is closed from grounded conductor 553 through a front contact of relay 504, conductor 641 and a front contact of relay FP1 to operate relay 800. Furthermore, if relay D3*a* of Fig. 16 is operated, ground is connected through conductors 639 and 869 to operate relay 879 in the punch circuit. With relay 879 normal, ground is connected to the "carry 1" conductor 877; and with relay 879 operated, ground is connected to the "carry 0" conductor 878 of the D2 relay set. Thus if relay 879 is operated, 1 is added to the number registered by the B relays of the T, U, D1 and D2 sets to operate the C relays accordingly. For instance, if the B relays are operated to register 99.99, the operation of relay 879 would add one to operate the C relays to register 100.00.

The switch 810 is now advanced from normal to position 1 in which the tens digit of the trunk group number recorded by the GT and GU relays of the trunk group identifying circuit is punched on the summary tape; and is advanced from position 1 to position 3 in which the units digit of the trunk group number is punched on the summary tape. These operations are similar to corresponding operations hereinbefore described except that, due to the operation of relay 880, the circuits for operating relays 901 and 902 include brush 812 instead of brush 811. The switch 810 is then advanced to position 5 in which a circuit is closed for operating punch setting relay 923 and relay 881. The code for a space is thereby punched on the summary tape which space will separate the trunk group number and average busy count when the summary tape is used to operate a printer to list the trunk group numbers and busy counts for all groups. The switch 810 is then advanced to position 7, in which a circuit is closed for operating punch setting relay 925 in case relay CPe of the T relay set of the punch circuit is operated, that is, when the average busy count for the group is 100.00 and switch 810 is advanced to position 9 by the connection of ground to conductor 817. If relay CPe is not operated, the stepping magnet 815 is operated in a circuit which includes brush 813, conductor 816 and the back contact of relay CPe; and switch 810 is thereupon advanced to position 9. In either case, relay 907 is operated, and conductors 951, 953, 954 and 955 are thereby connected to conductors 911, 913, 914 and 915 to selectively operate the punch setting relays 921 to 925 according to the tens digit registered by the C relays of the T relay set of the punch circuit. After punching this digit on the summary tape, the switch 810 is advanced to position 10, releasing relay 907; and is then advanced to position 11. In position 11, relay 908 is operated to connect conductors 961, 963, 964 and 965 to conductors 911, 913, 914, and 915 to selectively operate the punch setting relays according to the units digit registered by the C relays of the U relay set of the punch circuit. After punching this digit on the summary tape, the switch 810 is advanced to position 12, releasing relay 908; and is then advanced to position 13. Relay 906 is now operated through brush 812, thereby to operate punch setting relays 922 and 924 and thus effect the punching of the tape with the code for a period. The switch 810 is thereupon advanced to position 14 and then to position 15 in which relay 909 is operated to connect conductors 971, 973, 974 and 975 to conductors 911, 913, 914 and 915 and thereby selectively operate the punch setting relays 921 to 925 according to the tenths digit registered by the C relays of the D1 relay set of the punch circuit. After the tenths digit of the average busy count has been punched, relay 810 is advanced to position 16 and then to position 17. In position 17, relay 910 is operated to connect conductors 981 983, 984 and 985 to conductors 911, 913, 914 and 915, thereby to selectively operate the punch setting relays corresponding to the hundredths digit registered by the C relays of the D2 relay set of the punch circuit. After this digit has been punched on the summary tape, switch 810 is advanced to position 18 and then to position 19. In position 19, punch setting relay 924 is operated whereby the code CR for carriage return is punched on the summary tape. After punching this code, switch 810 is advanced to position 20 and from position 20 to positions 21, in which position line feed code relay 803 is operated. Relay 803 closes a circuit for operating punch setting relay 922 thereby to effect the punching of the line feed code on the summary tape. When relay 882 releases, a circuit is closed through conductor 817 and a front contact of relay 803 for operating release relay 801, thereby to connect ground through conductors 870 and 640 to operate release control relay 554 in the relay control circuit and thus release the computer. When the computer restores to normal, ground is disconnected from conductor 642 whereby relay BP1 operates to release relays CP1, DP1, EP1 and FP1 and prepare the punch circuit for association with the next computer.

In the next computer relays 501 to 505 have alreday been operated so that this computer now operates to determine the average busy count for trunk group 01; and this average is recorded on the summary tape. Thus the average busy count is computed for each trunk group in succession and the trunk group numbers and average busy counts are recorded on the summary tape in such a form that they can be used to operate a printer which will print each trunk group number and the average busy count.

When all of the computing is finished, the operation of release key 529 operates relays 528 and 519 of the relay control circuit to effect the advance of switches 510 and 520 to normal. The release of the computer start key 400 causes the release of relays 501 to 509 in each of the computers and closes a circuit for operating release relay 403 whereby switch 410 is advanced to normal. With switch 410 in normal position, release relay 403 releases; and the computing equipment and punch circuit are again in normal condition awaiting operation of the start key.

What is claimed is:

1. In combination, a plurality of groups of apparatus units, means in each of said units for indicating its busy or idle condition, counting means for counting the number of busy units in a connected group of apparatus units, means for connecting said counting means to said groups one at a time in succession and for repeating the connection of the counting means to each group in succession as long as desired, means associated with said counting means and controlled by said connecting means for registering the trunk group number of the group connected to said counting means, a first tape, a first recording means controlled by said counting and register means for successively recording on said first tape the group number and the number of busy units in the group each time the number of busy units in a group is counted, computing means, means controlled by each group number and busy count record on said first tape for transmitting the group number and busy count to said computing means, said computing means comprising means for registering each trunk group number and busy count transmitted from said first tape, a second tape, a second recording means controlled by said computing means for recording on said second tape the trunk group number and first busy count for each group in succession, and means controlled by each group number and busy count record on said second tape for transmitting the group number and busy count to said computing means, said computing means further comprising means for registering each trunk group number and busy count transmitted from said second tape and means to control the operation of the computing means to add to a busy count transmitted from said second tape the busy count for the same group transmitted from said first tape thereby to progressively total all of the busy counts for each of said groups, said second recording means being effective to record the total count for each group on said second tape responsive to the completion of each addition of a busy count record transmitted from said first tape to the total busy count record for the same group transmitted from said second tape.

2. In combination, a plurality of groups of apparatus units, means in each of said units for indicating its busy or idle condition, counting means for counting the number of busy units in a connected group of apparatus units, means for connecting said counting means to said groups one at a time in succession and for repeating the connection of the counting means to each group in succession as long as desired, means associated with said counting means and controlled by said connecting means for registering the trunk group number of the group connected to said counting means, a first tape, a first recording means controlled by said counting and register means for successively recording on said first tape the group number and the number of busy units in the group each time the number of busy units in a group is counted, means for recording on said tape a signal indicating that all of the busy counts for each group have been recorded thereon, computing means, means controlled by each group number and busy count record on said first tape for transmitting the group number and busy count to said computing means, said computing means comprising means for registering each trunk group number and busy count transmitted from said first tape, means for counting and registering the number of busy counts thus transmitted for each group, a second tape, a second recording means controlled by said computing means for recording on said second tape the trunk group number and first busy count for each group in succession, and means controlled by each group number and busy count record on said second tape for transmitting the group number and busy count to said computing means, said computing means further comprising means for registering each group number and busy count transmitted from said second tape and means to control the operation of the computing means to add to a busy count transmitted from said second tape the busy count for the same group transmitted from said first tape thereby to progressively total all of the busy counts for each of said groups, said second recording means being effective to record the total count for each group on said second tape responsive to the completion of each addition of a busy count record transmitted from said first tape to the total busy count record for the same group transmitted from said second tape.

3. In combination, a plurality of groups of apparatus units, means in each of said units for indicating its busy or idle condition, counting means for counting the number of busy units in a connected group of apparatus units, means for connecting said counting means to said groups one at a time in succession and for repeating the connection of the counting means to each group in succession as long as desired, means associated with said counting means and controlled by said connecting means for registering the trunk group number of the group connected to said counting means, a first tape, a first recording means controlled by said counting and register means for successively recording on said first tape the group number and the number of busy units in the group each time the number of busy units in a group is counted, means for recording on said tape a signal indicating that all of the busy counts for each group have been recorded thereon, computing means, means controlled by each group number and busy count record on said first tape for transmitting the group number and busy count to said computing means, said computing means comprising means for registering each trunk group number and busy count transmitted from said first tape, means for counting and registering the number of busy counts thus transmitted for each group, a second tape, a second recording means controlled by said computing means for recording on said second tape the trunk group number and first busy count for each group in succession, and means controlled by each group number and busy count record on said second tape for transmitting the group number and busy count for said computing means, said computing means further comprising means for registering each group number and busy count transmitted from said second tape and means effective only if the same group number is simultaneously transmitted to the computing means under the control of said first and second tapes to control the operation of the computing means to add to the busy count transmitted from said second tape the busy count for the same group transmitted from said first tape thereby to progressively total all of the busy counts for each of said groups, said second recording means being effective to record the total count for each group on said second tape responsive to the completion of each addition of a busy count record transmitted from said first tape to the total busy count record for the same group transmitted from said second tape.

4. In combination, a plurality of groups of apparatus units, means in each of said units for indicating its busy or idle condition, counting means for counting the number of busy units in a connected group of apparatus units, means for connecting said counting means to said groups one at a time in succession and for repeating the connection of the counting means to each group in succession as long as desired, means associated with said counting means and controlled by said counting means for registering the group number of the group connected to said counting means, a first tape, a first recording means controlled by said counting and register means for successively recording on said first tape the group number and the number of busy units in the group each time the number of busy units in a group is counted, means for recording on said tape a signal indicating that all of the busy counts for each group have been recorded thereon, computing means, means controlled by each group number and busy count record on said first tape for transmitting the group number of busy count to said computing means, said computing means comprising means for registering each trunk group number and busy count transmitted from said first tape, means for counting and registering the number of busy counts thus transmitted for each group, a second tape, a second recording means controlled by said computing means for recording on said second tape the trunk group number and first busy count for each group in succession, means controlled by each group number and busy count record on said second tape for transmitting the group number and busy count to said computing means, said computing means further comprising means for registering each group number and busy count transmitted from said second tape and means effective only if the same group number is simultaneously transmitted to the computing means under the control of said first and second tapes to control the operation of the computing means to add to the busy count transmitted from said second tape the busy count for the same group transmitted from said first tape thereby to progressively total all of the busy counts for each of said groups, said second recording means being effective to record the total count for each group on said second tape responsive to the completion of each addition of the busy count record transmitted from said first tape to the total busy count record for the same group transmitted from said second tape, means effective when the total busy count for each of all of the groups has been recorded on said second tape for transmitting to said computing means the group number and total busy count for each group in succession, means in the computer for dividing the total busy count for each group by the number of busy counts, and means controlled by the computer for making a record on said second tape of the average number of busy units in each group 5. In a traffic measuring system for repeatedly observing and recording the number of apparatus units busy in each of a plurality of groups, a plurality of testing and counting devices, means for connecting said devices one at a time in numerical succession to the apparatus units of said groups in numerical order, one group at a time, each of said devices comprising means for testing each of the units of a connected group to determine the number of units in the group which are busy when tested, means for registering the group number of a connected group and means for counting and registering the number of units in a connected group which are busy when tested, recording means common to said plurality of devices, and means for operatively connecting said recording means with said testing and counting devices one at a time in numerical succession, said recording means comprising means controlled by a connected testing and counting device to make a record of the group number and busy count number registered in the connected device.

6. In a traffic measuring system for repeatedly observing and recording the number of apparatus units busy in each of a plurality of groups, a plurality of testing and counting devices, electromagnetically operated means for connecting said devices one at a time in numerical succession to the apparatus units of said groups in numerical order, one group at a time, each of said devices comprising electrical circuit means for testing each of the units of a connected group to determine the number of units in the group which are busy when tested, electromagnetically operated means for registering the group number of a connected group and means for counting and registering the number of units in a connected group which are busy when tested, tape recording means common to said plurality of devices, and means for operatively connecting said recording means with said testing and counting devices one at a time in numerical succession, said recording means comprising electromagnetically operated means controlled by a connected testing and counting device to make a punched tape record of the group number and busy count number registered in the connected device.

7. In a traffic measuring system for repeatedly observing and recording the number of apparatus units busy in each of a plurality of groups, means for testing, counting and registering the number of apparatus units in any group which is busy when tested, means for connecting said testing and counting means to each of said groups of apparatus units in succession, one group at a time, means including means associated with said testing and counting means for identifying and registering the group number of the group connected to said testing and counting means, a first tape, means for punching a record on said first tape of the group number and the number of busy units in the group each time the group number and the number of busy units in a connected group are registered, a first transmitting means selectively controlled by each group number and busy count number record on said first tape for transmitting coded signals corresponding to the group number and busy count number of the controlling record, a plurality of computers, means common to said computers for operatively associating said computers, one at a time in succession with said transmitting means, means in each computer effective when the computer is associated with said first transmitting means for starting the operation of said first transmitting means and for registering the group number and busy count number in said computer in accordance with the controlling record on said first tape, a second tape, common to said computers, means for punching a record of a group number and busy count number on said second tape, means for operatively associating said computers, one at a time in succession, with said common punching means, a second transmitting means selectively controlled by each group number and busy count record on said second tape for transmitting coded signals corresponding to the group number and busy count number of the controlling record, means in each computer effective when the computer is associated with said second transmitting means for starting the operation of said second transmitting means and for registering the group number and busy count number in said computer in accordance with the controlling record on said second tape, each of said computers comprising means for adding the busy count number registered therein in accordance with the coded signals received from said first transmitting means to the total busy count number for the same group registered therein in accordance with the coded signals received from said second transmitting means and for registering said total busy count, and means responsive to the registration of a total busy count for a group in a computer for operatively associating said computer with said means for punching a record on said second tape, to effect the punching of said second tape to record the group number and total busy count registered in the associated computer.

8. In combination, a first tape having punched thereon a plurality of records each consisting of a group number and a busy count number indicating the number of units in one of a plurality of groups of apparatus units which were busy when tested, these group records following each other in numerical succession and there being a plurality of records for each group, a plurality of computers, means for assigning said computers for use one at a time in numerical order, first transmitting means effective upon assignment of a computer for transmitting to said computer code signals corresponding to and selectively controlled by the group number and busy count number of a group record on said first tape, a second tape having punched thereon group records each consisting of a group number and busy count number indicating the total number of units found busy on successive tests of the identified group, a second transmitting means effective upon assignment of a computer for transmitting to said computer code signals corresponding to and selectively controlled by the group number and busy count number of a group record on said second tape, said computer comprising means for adding to the total busy count for a group transmitted thereto from said second tape the next busy count record for the same group transmitted from said first tape, means in the computer for preventing the operation of said computer if the group number received from said first tape differs from the group number received from said second tape, and means responsive to the addition of a busy count for a group to the previous total for the same group for punching the group number and new total busy count on said second tape.

9. In combination, a plurality of groups of apparatus units, each group comprising a plurality of units, automatic switching and testing means for cyclically testing all of the units in each group to determine the number of units which are busy in each group when tested, automatic recording means for recording the group identifying number of each group and the number of busy units therein each time a group is tested, automatic computing and recording means comprising a plurality of sets of computing relays for totaling the busy count for each group responsive to each recording of a busy count and for recording the total busy count for each group in succession, register means for registering the number of busy counts totaled, and automatic computing and recording means comprising said sets of computing relays, said register means and additional sets of computing relays for computing the average busy count for each group and for recording the group number and the computed average busy count for each group.

10. In combination, a first tape having punched thereon a plurality of records each consisting of a group number and a busy count number indicating the number of units in one of a plurality of groups of apparatus units which were busy when tested, these group records following each other in numerical succession and there being a plurality of records for each group, a plurality of computers, means for assigning said computers for use one at a time in numerical order, first transmitting means effective upon assignment of a computer for transmitting to said computer code signals corresponding to and selectively controlled by the group number and busy count number of a group record on said first tape, a second tape having punched thereon group records each consisting of a group number and busy count number indicating the total number of units found busy on successive tests of the identified group, a second transmitting means effective upon assignment of a computer for transmitting to said computer code signals corresponding to and selectively controlled by the group number and busy count number of a group record on said second tape, said computer comprising means for adding to the total busy count for a group transmitted thereto from said second tape the next busy count record for the same group transmitted from said first tape, means in the computer for preventing the operation of said computer if the group number received from said first tape differs from the group number received from said second tape, means responsive to the addition of a busy count for a group to the previous total for the same group for punching the group number and new total busy count on said second tape, means effective when the total busy count for each of all of the groups has been recorded on said second tape for transmitting the group numbers and total busy count for each group to an assigned computer, means in each computer for dividing the total busy count for a group by the number of busy counts, and means controlled by each computer in succession for making a record on said second tape of the average number of busy units in each of all of the groups.

SAMUEL B. WILLIAMS.

REFERENCES CITED

The following references are of record in the file of this patent:

UNITED STATES PATENTS

| Number | Name | Date |
|---|---|---|
| 2,025,407 | Williams | Dec. 24, 1935 |
| 2,272,311 | Sigo | Feb. 10, 1942 |
| 2,378,541 | Dimond | June 19, 1945 |
| 2,393,403 | Ostline | Jan. 22, 1946 |